(12) United States Patent
Hirakawa

(10) Patent No.: US 11,841,487 B2
(45) Date of Patent: Dec. 12, 2023

(54) IMAGING LENS AND IMAGING APPARATUS

(71) Applicant: FUJIFILM Corporation, Tokyo (JP)

(72) Inventor: Yuya Hirakawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 50 days.

(21) Appl. No.: 17/453,403

(22) Filed: Nov. 3, 2021

(65) Prior Publication Data

US 2022/0163778 A1  May 26, 2022

(30) Foreign Application Priority Data

Nov. 25, 2020  (JP) ................. 2020-195417

(51) Int. Cl.
  *G02B 15/14* (2006.01)
(52) U.S. Cl.
  CPC ......... *G02B 15/144111* (2019.08); *G02B 15/145119* (2019.08)
(58) Field of Classification Search
  CPC ........... G02B 15/144111; G02B 15/145119
  USPC ......................................... 359/713
  See application file for complete search history.

(56) References Cited

U.S. PATENT DOCUMENTS

2019/0339497 A1  11/2019  Gyoda

FOREIGN PATENT DOCUMENTS

| JP | 2018005165 A | * | 1/2018 |
| JP | 6582315 B2 | | 10/2019 |
| JP | 2019-194630 A | | 11/2019 |

* cited by examiner

*Primary Examiner* — George G. King
(74) *Attorney, Agent, or Firm* — Studebaker & Brackett PC

(57) ABSTRACT

The imaging lens includes, in order from a position closest to an object side to an image side: a front lens group that has a positive refractive power and is immovable during focusing; a stop that is disposed subsequent to the front lens group; a first focus lens group that has a positive refractive power; a second focus lens group that has a negative refractive power; and a final lens group that has a positive refractive power, is disposed closest to the image side, and is immovable during focusing. During focusing from an infinite distance object to a short range object, the first focus lens group and the second focus lens group move to increase a mutual distance therebetween.

19 Claims, 18 Drawing Sheets

EXAMPLE 1

EXAMPLE 1

FIG. 2
EXAMPLE 1
INFINITY
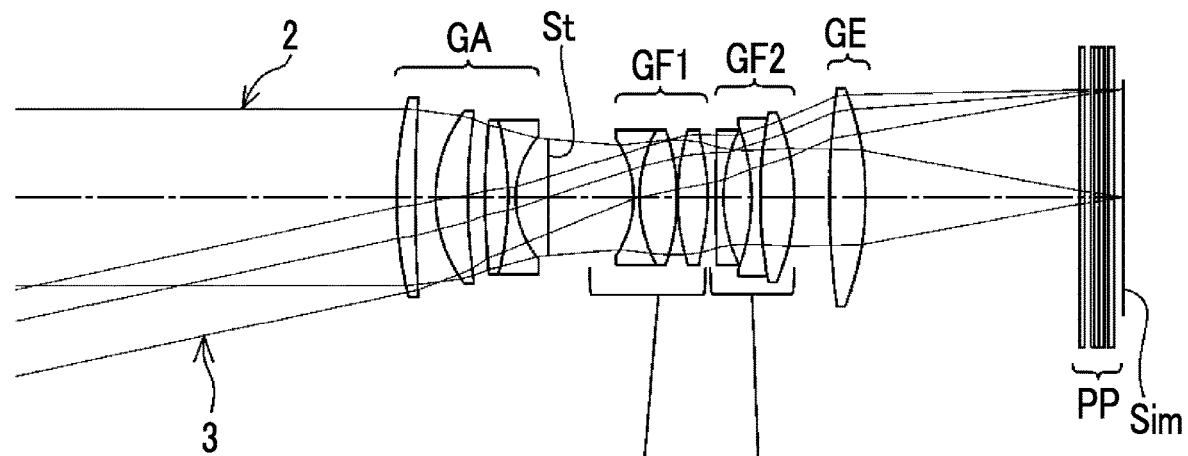
110 mm
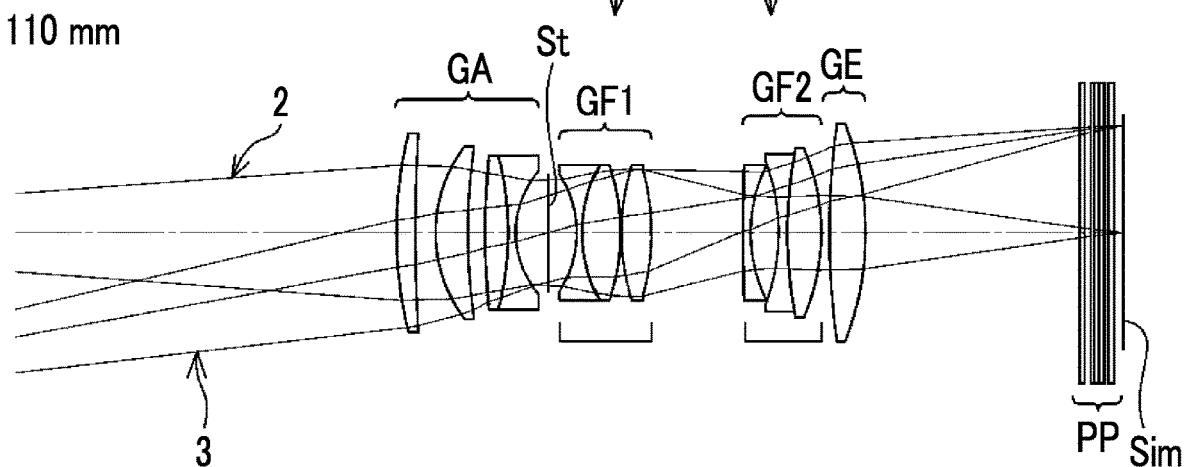

EXAMPLE 4

FIG. 9
EXAMPLE 4
INFINITY
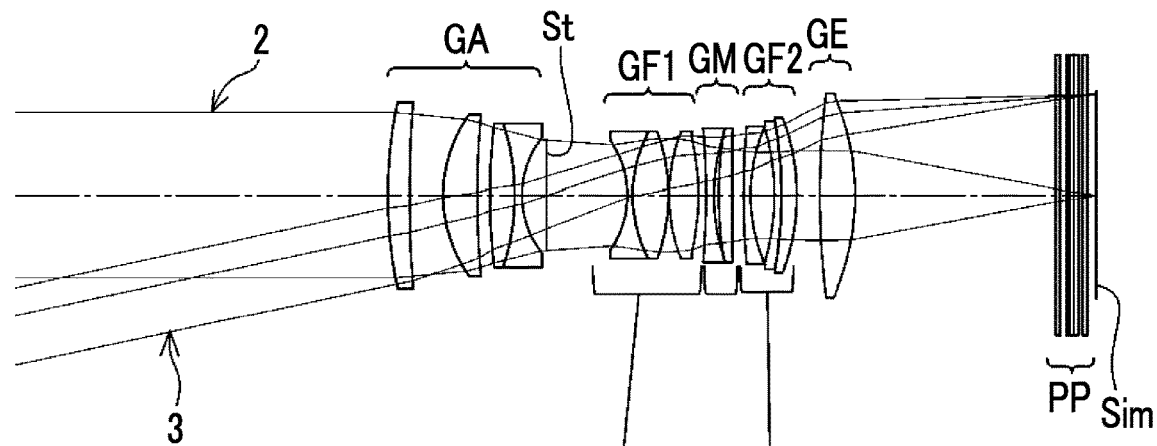
110 mm
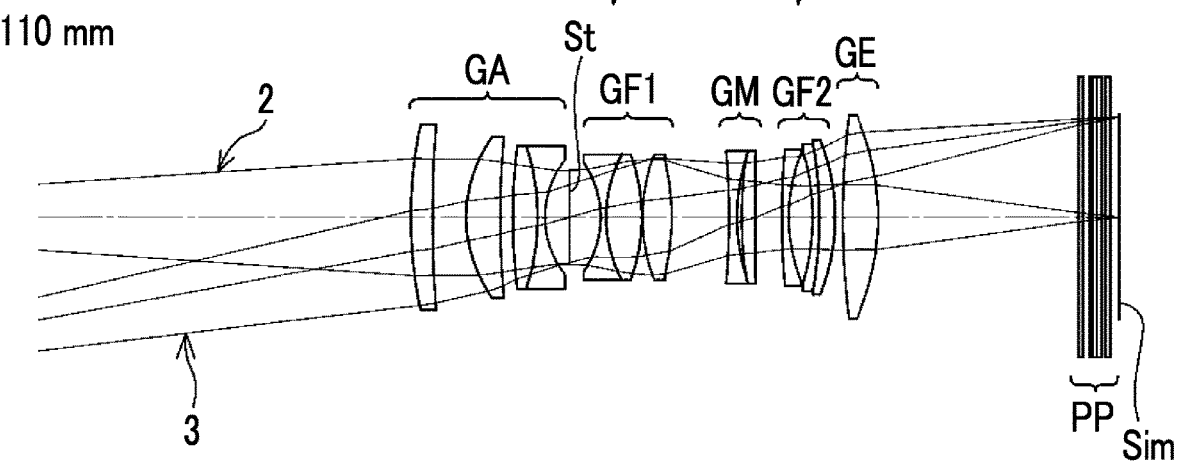

EXAMPLE 4

EXAMPLE 6

EXAMPLE 7

IMAGING LENS AND IMAGING APPARATUS

CROSS-REFERENCE TO RELATED APPLICATIONS

The present application claims priority under 35 U.S.C. § 119 to Japanese Patent Application No. 2020-195417, filed on Nov. 25, 2020. Each application above is hereby expressly incorporated by reference, in its entirety, into the present application.

BACKGROUND

Technical Field

The present disclosure relates to an imaging lens and an imaging apparatus.

Related Art

In the related art, as imaging lenses used in digital cameras and the like, the lens systems described in JP2019-194630A and JP6582315B are known.

In recent years, with the increase in the number of pixels of an imaging element, there has been a demand for an imaging lens in which aberrations are satisfactorily corrected even in a close-up imaging state.

SUMMARY

The present disclosure has been made in view of the above circumstances, and an object of the present invention is to provide an imaging lens in which aberrations are satisfactorily corrected even in a close-up imaging state, and an imaging apparatus comprising the imaging lens.

An imaging lens according to an aspect of the present disclosure includes, in order from a position closest to an object side to an image side: a front lens group that has a positive refractive power and remains stationary with respect to an image plane during focusing; a stop that is disposed subsequent to the front lens group; a first focus lens group that has a positive refractive power; a second focus lens group that has a negative refractive power; and a final lens group that has a positive refractive power, is disposed closest to the image side, and remains stationary with respect to the image plane during focusing. During focusing from an infinite distance object to a short range object, the first focus lens group and the second focus lens group move to increase a mutual distance therebetween, a lens surface closest to the image side in the front lens group is a concave surface, and a lens surface closest to the object side in the first focus lens group is a concave surface.

Assuming that a curvature radius of the lens surface closest to the object side in the first focus lens group is RF1f, and a maximum image height is Ymax, the imaging lens according to the above-mentioned aspect preferably satisfies Conditional Expression (1), and more preferably satisfies Conditional Expression (1-1).

$$-2 < RF1f/Ymax < -0.5 \tag{1}$$

$$-1.4 < RF1f/Ymax < -0.8 \tag{1-1}$$

Assuming that a curvature radius of the lens surface closest to the image side in the front lens group is RAr, and a maximum image height is Ymax, the imaging lens according to the above-mentioned aspect preferably satisfies Conditional Expression (2), and more preferably satisfies Conditional Expression (2-1).

$$0.7 < RAr/Ymax < 1.3 \tag{2}$$

$$0.8 < RAr/Ymax < 1.2 \tag{2-1}$$

Assuming that a curvature radius of the lens surface closest to the image side in the front lens group is RAr, and a curvature radius of the lens surface closest to the object side in the first focus lens group is RF1f, the imaging lens according to the above-mentioned aspect preferably satisfies Conditional Expression (3), and more preferably satisfies Conditional Expression (3-1).

$$-0.2 < (RAr+RF1f)/(RAr-RF1f) < 0 \tag{3}$$

$$-0.15 < (RAr+RF1f)/(RAr-RF1f) < -0.01 \tag{3-1}$$

It is preferable that in a case where one lens component is one single lens or one group of cemented lenses, a lens component closest to the object side in the front lens group has a positive refractive power.

Assuming that a maximum value of refractive indexes of all lenses included in the lens component closest to the object side in the front lens group at a d line is NAmax, a minimum value of Abbe numbers of all positive lenses included in the lens component closest to the object side in the front lens group based on the d line is νApmin, and a maximum value of partial dispersion ratios of all the positive lenses included in the lens component closest to the object side in the front lens group between a g line and an F line is θApmax, it is preferable that the imaging lens according to the above-mentioned aspect satisfies Conditional Expressions (4), (5), and (6).

$$1.7 < NAmax < 2.1 \tag{4}$$

$$10 < \nu Apmin < 40 \tag{5}$$

$$0.5 < \theta Apmax < 0.8 \tag{6}$$

It is preferable that the front lens group includes a cemented lens closest to the image side, and the cemented lens closest to the image side in the front lens group includes a negative lens and a positive lens successively in order from the position closest to the image side.

Assuming that a refractive index of the positive lens included in the cemented lens closest to the image side in the front lens group at a d line is NArp, a refractive index of the negative lens included in the cemented lens closest to the image side in the front lens group at the d line is NArn, an Abbe number of the positive lens included in the cemented lens closest to the image side in the front lens group based on the d line is νArp, an Abbe number of the negative lens included in the cemented lens closest to the image side in the front lens group based on the d line is νArn, a partial dispersion ratio of the positive lens included in the cemented lens closest to the image side in the front lens group between a g line and an F line is θArp, and a partial dispersion ratio of the negative lens included in the cemented lens closest to the image side in the front lens group between the g line and the F line is θArn, it is preferable that the imaging lens according to the above-mentioned aspect satisfies Conditional Expressions (7), (8), and (9).

$$0 < NArp - NArn < 0.15 \tag{7}$$

$$5 < \nu Arp - \nu Arn < 40 \tag{8}$$

$$0.01 < \theta Arn - \theta Arp < 0.06 \tag{9}$$

Assuming that a focal length of the imaging lens in a state where the infinite distance object is in focus is f, and a focal length of the front lens group is fA, it is preferable that the imaging lens according to the above-mentioned aspect satisfies Conditional Expression (10).

$$0.25 < f/fA < 0.8 \quad (10)$$

Assuming that a focal length of the imaging lens in a state where the infinite distance object is in focus is f, and a focal length of the first focus lens group is fF1, it is preferable that the imaging lens according to the above-mentioned aspect satisfies Conditional Expression (11).

$$1.8 < f/fF1 < 4 \quad (11)$$

Assuming that a focal length of the imaging lens in a state where the infinite distance object is in focus is f, and a focal length of the second focus lens group is fF2, it is preferable that the imaging lens according to the above-mentioned aspect satisfies Conditional Expression (12).

$$-5 < f/fF2 < -1.4 \quad (12)$$

Assuming that a focal length of the first focus lens group is fF1, and a focal length of the second focus lens group is fF2, it is preferable that the imaging lens according to the above-mentioned aspect satisfies Conditional Expression (13).

$$-1.55 < fF1/fF2 < -0.4 \quad (13)$$

Assuming that a lateral magnification of the first focus lens group in a state where the infinite distance object is in focus is $\beta F1$, and a combined lateral magnification of all lenses closer to the image side than the first focus lens group in the state where the infinite distance object is in focus is $\beta F1r$, it is preferable that the imaging lens according to the above-mentioned aspect satisfies Conditional Expression (14).

$$1.6 < (1-\beta F1^2) \times \beta F1r^2 < 5.8 \quad (14)$$

Assuming that a lateral magnification of the second focus lens group in a state where the infinite distance object is in focus is $\beta F2$, and a combined lateral magnification of all lenses closer to the image side than the second focus lens group in the state where the infinite distance object is in focus is $\beta F2r$, it is preferable that the imaging lens according to the above-mentioned aspect satisfies Conditional Expression (15).

$$-4.2 < (1-\beta F2^2) \times \beta F2r^2 < 0 \quad (15)$$

It is preferable that the first focus lens group is disposed subsequent to the stop.

It is preferable that the imaging lens according to the above-mentioned aspect further includes a medium lens group that remains stationary during focusing between the first focus lens group and the second focus lens group.

An imaging apparatus according to an aspect of the present disclosure comprises the imaging lens according to the aspect of the present disclosure.

In the present specification, it should be noted that the terms "consisting of ~" and "consists of ~" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, in the present specification, the expression "comprising, in order from an object side to an image side: ~; and ~" means including components in order continuously and discontinuously. For example, an expression "including, in order from the object side to the image side: A; and B" means that A and B may be disposed continuously or another component may be disposed between A and B and A and B may be disposed discontinuously.

In the present specification, the term "~ lens group having a positive refractive power" means that the lens group has a positive refractive power as a whole. Similarly, the term "~ lens group having a negative refractive power" means that the lens group has a negative refractive power as a whole. The "lens group" is not limited to a configuration in which the lens group consists of a plurality of lenses, but the lens group may consist of only one lens.

It should be noted that the term "lens group" in the present specification refers to a part including at least one lens, which is a constituent part of the imaging lens and is divided by an air distance that changes during focusing. During focusing, the lens groups move or remain stationary, and the mutual distance between the lenses in one lens group does not change.

The terms "a lens having a positive refractive power", "a positive lens", and "a lens with a positive power" are synonymous. The terms "a lens having a negative refractive power", "a negative lens", and "a lens with a negative power" are synonymous. The term "single lens" means one uncemented lens.

Unless otherwise specified, the sign of refractive power, the surface shape, and the curvature radius of a lens including an aspheric surface are considered in terms of the paraxial region. Regarding the sign of the curvature radius, the sign of the curvature radius of the surface convex toward the object side is positive and the sign of the curvature radius of the surface convex toward the image side is negative. A compound aspheric lens (a lens in which a spherical lens and an aspheric film formed on the spherical lens are integrally formed and function as one aspheric lens as a whole) is not regarded as cemented lenses, but the compound aspheric lens is regarded as one lens.

The "focal length" used in a conditional expression is a paraxial focal length. The values used in Conditional Expressions are values in a case where the d line is used as a reference in a state where the infinite distance object is in focus. The "d line", "C line", "F line", and "g line" described in the present specification are emission lines. In the present specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers). The partial dispersion ratio $\theta gF$ between the g line and the F line of a certain lens is defined by $\theta gF=(Ng-NF)/(NF-NC)$, where Ng, NF, and NC are the refractive indices of the lens at the g line, the F line, and the C line.

According to the present disclosure, it is possible to provide an imaging lens in which aberrations are satisfactorily corrected even in a close-up imaging state, and an imaging apparatus comprising the imaging lens.

BRIEF DESCRIPTION OF THE DRAWINGS

FIG. 2 is a cross-sectional view showing a configuration and luminous flux in each in-focus state of the imaging lens of FIG. 1.

FIG. 9 is a cross-sectional view showing a configuration and luminous flux in each in-focus state of the imaging lens of Example 4.

DESCRIPTION OF EMBODIMENTS

Figure 1:
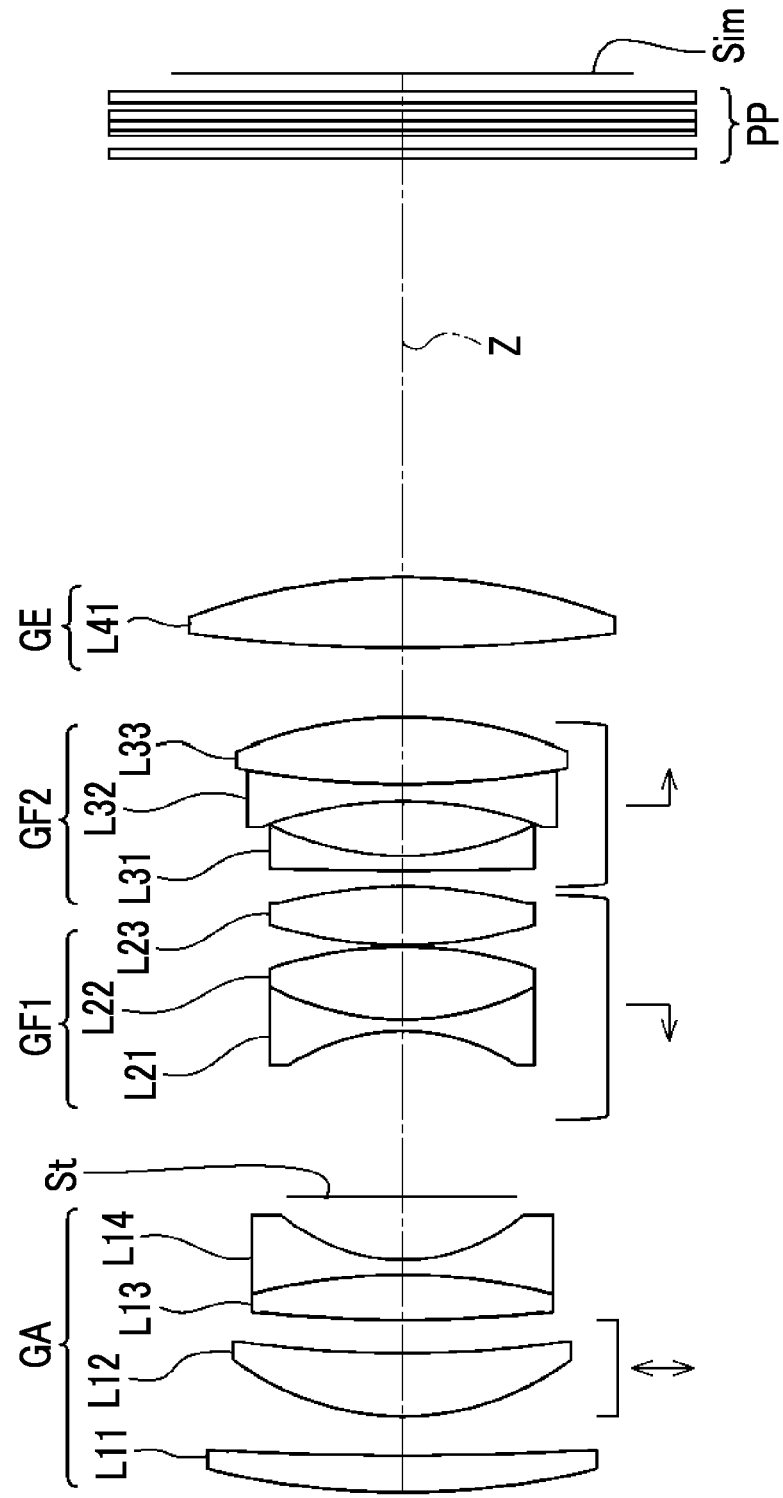
FIG. 1 is a cross-sectional view showing a configuration of an imaging lens according to an embodiment, which corresponds to the imaging lens of Example 1.

Hereinafter, embodiments of the present disclosure will be described with reference to the accompanying drawings. FIG. 1 shows a cross-sectional view of the configuration of the imaging lens according to the embodiment of the present disclosure in a state where the infinite distance object is in focus. FIG. 2 shows a cross-sectional view showing a configuration and luminous flux in each in-focus state of the imaging lens. FIG. 2 shows, as the luminous flux, on-axis luminous flux 2 and luminous flux at the maximum image height 3. FIG. 2 shows a state where the infinite distance object is in focus in the upper part labeled "infinity", and shows a state where the short range object at the object distance of 110 mm (millimeter) is in focus in the lower part labeled "110 mm". The object distance is a distance on the optical axis Z from the object to the lens surface closest to the object side in the imaging lens. In the present specification, an object of which an object distance is at infinity is referred to as an infinite distance object. The examples shown in FIGS. 1 and 2 correspond to the imaging lens of Example 1 to be described later. In FIGS. 1 and 2, the left side is the object side and the right side is the image side. Hereinafter, the imaging lens according to the embodiment of the present disclosure will be described mainly with reference to FIG. 1. In the following description, in order to avoid redundancy, the imaging lens of the present disclosure is also referred to as an imaging lens.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lenses of the present disclosure include, in order from a position closest to the object side to the image side along the optical axis Z: a front lens group GA that has a positive refractive power and remains stationary with respect to an image plane Sim during focusing; an aperture stop St that is disposed subsequent to the front lens group GA; a first focus lens group GF1 that has a positive refractive power; a second focus lens group GF2 that has a negative refractive power; and a final lens group GE that has a positive refractive power, is disposed closest to the image side, and remains stationary with respect to the image plane Sim during focusing. During focusing from an infinite distance object to a short range object, the first focus lens group GF1 and the second focus lens group GF2 move to increase a mutual distance therebetween. By adopting the above configuration, there is an advantage in suppressing fluctuations in various aberrations during focusing.

As an example, the imaging lens of FIG. 1 consists of, in order from the object side to the image side, a front lens group GA, an aperture stop St, a first focus lens group GF1, a second focus lens group GF2, and a final lens group GE. In the example of FIG. 1, the front lens group GA consists of four lenses L11 to L14 in order from the object side to the image side, the first focus lens group GF1 consists of three lenses L21 to L23 in order from the object side to the image side, the second focus lens group GF2 consists of three lenses L31 to L33 in order from the object side to the image side, and the final lens group GE consists of one lens L41. It should be noted that the aperture stop St of FIG. 1 does not indicate the size and shape, but indicates the position in the direction of the optical axis Z.

In the example of FIG. 1, there are only two lens groups included in the imaging lens that move during focusing. The lens groups are the first focus lens group GF1 and the second focus lens group GF2. With such a configuration, it is easy to achieve both suppressing fluctuations in various aberrations during focusing and reducing the size at the same time.

During focusing from the infinite distance object to the short range object, the first focus lens group GF1 moves toward the object side, and the second focus lens group GF2 moves toward the image side. The left and right arrows below the first focus lens group GF1 and the second focus lens group GF2 in FIG. 1 each indicate a direction of movement of a focus lens group that moves during focusing from the infinite distance object to the short range object. Further, in FIG. 2, the arrow between the upper and lower ends indicates a schematic movement locus of each focus lens group during focusing from the infinite distance object to the short range object.

In the imaging lens of the present disclosure, the second focus lens group GF2 may move linearly or non linearly with respect to the first focus lens group GF1 during focusing. In a case of moving linearly, there is a structural advantage since the moving mechanism can be simplified. In a case of moving non linearly, there is an advantage in obtaining a favorable image during focusing on a medium range object.

The lens surface closest to the object side in the first focus lens group GF1 is configured to be a concave surface. This configuration is advantageous for correcting field curvature.

Assuming that a curvature radius of the lens surface closest to the object side in the first focus lens group GF1 is RF1f, and a maximum image height is Ymax, it is preferable that the imaging lens satisfies Conditional Expression (1). By not allowing the corresponding value of Conditional Expression (1) to be equal to or less than the lower limit, there is an advantage in correcting field curvature. By not allowing the corresponding value of Conditional Expression (1) to be equal to or greater than the upper limit, there is an advantage in correcting astigmatism. In order to obtain more favorable characteristics, it is more preferable that the imaging lens satisfies Conditional Expression (1-1), and it is yet more preferable that the imaging lens satisfies Conditional Expression (1-2).

$$-2 < RF1f/Y\text{max} < -0.5 \quad (1)$$

$$-1.4 < RF1f/Y\text{max} < -0.8 \quad (1\text{-}1)$$

$$-1.2 < RF1f/Y\text{max} < -1 \quad (1\text{-}2)$$

The lens surface closest to the image side in the front lens group GA is configured to be a concave surface. This configuration is advantageous for correcting field curvature.

Assuming that a curvature radius of the lens surface closest to the image side in the front lens group GA is RAr, and a maximum image height is Ymax, it is preferable that the imaging lens satisfies Conditional Expression (2). By not allowing the corresponding value of Conditional Expression (2) to be equal to or less than the lower limit, there is an advantage in suppressing astigmatism from increasing. By not allowing the corresponding value of Conditional Expression (2) to be equal to or greater than the upper limit, there is an advantage in correcting field curvature. In order to obtain more favorable characteristics, it is more preferable that the imaging lens satisfies Conditional Expression (2-1), and it is yet more preferable that the imaging lens satisfies Conditional Expression (2-2).

$$0.7 < RAr/Y\text{max} < 1.3 \quad (2)$$

$$0.8 < RAr/Y\text{max} < 1.2 \quad (2\text{-}1)$$

$$0.85 < RAr/Y\text{max} < 1.1 \quad (2\text{-}2)$$

Assuming that a curvature radius of the lens surface closest to the image side in the front lens group GA is RAr, and a curvature radius of the lens surface closest to the object side in the first focus lens group GF1 is RF1f, it is preferable that the imaging lens satisfies Conditional Expression (3). By satisfying Conditional Expression (3), there is an advantage in correcting astigmatism. In order to obtain more favorable characteristics, it is more preferable that the imaging lens satisfies Conditional Expression (3-1), and it is yet more preferable that the imaging lens satisfies Conditional Expression (3-2).

$$-0.2 < (RAr+RF1f)/(RAr-RF1f) < 0 \quad (3)$$

$$-0.15 < (RAr+RF1f)/(RAr-RF1f) < -0.01 \quad (3\text{-}1)$$

$$-0.13 < (RAr+RF1f)/(RAr-RF1f) < -0.02 \quad (3\text{-}2)$$

It is preferable that the front lens group GA includes two or more positive lenses. In such a case, there is an advantage in correcting spherical aberration.

It is preferable that the lens component closest to the object side in the front lens group GA has a positive refractive power. In such a case, there is an advantage in correcting spherical aberration. In addition, in the present specification, one lens component means one single lens or one group of cemented lenses.

In the configuration in which the lens component closest to the object side in the front lens group GA has a positive refractive power, assuming that a maximum value of refractive indexes of all lenses included in the lens component closest to the object side in the front lens group GA at the d line is NAmax, it is preferable that the imaging lens satisfies Conditional Expression (4). By satisfying Conditional Expression (4), there is an advantage in correcting astigmatism. In order to obtain more favorable characteristics, it is more preferable that the imaging lens satisfies Conditional Expression (4-1), and it is yet more preferable that the imaging lens satisfies Conditional Expression (4-2).

$$1.7 < NA\text{max} < 2.1 \quad (4)$$

$$1.8 < NA\text{max} < 2.1 \quad (4\text{-}1)$$

$$1.9 < NA\text{max} < 2.1 \quad (4\text{-}2)$$

In the configuration in which the lens component closest to the object side in the front lens group GA has a positive refractive power, assuming that a minimum value of Abbe numbers of all positive lenses included in the lens component closest to the object side in the front lens group GA based on the d line is vApmin, it is preferable that the imaging lens satisfies Conditional Expression (5). By satisfying Conditional Expression (5), there is an advantage in correcting the primary chromatic aberration. In order to obtain more favorable characteristics, it is more preferable that the imaging lens satisfies Conditional Expression (5-1), and it is yet more preferable that the imaging lens satisfies Conditional Expression (5-2).

$$10 < vAp\text{min} < 40 \quad (5)$$

$$15 < vAp\text{min} < 35 \quad (5\text{-}1)$$

$$17 < vAp\text{min} < 30 \quad (5\text{-}2)$$

In the configuration in which the lens component closest to the object side in the front lens group GA has a positive refractive power, assuming that a maximum value of partial dispersion ratios of all the positive lenses included in the lens component closest to the object side in the front lens group GA between a g line and an F line is θApmax, it is preferable that the imaging lens satisfies Conditional Expression (6). By satisfying Conditional Expression (6), there is an advantage in correcting secondary chromatic aberration. In order to obtain more favorable characteristics, it is more preferable that the imaging lens satisfies Conditional Expression (6-1), and it is yet more preferable that the imaging lens satisfies Conditional Expression (6-2).

$$0.5 < \theta Ap\text{max} < 0.8 \quad (6)$$

$$0.57 < \theta Ap\text{max} < 0.75 \quad (6\text{-}1)$$

$$0.59 < \theta Ap\text{max} < 0.7 \quad (6\text{-}2)$$

In the configuration in which the lens component closest to the object side in the front lens group GA has a positive refractive power, it is preferable that the imaging lens satisfies Conditional Expressions (4), (5), and (6) at the same time. Further, in order to obtain more favorable characteristics, it is preferable that the imaging lens satisfies Conditional Expressions (4), (5), and (6) at the same time, and then it is preferable that the imaging lens satisfies at least one of Conditional Expression (4-1), (4-2), (5-1), (5-2), (6-1), or (6-2).

Assuming that a partial dispersion ratio of the positive lens included in the lens component closest to the object side in the front lens group GA between the g line and the F line is θAfsp, and an Abbe number of the positive lens included in the lens component closest to the object side in the front lens group GA based on the d line is νAfsp, it is preferable that at least one positive lens included in the lens component closest to the object side in the front lens group GA satisfies Conditional Expressions (18). By satisfying Conditional Expression (18), there is an advantage in maintaining favorable balance between secondary chromatic aberration and primary chromatic aberration. In order to obtain more favorable characteristics, it is more preferable that the imaging lens satisfies Conditional Expression (18-1), and it is yet more preferable that the imaging lens satisfies Conditional Expression (18-2).

$$0 < \theta Afsp - 0.64833 + 0.0018 \times \nu Afsp < 0.06 \quad (18)$$

$$0 < \theta Afsp - 0.64833 + 0.0018 \times \nu Afsp < 0.05 \quad (18\text{-}1)$$

$$0.003 < \theta Afsp - 0.64833 + 0.0018 \times \nu Afsp < 0.045 \quad (18\text{-}2)$$

The lens component closest to the object side in the front lens group GA may be configured to be a single lens having a positive refractive power. In such a case, there is an advantage in shortening the total length of the lens system. In a case where the lens component closest to the object side in the front lens group GA is a single lens having a positive refractive power, it is preferable that the single lens is a meniscus lens of which the object side surface is a convex surface. In such a case, there is an advantage in correcting astigmatism.

In the configuration in which the lens component closest to the object side in the front lens group GA is a single lens having a positive refractive power, assuming that a curvature radius of the object side surface of the single lens is Rf, and a curvature radius of the image side surface of the single lens is Rr, it is preferable that the imaging lens satisfies Conditional Expression (45). By satisfying Conditional Expression (45), there is an advantage in correcting astigmatism. In order to obtain more favorable characteristics, it is more preferable that the imaging lens satisfies Conditional Expression (45-1), and it is yet more preferable that the imaging lens satisfies Conditional Expression (45-2).

$$1 < (Rr+Rf)/(Rr-Rf) < 3 \quad (45)$$

$$1.2 < (Rr+Rf)/(Rr-Rf) < 2.8 \quad (45\text{-}1)$$

$$1.55 < (Rr+Rf)/(Rr-Rf) < 2.1 \quad (45\text{-}2)$$

The lens component closest to the object side in the front lens group GA may be configured to be a cemented lens. In such a case, there is an advantage in correcting lateral chromatic aberration. In a case where the lens component closest to the object side in the front lens group GA is a cemented lens, it is preferable that the cemented lens includes a negative lens and a positive lens successively in order from the position closest to the object side. In such a case, there is an advantage in correcting lateral chromatic aberration.

In the configuration in which the lens component closest to the object side in the front lens group GA is a cemented lens and the cemented lens includes a negative lens and a positive lens successively in order from the position closest to the object side, assuming that the Abbe number of the positive lens based on the d line is νAfp and the Abbe number of the negative lens based on the d line is νAfn, it is preferable that the imaging lens satisfies Conditional Expression (46). By not allowing the corresponding value of Conditional Expression (46) to be equal to or less than the lower limit, there is an advantage in correcting primary chromatic aberration. By not allowing the corresponding value of Conditional Expression (46) to be equal to or greater than the upper limit, there is an advantage in correcting secondary chromatic aberration. In order to obtain more favorable characteristics, it is more preferable that the imaging lens satisfies Conditional Expression (46-1), and it is yet more preferable that the imaging lens satisfies Conditional Expression (46-2).

$$-45 < \nu Afp - \nu Afn < -20 \quad (46)$$

$$-40 < \nu Afp - \nu Afn < -25 \quad (46\text{-}1)$$

$$-36 < \nu Afp - \nu Afn < -30 \quad (46\text{-}2)$$

In the configuration in which the lens component closest to the object side in the front lens group GA is a cemented lens and the cemented lens includes a negative lens and a positive lens successively in order from the position closest to the object side, assuming that a partial dispersion ratio of the positive lens between the g line and the F line is θAfp and a partial dispersion ratio of the negative lens between the g line and the F line is θAfn, it is preferable that the imaging lens satisfies Conditional Expression (47). By not allowing the corresponding value of Conditional Expression (47) to be equal to or less than the lower limit, there is an advantage in correcting primary chromatic aberration. By not allowing the corresponding value of Conditional Expression (47) to be equal to or greater than the upper limit, there is an advantage in correcting secondary chromatic aberration. In order to obtain more favorable characteristics, it is more preferable that the imaging lens satisfies Conditional Expression (47-1), and it is yet more preferable that the imaging lens satisfies Conditional Expression (47-2).

$$0.03 < \theta Afn - \theta Afp < 0.1 \quad (47)$$

$$0.05 < \theta Afn - \theta Afp < 0.08 \quad (47\text{-}1)$$

$$0.06 < \theta Afn - \theta Afp < 0.07 \quad (47\text{-}2)$$

In the configuration in which the lens component closest to the object side in the front lens group GA is a cemented lens and the cemented lens includes a negative lens and a positive lens successively in order from the position closest to the object side, it is preferable that the imaging lens satisfies Conditional Expression (46) and (47) at the same time. Further, in order to obtain more favorable characteristics, it is preferable that the imaging lens satisfies Conditional Expressions (46), and (47) at the same time, and then it is preferable that the imaging lens satisfies at least one of Conditional Expression (46-1), (46-2), (47-1), or (47-2).

In the configuration in which the lens component closest to the object side in the front lens group GA is a cemented lens and the cemented lens includes a negative lens and a positive lens successively in order from the position closest to the object side, assuming that an Abbe number of the positive lens based on the d line is νAfp, an Abbe number of the negative lens based on the d line is νAfn, a partial dispersion ratio of the positive lens between the g line and the F line is θAfp, and a partial dispersion ratio of the negative lens between the g line and the F line is θAfn, it is preferable that the imaging lens satisfies Conditional Expression (48). By satisfying Conditional Expression (48), there is an advantage in maintaining favorable balance between secondary chromatic aberration and primary chromatic aberration. In order to obtain more favorable characteristics, it is more preferable that the imaging lens satisfies Conditional Expression (48-1), and it is yet more preferable that the imaging lens satisfies Conditional Expression (48-2).

$$-0.2<\theta Afp-\theta Afn+0.00163\times(\nu Afp-\nu Afn)<-0.05 \quad (48)$$

$$-0.18<\theta Afp-\theta Afn+0.00163\times(\nu Afp-\nu Afn)<-0.08 \quad (48\text{-}1)$$

$$-0.15<\theta Afp-\theta Afn+0.00163\times(\nu Afp-\nu Afn)<-0.1 \quad (48\text{-}2)$$

It is preferable that the front lens group GA includes a cemented lens closest to the image side and the cemented lens closest to the image side in the front lens group GA includes a negative lens and a positive lens successively in order from the position closest to the image side. In such a case, there is an advantage in correcting longitudinal chromatic aberration.

In the configuration in which the front lens group GA includes a cemented lens closest to the image side and the cemented lens includes a negative lens and a positive lens successively in order from the position closest to the image side, assuming that a refractive index of the positive lens at the d line is NArp and a refractive index of the negative lens at the d line is NArn, it is preferable that the imaging lens satisfies Conditional Expression (7). By satisfying Conditional Expression (7), there is an advantage in correcting high-order spherical aberration. In the present specification, the high-order in aberration means the fifth-order or higher. In order to obtain more favorable characteristics, it is more preferable that the imaging lens satisfies Conditional Expression (7-1), and it is yet more preferable that the imaging lens satisfies Conditional Expression (7-2).

$$0<NArp-NArn<0.15 \quad (7)$$

$$0.01<NArp-NArn<0.12 \quad (7\text{-}1)$$

$$0.02<NArp-NArn<0.11 \quad (7\text{-}2)$$

In the configuration in which the front lens group GA includes a cemented lens closest to the image side and the cemented lens includes a negative lens and a positive lens successively in order from the position closest to the image side, assuming that an Abbe number of the positive lens based on the d line is νArp and an Abbe number of the negative lens based on the d line is νArn, it is preferable that the imaging lens satisfies Conditional Expression (8). By not allowing the corresponding value of Conditional Expression (8) to be equal to or less than the lower limit, there is an advantage in correcting primary chromatic aberration. By not allowing the corresponding value of Conditional Expression (8) to be equal to or greater than the upper limit, there is an advantage in correcting secondary chromatic aberration. In order to obtain more favorable characteristics, it is more preferable that the imaging lens satisfies Conditional Expression (8-1), and it is yet more preferable that the imaging lens satisfies Conditional Expression (8-2).

$$5<\nu Arp-\nu Arn<40 \quad (8)$$

$$8<\nu Arp-\nu Arn<30 \quad (8\text{-}1)$$

$$10<\nu Arp-\nu Arn<25 \quad (8\text{-}2)$$

In the configuration in which the front lens group GA includes a cemented lens closest to the image side and the cemented lens includes a negative lens and a positive lens successively in order from the position closest to the image side, assuming that a partial dispersion of the positive lens between the g line and the F line is θArp and a partial dispersion ratio of the negative lens between the g line and the F line is θArn, it is preferable that the imaging lens satisfies Conditional Expression (9). By not allowing the corresponding value of Conditional Expression (9) to be equal to or less than the lower limit, there is an advantage in correcting primary chromatic aberration. By not allowing the corresponding value of Conditional Expression (9) to be equal to or greater than the upper limit, there is an advantage in correcting secondary chromatic aberration. In order to obtain more favorable characteristics, it is more preferable that the imaging lens satisfies Conditional Expression (9-1), and it is yet more preferable that the imaging lens satisfies Conditional Expression (9-2).

$$0.01<\theta Arn-\theta Arp<0.06 \quad (9)$$

$$0.016<\theta Arn-\theta Arp<0.05 \quad (9\text{-}1)$$

$$0.02<\theta Arn-\theta Arp<0.042 \quad (9\text{-}2)$$

In the configuration in which the front lens group GA includes a cemented lens closest to the image side and the cemented lens includes a negative lens and a positive lens successively in order from the position closest to the image side, it is preferable that the imaging lens satisfies Conditional Expressions (7), (8), and (9) at the same time. Further, in order to obtain more favorable characteristics, it is preferable that the imaging lens satisfies Conditional Expressions (7), (8), and (9) at the same time, and then it is preferable that the imaging lens satisfies at least one of Conditional Expression (7-1), (7-2), (8-1), (8-2), (9-1), or (9-2).

Assuming that a partial dispersion ratio of the positive lens included in the lens closest to the image side component of the front lens group GA between the g line and the F line is θArsp, a partial dispersion ratio of the negative lens included in the lens closest to the image side component of the front lens group GA between the g line and the F line is θArsn, an Abbe number of the positive lens included in the lens closest to the image side component of the front lens group GA based on the d line is νArsp, and an Abbe number of the negative lens included in the lens closest to the image side component of the front lens group GA based on the d line is νArsn, it is preferable that at least one positive lens and at least one negative lens included in the lens component closest to the object side in the front lens group GA satisfy Conditional Expressions (19). By satisfying Conditional Expression (19), there is an advantage in maintaining favorable balance between secondary chromatic aberration and primary chromatic aberration. In order to obtain more favorable characteristics, it is more preferable that the imaging lens satisfies Conditional Expression (19-1), and it is yet more preferable that the imaging lens satisfies Conditional Expression (19-2).

$$-0.01<\theta Arsp-\theta Arsn+0.00163\times(\nu Arsp-\nu Arsn)<0 \quad (19)$$

$$-0.009<\theta Arsp-\theta Arsn+0.00163\times(\nu Arsp-\nu Arsn)<0 \quad (19\text{-}1)$$

$$-0.008<\theta Arsp-\theta Arsn+0.00163\times(\nu Arsp-\nu Arsn)<0 \quad (19\text{-}2)$$

Assuming that a maximum value of the Abbe numbers of all the lenses included in the front lens group GA based on the d line is νGAmax, it is preferable that the imaging lens satisfies Conditional Expression (24). By not allowing the corresponding value of Conditional Expression (24) to be equal to or less than the lower limit, there is an advantage in correcting primary chromatic aberration. By not allowing the corresponding value of Conditional Expression (24) to be equal to or greater than the upper limit, it is possible to suppress the refractive index from becoming excessively low. As a result, there is an advantage in correcting spherical aberration. In order to obtain more favorable characteristics, it is more preferable that the imaging lens satisfies Conditional Expression (24-1), and it is yet more preferable that the imaging lens satisfies Conditional Expression (24-2).

$$70 < vGAmax < 120 \tag{24}$$

$$70 < vGAmax < 90 \tag{24-1}$$

$$70 < vGAmax < 80 \tag{24-2}$$

Assuming that a focal length of the imaging lens in a state where the infinite distance object is in focus is f, and a focal length of the front lens group GA is fA, it is preferable that the imaging lens satisfies Conditional Expression (10). By not allowing the corresponding value of Conditional Expression (10) to be equal to or less than the lower limit, there is an advantage in suppressing an increase in the diameter of the aperture stop St. By not allowing the corresponding value of Conditional Expression (10) to be equal to or greater than the upper limit, there is an advantage in maintaining an appropriate back focal length. In order to obtain more favorable characteristics, it is more preferable that the imaging lens satisfies Conditional Expression (10-1), and it is yet more preferable that the imaging lens satisfies Conditional Expression (10-2).

$$0.25 < f/fA < 0.8 \tag{10}$$

$$0.3 < f/fA < 0.7 \tag{10-1}$$

$$0.35 < f/fA < 0.62 \tag{10-2}$$

Assuming that a focal length of the imaging lens in a state where the infinite distance object is in focus is f, and a focal length of the first focus lens group GF1 is fF1, it is preferable that the imaging lens satisfies Conditional Expression (11). By not allowing the corresponding value of Conditional Expression (11) to be equal to or less than the lower limit, there is an advantage in suppressing the amount of movement of the first focus lens group GF1 during focusing. By not allowing the corresponding value of Conditional Expression (11) to be equal to or greater than the upper limit, there is an advantage in suppressing fluctuation in spherical aberration in a case where the object distance fluctuates. In order to obtain more favorable characteristics, it is more preferable that the imaging lens satisfies Conditional Expression (11-1), and it is yet more preferable that the imaging lens satisfies Conditional Expression (11-2).

$$1.8 < f/fF1 < 4 \tag{11}$$

$$2 < f/fF1 < 3.5 \tag{11-1}$$

$$2.2 < f/fF1 < 3 \tag{11-2}$$

Assuming that a focal length of the imaging lens in a state where the infinite distance object is in focus is f and a focal length of the second focus lens group GF2 is fF2, it is preferable that the imaging lens satisfies Conditional Expression (12). By not allowing the corresponding value of Conditional Expression (12) to be equal to or less than the lower limit, there is an advantage in achieving reduction in total length of the lens system. By not allowing the corresponding value of Conditional Expression (12) to be equal to or greater than the upper limit, there is an advantage in suppressing fluctuation in spherical aberration in a case where the object distance fluctuates. In order to obtain more favorable characteristics, it is more preferable that the imaging lens satisfies Conditional Expression (12-1), and it is yet more preferable that the imaging lens satisfies Conditional Expression (12-2).

$$-5 < f/fF2 < -1.4 \tag{12}$$

$$-3.5 < f/fF2 < -1.5 \tag{12-1}$$

$$-3.2 < f/fF2 < -1.6 \tag{12-2}$$

Assuming that a focal length of the first focus lens group GF1 is fF1 and a focal length of the second focus lens group GF2 is fF2, it is preferable that the imaging lens satisfies Conditional Expression (13). By not allowing the corresponding value of Conditional Expression (13) to be equal to or less than the lower limit, there is an advantage in suppressing fluctuation in astigmatism in a case where the object distance fluctuates. By not allowing the corresponding value of Conditional Expression (13) to be equal to or greater than the upper limit, there is an advantage in suppressing fluctuation in spherical aberration in a case where the object distance fluctuates. In order to obtain more favorable characteristics, it is more preferable that the imaging lens satisfies Conditional Expression (13-1), and it is yet more preferable that the imaging lens satisfies Conditional Expression (13-2).

$$-1.55 < fF1/fF2 < -0.4 \tag{13}$$

$$-1.5 < fF1/fF2 < -0.48 \tag{13-1}$$

$$-1.45 < fF1/fF2 < -0.6 \tag{13-2}$$

Assuming that a focal length of the front lens group GA is fA and a focal length of the first focus lens group GF1 is fF1, it is preferable that the imaging lens satisfies Conditional Expression (25). By not allowing the corresponding value of Conditional Expression (25) to be equal to or less than the lower limit, there is an advantage in suppressing the amount of movement of the first focus lens group GF1 during focusing. By not allowing the corresponding value of Conditional Expression (25) to be equal to or greater than the upper limit, there is an advantage in suppressing fluctuation in spherical aberration in a case where the object distance fluctuates. In order to obtain more favorable characteristics, it is more preferable that the imaging lens satisfies Conditional Expression (25-1), and it is yet more preferable that the imaging lens satisfies Conditional Expression (25-2).

$$2.5 < fA/fF1 < 8.5 \tag{25}$$

$$3 < fA/fF1 < 8 \tag{25-1}$$

$$3.6 < fA/fF1 < 7.3 \tag{25-2}$$

Assuming that a focal length of the front lens group GA is fA and a focal length of the second focus lens group GF2 is fF2, it is preferable that the imaging lens satisfies Conditional Expression (30). By not allowing the corresponding value of Conditional Expression (30) to be equal to or less than the lower limit, there is an advantage in achieving reduction in total length of the lens system. By not allowing the corresponding value of Conditional Expression (30) to be equal to or greater than the upper limit, there is an advantage in suppressing fluctuation in spherical aberration in a case where the object distance fluctuates. In order to obtain more favorable characteristics, it is more preferable that the imaging lens satisfies Conditional Expression (30-1), and it is yet more preferable that the imaging lens satisfies Conditional Expression (30-2).

$$-7.5<fA/fF2<-2 \tag{30}$$

$$-7<fA/fF2<-2.5 \tag{30-1}$$

$$-6.5<fA/fF2<-3 \tag{30-2}$$

Assuming that a lateral magnification of the first focus lens group GF1 in a state where the infinite distance object is in focus is $\beta F1$, and a combined lateral magnification of all lenses closer to the image side than the first focus lens group GF1 in the state where the infinite distance object is in focus is $\beta F1r$, it is preferable that the imaging lens satisfies Conditional Expression (14). By not allowing the corresponding value of Conditional Expression (14) to be equal to or less than the lower limit, there is an advantage in suppressing the amount of movement of the first focus lens group GF1 during focusing. By not allowing the corresponding value of Conditional Expression (14) to be equal to or greater than the upper limit, there is an advantage in suppressing the tightening of the stopping accuracy of the first focus lens group GF1 in the focusing operation. In order to obtain more favorable characteristics, it is more preferable that the imaging lens satisfies Conditional Expression (14-1), and it is yet more preferable that the imaging lens satisfies Conditional Expression (14-2).

$$1.6<(1-\beta F1^2)\times\beta F1r^2<5.8 \tag{14}$$

$$2<(1-\beta F1^2)\times\beta F1r^2<4.8 \tag{14-1}$$

$$2.4<(1-\beta F1^2)\times\beta F1r^2<4 \tag{14-2}$$

Assuming that a lateral magnification of the second focus lens group GF2 in a state where the infinite distance object is in focus is $\beta F2$, and a combined lateral magnification of all lenses closer to the image side than the second focus lens group GF2 in the state where the infinite distance object is in focus is $\beta F2r$, it is preferable that the imaging lens satisfies Conditional Expression (15). By not allowing the corresponding value of Conditional Expression (15) to be equal to or less than the lower limit, there is an advantage in suppressing the tightening of the stopping accuracy of the second focus lens group GF2 in the focusing operation. By not allowing the corresponding value of Conditional Expression (15) to be equal to or greater than the upper limit, there is an advantage in suppressing the amount of movement of the second focus lens group GF2 during focusing. In order to obtain more favorable characteristics, it is more preferable that the imaging lens satisfies Conditional Expression (15-1), and it is yet more preferable that the imaging lens satisfies Conditional Expression (15-2).

$$-4.2<(1-\beta F2^2)\times\beta F2r^2<0 \tag{15}$$

$$-3.7<(1-\beta F2^2)\times\beta F2r^2<-0.4 \tag{15-1}$$

$$-3.1<(1-\beta F2^2)\times\beta F2r^2<-0.8 \tag{15-2}$$

Assuming that a lateral magnification of the first focus lens group GF1 in the state where the infinite distance object is in focus is $\beta F1$, a combined lateral magnification of all lenses closer to the image side than the first focus lens group GF1 in the state where the infinite distance object is in focus is $\beta F1r$, a lateral magnification of the second focus lens group GF2 in the state where the infinite distance object is in focus is $\beta F2$, and a combined lateral magnification of all lenses closer to the image side than the second focus lens group GF2 in the state where the infinite distance object is in focus is $\beta F2r$, it is preferable that the imaging lens satisfies Conditional Expression (16). By not allowing the corresponding value of Conditional Expression (16) to be equal to or less than the lower limit, there is an advantage in suppressing fluctuation in astigmatism in a case where the object distance fluctuates. By not allowing the corresponding value of Conditional Expression (16) to be equal to or greater than the upper limit, there is an advantage in suppressing fluctuation in spherical aberration in a case where the object distance fluctuates. In order to obtain more favorable characteristics, it is more preferable that the imaging lens satisfies Conditional Expression (16-1), and it is yet more preferable that the imaging lens satisfies Conditional Expression (16-2).

$$-5.5<\{(1-\beta F1^2)\times\beta F1r^2\}/\{(1-\beta F2^2)\times\beta F2r^2\}<-0.2 \tag{16}$$

$$-5<\{(1-\beta F1^2)\times\beta F1r^2\}/\{(1-\beta F2^2)\times\beta F2r^2\}<-0.5 \tag{16-1}$$

$$-4.8<\{(1-\beta F1^2)\times\beta F1r^2\}/\{(1-\beta F2^2)\times\beta F2r^2\}<-0.8 \tag{16-2}$$

It is preferable that the first focus lens group GF1 includes a cemented lens closest to the object side and the cemented lens closest to the object side in the first focus lens group GF1 includes a negative lens and a positive lens successively in order from the position closest to the object side. In such a case, there is an advantage in correcting longitudinal chromatic aberration.

In the configuration in which the first focus lens group GF1 includes a cemented lens closest to the object side and the cemented lens includes a negative lens and a positive lens successively in order from the position closest to the object side, assuming that a refractive index of the positive lens at the d line is NF1p and a refractive index of the negative lens at the d line is NF1n, it is preferable that the imaging lens satisfies Conditional Expression (26). By satisfying Conditional Expression (26), there is an advantage in correcting high-order spherical aberration. In order to obtain more favorable characteristics, it is more preferable that the imaging lens satisfies Conditional Expression (26-1), and it is yet more preferable that the imaging lens satisfies Conditional Expression (26-2).

$$0.1<NF1p-NF1n<0.3 \tag{26}$$

$$0.12<NF1p-NF1n<0.24 \tag{26-1}$$

$$0.135<NF1p-NF1n<0.2 \tag{26-2}$$

In the configuration in which the first focus lens group GF1 includes a cemented lens closest to the object side and the cemented lens includes a negative lens and a positive lens successively in order from the position closest to the object side, assuming that an Abbe number of the positive lens based on the d line is $\nu F1p$ and an Abbe number of the negative lens based on the d line is $\nu F1n$, it is preferable that the imaging lens satisfies Conditional Expression (27). By not allowing the corresponding value of Conditional Expression (27) to be equal to or less than the lower limit, there is an advantage in correcting primary chromatic aberration. By not allowing the corresponding value of Conditional Expression (27) to be equal to or greater than the upper limit, there is an advantage in correcting secondary chromatic aberration. In order to obtain more favorable characteristics, it is more preferable that the imaging lens satisfies Conditional Expression (27-1), and it is yet more preferable that the imaging lens satisfies Conditional Expression (27-2).

$$5<\nu F1p-\nu F1n<18 \tag{27}$$

$$6.5<\nu F1p-\nu F1n<16 \tag{27-1}$$

$$8<\nu F1p-\nu F1n<14 \tag{27-2}$$

In the configuration in which the first focus lens group GF1 includes a cemented lens closest to the object side and the cemented lens includes a negative lens and a positive lens successively in order from the position closest to the object side, assuming that a partial dispersion ratio of the positive lens between the g line and the F line is θF1p and a partial dispersion ratio of the negative lens between the g line and the F line is θF1n, it is preferable that the imaging lens satisfies Conditional Expression (28). By not allowing the corresponding value of Conditional Expression (28) to be equal to or less than the lower limit, there is an advantage in correcting primary chromatic aberration. By not allowing the corresponding value of Conditional Expression (28) to be equal to or greater than the upper limit, there is an advantage in correcting secondary chromatic aberration. In order to obtain more favorable characteristics, it is more preferable that the imaging lens satisfies Conditional Expression (28-1), and it is yet more preferable that the imaging lens satisfies Conditional Expression (28-2).

$$0.015 < \theta F1n - \theta F1p < 0.06 \quad (28)$$

$$0.02 < \theta F1n - \theta F1p < 0.05 \quad (28\text{-}1)$$

$$0.025 < \theta F1n - \theta F1p < 0.04 \quad (28\text{-}2)$$

In the configuration in which the first focus lens group GF1 includes a cemented lens closest to the object side and the cemented lens includes a negative lens and a positive lens successively in order from the position closest to the object side, it is preferable that the imaging lens satisfies Conditional Expressions (26), (27), and (28) at the same time. Further, in order to obtain more favorable characteristics, it is preferable that the imaging lens satisfies Conditional Expressions (26), (27), and (28) at the same time, and then it is preferable that the imaging lens satisfies at least one of Conditional Expression (26-1), (26-2), (27-1), (27-2), (28-1), or (28-2).

In the configuration in which the first focus lens group GF1 includes a cemented lens closest to the object side and the cemented lens includes a negative lens and a positive lens successively in order from the position closest to the object side, assuming that a partial dispersion ratio of the positive lens between the g line and the F line is θF1p, a partial dispersion ratio of the negative lens between the g line and the F line is θF1n, an Abbe number of the positive lens based on the d line is vF1p, and an Abbe number of the negative lens based on the d line is vF1n, it is preferable that the imaging lens satisfies Conditional Expression (29). By satisfying Conditional Expression (29), there is an advantage in maintaining favorable balance between secondary chromatic aberration and primary chromatic aberration. In order to obtain more favorable characteristics, it is more preferable that the imaging lens satisfies Conditional Expression (29-1), and it is yet more preferable that the imaging lens satisfies Conditional Expression (29-2).

$$-0.024 < \theta F1p - \theta F1n + 0.00163 \times (vF1p - vF1n) < -0.008 \quad (29)$$

$$-0.02 < \theta F1p - \theta F1n + 0.00163 \times (vF1p - vF1n) < -0.01 \quad (29\text{-}1)$$

$$-0.017 < \theta F1p - \theta F1n + 0.00163 \times (vF1p - vF1n) < -0.012 \quad (29\text{-}2)$$

It is preferable that the first focus lens group GF1 includes at least one aspheric lens. In such a case, there is an advantage in correcting spherical aberration. For example, the lens closest to the image side in the first focus lens group GF1 may be configured to be an aspheric lens. In such a case, there is an advantage in suppressing fluctuation in spherical aberration in a case where the object distance fluctuates.

The first focus lens group GF1 may be configured to include a cemented lens and a single lens having a positive refractive power. In such a case, there is an advantage in suppressing fluctuation in longitudinal chromatic aberration and fluctuation in spherical aberration in a case where the object distance fluctuates.

It is preferable that the first focus lens group GF1 is disposed subsequent to the aperture stop St. In such a case, there is an advantage in suppressing fluctuation in astigmatism during focusing.

It is preferable that the second focus lens group GF2 includes a cemented lens in which a negative lens and a positive lens are cemented in order from the object side. In such a case, there is an advantage in correcting lateral chromatic aberration.

It is preferable that the second focus lens group GF2 includes a cemented lens closest to the image side and the cemented lens closest to the image side in the second focus lens group GF2 includes a positive lens and a negative lens successively in order from the position closest to the image side. In such a case, there is an advantage in correcting lateral chromatic aberration.

In the configuration in which the second focus lens group GF2 includes a cemented lens closest to the image side and the cemented lens includes a positive lens and a negative lens successively in order from the position closest to the image side, assuming that a refractive index of the positive lens at the d line is NF2p and a refractive index of the negative lens at the d line is NF2n, it is preferable that the imaging lens satisfies Conditional Expression (31). By satisfying Conditional Expression (31), there is an advantage in suppressing fluctuation in astigmatism in a case where the object distance fluctuates. In order to obtain more favorable characteristics, it is more preferable that the imaging lens satisfies Conditional Expression (31-1), and it is yet more preferable that the imaging lens satisfies Conditional Expression (31-2).

$$-0.5 < NF2p - NF2n < -0.1 \quad (31)$$

$$-0.42 < NF2p - NF2n < -0.15 \quad (31\text{-}1)$$

$$-0.38 < NF2p - NF2n < -0.2 \quad (31\text{-}2)$$

In the configuration in which the second focus lens group GF2 includes a cemented lens closest to the image side and the cemented lens includes a positive lens and a negative lens successively in order from the position closest to the image side, assuming that an Abbe number of the positive lens based on the d line is vF2p and an Abbe number of the negative lens based on the d line is vF2n, it is preferable that the imaging lens satisfies Conditional Expression (32). By not allowing the corresponding value of Conditional Expression (32) to be equal to or less than the lower limit, there is an advantage in correcting primary chromatic aberration. By not allowing the corresponding value of Conditional Expression (32) to be equal to or greater than the upper limit, there is an advantage in correcting secondary chromatic aberration. In order to obtain more favorable characteristics, it is more preferable that the imaging lens satisfies Conditional Expression (32-1), and it is yet more preferable that the imaging lens satisfies Conditional Expression (32-2).

$$10 < vF2p - vF2n < 70 \quad (32)$$

$$24 < vF2p - vF2n < 62 \quad (32\text{-}1)$$

$$28 < vF2p - vF2n < 55 \quad (32\text{-}2)$$

In the configuration in which the second focus lens group GF2 includes a cemented lens closest to the image side and the cemented lens includes a positive lens and a negative lens successively in order from the position closest to the image side, assuming that a partial dispersion ratio of the positive lens between the g line and the F line is θF2p and a partial dispersion ratio of the negative lens between the g line and the F line is θF2n, it is preferable that the imaging lens satisfies Conditional Expression (33). By not allowing the corresponding value of Conditional Expression (33) to be equal to or less than the lower limit, there is an advantage in correcting primary chromatic aberration. By not allowing the corresponding value of Conditional Expression (33) to be equal to or greater than the upper limit, there is an advantage in correcting secondary chromatic aberration. In order to obtain more favorable characteristics, it is more preferable that the imaging lens satisfies Conditional Expression (33-1), and it is yet more preferable that the imaging lens satisfies Conditional Expression (33-2).

$$0.01 < \theta F2n - \theta F2p < 0.15 \quad (33)$$

$$0.014 < \theta F2n - \theta F2p < 0.12 \quad (33\text{-}1)$$

$$0.017 < \theta F2n - \theta F2p < 0.1 \quad (33\text{-}2)$$

In the configuration in which the second focus lens group GF2 includes a cemented lens closest to the image side and the cemented lens includes a positive lens and a negative lens successively in order from the position closest to the image side, it is preferable that the imaging lens satisfies Conditional Expressions (31), (32), and (33) at the same time. Further, in order to obtain more favorable characteristics, it is preferable that the imaging lens satisfies Conditional Expressions (31), (32), and (33) at the same time, and then it is preferable that the imaging lens satisfies at least one of Conditional Expression (31-1), (31-2), (32-1), (32-2), (33-1), or (33-2).

In the configuration in which the second focus lens group GF2 includes a cemented lens closest to the image side and the cemented lens includes a positive lens and a negative lens successively in order from the position closest to the image side, assuming that a partial dispersion ratio of the positive lens between the g line and the F line is θF2p, a partial dispersion ratio of the negative lens between the g line and the F line is θF2n, an Abbe number of the positive lens based on the d line is vF2p, and an Abbe number of the negative lens based on the d line is vF2n, it is preferable that the imaging lens satisfies Conditional Expression (34). By satisfying Conditional Expression (34), there is an advantage in maintaining favorable balance between secondary chromatic aberration and primary chromatic aberration. In order to obtain more favorable characteristics, it is more preferable that the imaging lens satisfies Conditional Expression (34-1), and it is yet more preferable that the imaging lens satisfies Conditional Expression (34-2).

$$-0.015 < \theta F2p - \theta F2n + 0.00163 \times (vF2p - vF2n) < 0.042 \quad (34)$$

$$-0.012 < \theta F2p - \theta F2n + 0.00163 \times (vF2p - vF2n) < 0.037 \quad (34\text{-}1)$$

$$-0.01 < \theta F2p - \theta F2n + 0.00163 \times (vF2p - vF2n) < 0.031 \quad (34\text{-}1)$$

In the configuration in which the second focus lens group GF2 includes a cemented lens closest to the image side and the cemented lens includes a positive lens and a negative lens successively in order from the position closest to the image side, assuming that an Abbe number of the positive lens based on the d line is vF2p, it is preferable that the imaging lens satisfies Conditional Expression (35). By satisfying Conditional Expression (35), there is an advantage in correcting lateral chromatic aberration. In order to obtain more favorable characteristics, it is more preferable that the imaging lens satisfies Conditional Expression (35-1), and it is yet more preferable that the imaging lens satisfies Conditional Expression (35-2).

$$70 < vF2p < 120 \quad (35)$$

$$72 < vF2p < 80 \quad (35\text{-}1)$$

$$75 < vF2p < 76 \quad (35\text{-}2)$$

Assuming that a maximum value of the Abbe numbers of all the lenses included in the second focus lens group GF2 based on the d line is vGF2max, it is preferable that the imaging lens satisfies Conditional Expression (36). By satisfying Conditional Expression (36), there is an advantage in correcting lateral chromatic aberration. In order to obtain more favorable characteristics, it is more preferable that the imaging lens satisfies Conditional Expression (36-1), and it is yet more preferable that the imaging lens satisfies Conditional Expression (36-2).

$$70 < vGF2\text{max} < 120 \quad (36)$$

$$72 < vGF2\text{max} < 80 \quad (36\text{-}1)$$

$$75 < vGF2\text{max} < 76 \quad (36\text{-}2)$$

The second focus lens group GF2 may be configured to include a negative lens and a cemented lens. In such a case, there is an advantage in correcting lateral chromatic aberration and astigmatism. In such a case, it is preferable that the second focus lens group GF2 includes a negative lens and a cemented lens in order from the object side to the image side. In such a case, there is an advantage in correcting lateral chromatic aberration.

In the configuration in which the first focus lens group GF1 includes a cemented lens closest to the object side and the cemented lens includes a negative lens and a positive lens successively in order from the position closest to the object side, it is assumed that a refractive index of the positive lens at the d line is NF1p, a refractive index of the negative lens at the d line is NF1n. In the configuration in which the second focus lens group GF2 includes a cemented lens closest to the image side and the cemented lens includes a positive lens and a negative lens successively in order from the position closest to the image side, it is assumed that a refractive index of the positive lens at the d line is NF2p and a refractive index of the negative lens at the d line is NF2n. Under the assumptions, it is preferable that the imaging lens satisfies Conditional Expression (37). By satisfying Conditional Expression (37), there is an advantage in satisfactorily correcting various aberrations. In order to obtain more favorable characteristics, it is more preferable that the imaging lens satisfies Conditional Expression (37-1), and it is yet more preferable that the imaging lens satisfies Conditional Expression (37-2).

$$-1.5 < (NF1p - NF1n)/(NF2p - NF2n) < -0.25 \quad (37)$$

$$-0.1 < (NF1p - NF1n)/(NF2p - NF2n) < -0.3 \quad (37\text{-}1)$$

$$-0.85 < (NF1p - NF1n)/(NF2p - NF2n) < -0.35 \quad (37\text{-}2)$$

In a case of changing from a state where the infinite distance object is in focus to a state where the imaging magnification is −0.5 times, assuming that an amount of movement of the first focus lens group GF1 is DF1 and an amount of movement of the second focus lens group GF2 is DF2, it is preferable that the imaging lens satisfies Conditional Expression (38). By not allowing the corresponding value of Conditional Expression (38) to be equal to or less than the lower limit, there is an advantage in suppressing fluctuation in astigmatism in a case where the object distance fluctuates. By not allowing the corresponding value of Conditional Expression (38) to be equal to or greater than the upper limit, there is an advantage in suppressing fluctuation in spherical aberration in a case where the object distance fluctuates. In order to obtain more favorable characteristics, it is more preferable that the imaging lens satisfies Conditional Expression (38-1), and it is yet more preferable that the imaging lens satisfies Conditional Expression (38-2).

$$-5.5 < DF1/DF2 < -1 \tag{38}$$

$$-5 < DF1/DF2 < -1.6 \tag{38-1}$$

$$-4.2 < DF1/DF2 < -2 \tag{38-2}$$

In the present specification, the sign of the amount of movement of the first focus lens group GF1 is negative in a case where the lens group is moved to the object side, and the sign is positive in a case where the lens group is moved to the image side. It is the same for the sign of the amount of movement of the second focus lens group GF2.

In a case of changing from a state where the infinite distance object is in focus to a state where the imaging magnification is −0.5 times, assuming that the amount of movement of the first focus lens group GF1 is DF1 and a focal length of the first focus lens group GF1 is fF1, it is preferable that the imaging lens satisfies Conditional Expression (39). By not allowing the corresponding value of Conditional Expression (39) to be equal to or less than the lower limit, there is an advantage in achieving reduction in total length of the lens system. By not allowing the corresponding value of Conditional Expression (39) to be equal to or greater than the upper limit, there is an advantage in suppressing fluctuation in astigmatism in a case where the object distance fluctuates. In order to obtain more favorable characteristics, it is more preferable that the imaging lens satisfies Conditional Expression (39-1), and it is yet more preferable that the imaging lens satisfies Conditional Expression (39-2).

$$-0.45 < DF1/fF1 < -0.15 \tag{39}$$

$$-0.4 < DF1/fF1 < -0.2 \tag{39-1}$$

$$-0.34 < DF1/fF1 < -0.25 \tag{39-2}$$

In a case of changing from a state where the infinite distance object is in focus to a state where the imaging magnification is −0.5 times, assuming that the amount of movement of the second focus lens group GF2 is DF2 and a focal length of the second focus lens group GF2 is fF2, it is preferable that the imaging lens satisfies Conditional Expression (40). By not allowing the corresponding value of Conditional Expression (40) to be equal to or less than the lower limit, there is an advantage in achieving reduction in total length of the lens system. By not allowing the corresponding value of Conditional Expression (40) to be equal to or greater than the upper limit, there is an advantage in suppressing fluctuation in astigmatism in a case where the object distance fluctuates. In order to obtain more favorable characteristics, it is more preferable that the imaging lens satisfies Conditional Expression (40-1), and it is yet more preferable that the imaging lens satisfies Conditional Expression (40-2).

$$-0.18 < DF2/fF2 < -0.03 \tag{40}$$

$$-0.17 < DF2/fF2 < -0.04 \tag{40-1}$$

$$-0.162 < DF2/fF2 < -0.05 \tag{40-2}$$

In a case of changing from a state where the infinite distance object is in focus to a state where the imaging magnification is −0.5 times, assuming that an amount of movement of the first focus lens group GF1 is DF1 and the focal length of the imaging lens in a state where the infinite distance object is in focus is f, it is preferable that the imaging lens satisfies Conditional Expression (41). By not allowing the corresponding value of Conditional Expression (41) to be equal to or less than the lower limit, there is an advantage in achieving reduction in total length of the lens system. By not allowing the corresponding value of Conditional Expression (41) to be equal to or greater than the upper limit, there is an advantage in suppressing fluctuation in astigmatism in a case where the object distance fluctuates. In order to obtain more favorable characteristics, it is more preferable that the imaging lens satisfies Conditional Expression (41-1), and it is yet more preferable that the imaging lens satisfies Conditional Expression (41-2).

$$-0.25 < DF1/f < -0.05 \tag{41}$$

$$-0.18 < DF1/f < -0.09 \tag{41-1}$$

$$-0.15 < DF1/f < -0.1 \tag{41-2}$$

In a case of changing from a state where the infinite distance object is in focus to a state where the imaging magnification is −0.5 times, assuming that an amount of movement of the second focus lens group GF2 is DF2 and the focal length of the imaging lens in a state where the infinite distance object is in focus is f, it is preferable that the imaging lens satisfies Conditional Expression (42). By not allowing the corresponding value of Conditional Expression (42) to be equal to or less than the lower limit, there is an advantage in suppressing fluctuation in astigmatism in a case where the object distance fluctuates. By not allowing the corresponding value of Conditional Expression (42) to be equal to or greater than the upper limit, there is an advantage in shortening the total length of the lens system. In order to obtain more favorable characteristics, it is more preferable that the imaging lens satisfies Conditional Expression (42-1), and it is yet more preferable that the imaging lens satisfies Conditional Expression (42-2).

$$0.02 < DF2/f < 0.075 \tag{42}$$

$$0.027 < DF2/f < 0.065 \tag{42-1}$$

$$0.033 < DF2/f < 0.057 \tag{42-2}$$

Assuming that a focal length of the imaging lens in a state where the infinite distance object is in focus is f, and a focal length of the final lens group GE is fE, it is preferable that the imaging lens satisfies Conditional Expression (17). By not allowing the corresponding value of Conditional Expression (17) to be equal to or less than the lower limit, it is possible to prevent the positive refractive power of the final lens group GE from becoming excessively weak. As a result, it is possible to suppress the negative refractive power of the second focus lens group GF2 disposed near the final lens group GE from weakening. Therefore, the effect of the floating focus can be easily ensured. By not allowing the corresponding value of Conditional Expression (17) to be equal to or greater than the upper limit, there is an advantage in correcting lateral chromatic aberration and distortion. In order to obtain more favorable characteristics, it is more preferable that the imaging lens satisfies Conditional Expression (17-1), and it is yet more preferable that the imaging lens satisfies Conditional Expression (17-2).

$$1 < f/fE < 2.5 \quad (17)$$

$$1.3 < f/fE < 2.1 \quad (17\text{-}1)$$

$$1.6 < f/fE < 1.92 \quad (17\text{-}2)$$

Assuming that a refractive index of the positive lens included in the final lens group GE at the d line is NEp, an Abbe number of the positive lens included in the final lens group GE based on the d line is vEp, and a partial dispersion ratio of the positive lens included in the final lens group GE between the g line and the F lines is θEp, it is preferable that at least one positive lens included in the final lens group GE satisfies Conditional Expressions (20), (21), and (22) at the same time. By satisfying Conditional Expression (20), there is an advantage in correcting astigmatism. By satisfying Conditional Expression (21), there is an advantage in correcting the primary chromatic aberration. By satisfying Conditional Expression (22), there is an advantage in correcting secondary chromatic aberration. Further, in order to obtain more favorable characteristics, it is preferable that at least one positive lens included in the final lens group GE satisfies Conditional Expressions (20), (21), and (22) at the same time, and then satisfies at least one of Conditional Expression (20-1), (20-2), (21-1), (21-2), (22-1), or (22-2).

$$1.8 < NEp < 2.1 \quad (20)$$

$$1.85 < NEp < 2.1 \quad (20\text{-}1)$$

$$1.9 < NEp < 2.1 \quad (20\text{-}2)$$

$$10 < vEp < 30 \quad (21)$$

$$15 < vEp < 25 \quad (21\text{-}1)$$

$$16 < vEp < 21 \quad (21\text{-}2)$$

$$0.4 < \theta Ep < 0.9 \quad (22)$$

$$0.5 < \theta Ep < 0.8 \quad (22\text{-}1)$$

$$0.6 < \theta Ep < 0.7 \quad (22\text{-}2)$$

Assuming that a partial dispersion ratio of the positive lens included in the final lens group GE between the g line and the F line is θEp and an Abbe number of the positive lens included in the final lens group GE based on the d line is vEp, it is preferable that at least one positive lens included in the final lens group GE satisfies Conditional Expression (23). By satisfying Conditional Expression (23), there is an advantage in maintaining favorable balance between secondary chromatic aberration and primary chromatic aberration. In order to obtain more favorable characteristics, it is more preferable that at least one positive lens included in the final lens group GE satisfies Conditional Expression (23-1), and it is yet more preferable that the lens satisfies Conditional Expression (23-2).

$$0.02 < \theta Ep - 0.64833 + 0.0018 \times vEp < 0.07 \quad (23)$$

$$0.025 < \theta Ep - 0.64833 + 0.0018 \times vEp < 0.06 \quad (23\text{-}1)$$

$$0.028 < \theta Ep - 0.64833 + 0.0018 \times vEp < 0.05 \quad (23\text{-}2)$$

Assuming that a focal length of the front lens group GA is fA and a focal length of the final lens group GE is fE, it is preferable that the imaging lens satisfies Conditional Expression (43). By satisfying Conditional Expression (43), there is an advantage in maintaining favorable balance between lateral chromatic aberration and distortion. In order to obtain more favorable characteristics, it is more preferable that the imaging lens satisfies Conditional Expression (43-1), and it is yet more preferable that the imaging lens satisfies Conditional Expression (43-2).

$$2 < fA/fE < 7 \quad (43)$$

$$2.5 < fA/fE < 6 \quad (43\text{-}1)$$

$$2.95 < fA/fE < 5 \quad (43\text{-}2)$$

Assuming that a focal length of the imaging lens in the state where the infinite distance object is in focus is f and a combined focal length from the front lens group GA in the state where the infinite distance object is in focus to the lens group disposed adjacent to the final lens group GE on the object side of the final lens group GE is fexE, it is preferable that the imaging lens satisfies Conditional Expression (44). The fexE is a focal length of the optical system excluding the final lens group GE from the imaging lens in a state where the infinite distance object is in focus. In the imaging lens of the example of FIG. 1, the combined focal length of the front lens group GA, the first focus lens group GF1, and the second focus lens group GF2 in the state where the infinite distance object is in focus is fexE. By satisfying Conditional Expression (44), there is an advantage in suppressing fluctuation in spherical aberration in a case where the object distance fluctuates. In order to obtain more favorable characteristics, it is more preferable that the imaging lens satisfies Conditional Expression (44-1), and it is yet more preferable that the imaging lens satisfies Conditional Expression (44-2).

$$-0.2 < f/fexE < 0.25 \quad (44)$$

$$-0.05 < f/fexE < 0.2 \quad (44\text{-}1)$$

$$-0.01 < f/fexE < 0.17 \quad (44\text{-}2)$$

It is preferable that the lens component closest to the image side in the final lens group GE has a positive refractive power. In such a case, there is an advantage in correcting astigmatism.

The lens component closest to the image side in the final lens group GE may be configured to be a single lens having a positive refractive power. In such a case, there is an advantage in shortening the total length of the lens system.

The lens component closest to the image side in the final lens group GE may be configured to be a cemented lens. In such a case, there is an advantage in correcting lateral chromatic aberration. In a case where the lens component closest to the image side in the final lens group GE is a cemented lens, it is preferable that the cemented lens includes a positive lens and a negative lens successively in order from the position closest to the image side. In such a case, there is an advantage in correcting lateral chromatic aberration.

In the configuration in which the lens component closest to the image side in the final lens group GE is a cemented lens and the cemented lens includes a positive lens and a negative lens successively in order from the position closest to the image side, assuming that the Abbe number of the positive lens based on the d line is vErp and the Abbe number of the negative lens based on the d line is vErn, it is preferable that the imaging lens satisfies Conditional Expression (49). By not allowing the corresponding value of Conditional Expression (49) to be equal to or less than the lower limit, there is an advantage in correcting primary chromatic aberration. By not allowing the corresponding value of Conditional Expression (49) to be equal to or greater than the upper limit, there is an advantage in correcting secondary chromatic aberration. In order to obtain more favorable characteristics, it is more preferable that the imaging lens satisfies Conditional Expression (49-1), and it is yet more preferable that the imaging lens satisfies Conditional Expression (49-2).

$$-45 < \nu Erp - \nu Ern < -20 \quad (49)$$

$$-40 < \nu Erp - \nu Ern < -25 \quad (49\text{-}1)$$

$$-35 < \nu Erp - \nu Ern < -30 \quad (49\text{-}2)$$

In the configuration in which the lens component closest to the image side in the final lens group GE is a cemented lens and the cemented lens includes a positive lens and a negative lens successively in order from the position closest to the image side, assuming that a partial dispersion ratio of the positive lens between the g line and the F line is θErp and a partial dispersion ratio of the negative lens between the g line and the F line is θErn, it is preferable that the imaging lens satisfies Conditional Expression (50). By not allowing the corresponding value of Conditional Expression (50) to be equal to or less than the lower limit, there is an advantage in correcting primary chromatic aberration. By not allowing the corresponding value of Conditional Expression (50) to be equal to or greater than the upper limit, there is an advantage in correcting secondary chromatic aberration. In order to obtain more favorable characteristics, it is more preferable that the imaging lens satisfies Conditional Expression (50-1), and it is yet more preferable that the imaging lens satisfies Conditional Expression (50-2).

$$-0.2 < \theta Ern - \theta Erp < 0 \quad (50)$$

$$-0.15 < \theta Ern - \theta Erp < -0.05 \quad (50\text{-}1)$$

$$-0.1 < \theta Ern - \theta Erp < -0.09 \quad (50\text{-}2)$$

In the configuration in which the lens component closest to the image side in the final lens group GE is a cemented lens and the cemented lens includes a positive lens and a negative lens successively in order from the position closest to the image side, it is preferable that the imaging lens satisfies Conditional Expression (49) and (50) at the same time. Further, in order to obtain more favorable characteristics, it is preferable that the imaging lens satisfies Conditional Expressions (49), and (50) at the same time, and then it is preferable that the imaging lens satisfies at least one of Conditional Expression (49-1), (49-2), (50-1), or (50-2).

The final lens group GE may be configured to consist of one lens component. In such a case, there is an advantage in shortening the total length of the lens system.

The final lens group GE may be configured to consist of a single lens having a positive refractive power. In such a case, there is an advantage in shortening the total length of the lens system.

It should be noted that FIG. 1 shows an example in which the first focus lens group GF1 and the second focus lens group GF2 are disposed adjacent to each other. However, as shown in Examples to be described later, the imaging lens of the present disclosure may be configured to include a medium lens group GM remaining stationary during focusing between the first focus lens group GF1 and the second focus lens group GF2. In such a case, there is an advantage in suppressing fluctuation in astigmatism during focusing.

It is preferable that the imaging lens includes a vibration-proof lens group that corrects image blur by moving in a direction intersecting the optical axis Z. It is preferable that the vibration-proof lens group is configured to consist of a part of any lens group remaining stationary during focusing or the entire lens group.

For example, the vibration-proof lens group may be configured to consist of any lens component included in the front lens group GA. In such a case, it is not necessary to increase the total length of the lens system or reduce the amount of movement of the focus lens group as compared with the case where the vibration-proof lens group is formed by using the lens of the medium lens group GM. Therefore, there is an advantage in shortening the total length of the lens system or ensuring the amount of movement of the focus lens group.

More specifically, the vibration-proof lens group may be configured to consist of the second lens component from the object side of the front lens group GA, or may be configured to consist of the lens closest to the image side component of the front lens group GA. In such cases, there is an advantage in reducing the diameter of the vibration-proof lens group.

In a case where the imaging lens includes the above-mentioned medium lens group GM, the vibration-proof lens group may be configured to include the entire medium lens group GM. In such a case, there is an advantage in achieving aberration correction and weight reduction of the vibration-proof lens group as compared with the case where the vibration-proof lens group is formed by using the lens of the front lens group GA.

As an example, FIG. 1 shows a case where the vibration-proof lens group consists of the lens L12. The parentheses below the lens L12 in FIG. 1 and the double-headed arrow in the vertical direction indicate that the lens L12 constitutes a vibration-proof lens group.

Assuming that a lateral magnification of the vibration-proof lens group in the state where the infinite distance object is in focus is βIS and a combined lateral magnification of all the lenses closer to the image side than the vibration-proof lens group in the state where the infinite distance object is in focus is βISr, it is preferable that the imaging lens satisfies Conditional Expression (51). By not allowing the corresponding value of Conditional Expression (51) to be equal to or less than the lower limit, there is an advantage in suppressing the amount of movement of the vibration-proof lens group at the time of image blur correction. By not allowing the corresponding value of Conditional Expression (51) to be equal to or greater than the upper limit, it is possible to prevent the vibration-proof lens group from becoming excessively sensitive in the image blur correction operation. In order to obtain more favorable characteristics, it is more preferable that the imaging lens satisfies Conditional Expression (51-1), and it is yet more preferable that the imaging lens satisfies Conditional Expression (51-2).

$$0.5 < |(1-\beta IS) \times \beta ISr| < 2 \quad (51)$$

$$0.65 < |(1-\beta IS) \times \beta ISr| < 1.6 \quad (51\text{-}1)$$

$$0.75 < |(1-\beta IS) \times \beta ISr| < 1 \quad (51\text{-}2)$$

The example shown in FIG. 1 is an example of the imaging lens of the present disclosure. In the imaging lens of the present disclosure, the number of lenses constituting each lens group may be different from that in the example shown in FIG. 1. Specifically, each lens group can adopt, for example, the following configuration.

The front lens group GA can be configured to consist of four or five lenses. More specifically, the front lens group GA can be configured to consist of three positive lenses and one negative lens. In such a case, the front lens group GA can be configured to consist of positive lenses, which are two single lenses, and a cemented lens, in which a positive lens and a negative lens are cemented in order from the object side, in order from the object side to the image side. Alternatively, the front lens group GA can be configured to consist of three positive lenses and two negative lenses. In such a case, the front lens group GA can be configured to consist of, in order from the object side to the image side, a cemented lens in which a negative lens and a positive lens are cemented in order from the object side, a positive lens which is a single lens, and a cemented lens in which a positive lens and a negative lens are cemented in order from the object side.

The first focus lens group GF1 can be configured to consist of three lenses. The first focus lens group GF1 can be configured to consist of two positive lenses and one negative lens. More specifically, the first focus lens group GF1 can be configured to consist of, in order from the object side to the image side, a cemented lens, in which a negative lens and a positive lens are cemented in order from the object side, and a positive lens.

The medium lens group GM can be configured to consist of two lenses. The medium lens group GM can be configured to consist of one positive lens and one negative lens. The medium lens group GM can be configured to consist of a negative lens, which is a single lens, and a positive lens, which is a single lens, in order from the object side to the image side.

The second focus lens group GF2 can be configured to consist of three lenses. The second focus lens group GF2 can be configured to consist of one positive lens and two negative lenses. More specifically, the second focus lens group GF2 is configured to consist of, in order from the object side to the image side, a negative lens which is a single lens and a cemented lens in which a negative lens and a positive lens are cemented in order from the object side.

The final lens group GE can be configured to consist of one or two lenses. The final lens group GE can be configured to consist of one positive lens. Alternatively, the final lens group GE can be configured to consist of a cemented lens in which a negative lens and a positive lens are cemented in order from the object side.

The above-mentioned preferred configurations and available configurations including the configurations relating to Conditional Expressions may be any combination, and it is preferable to appropriately selectively adopt the configurations in accordance with required specification. In addition, the preferred configurations relating to Conditional Expressions are not limited to Conditional Expressions described in the form of the expression, and the lower limit and the upper limit are selected from the preferable, more preferable, and yet more preferable conditional expressions. Conditional Expressions may include all conditional expressions obtained through optional combinations.

For example, according to a preferred aspect of the present disclosure, an imaging lens includes, in order from a position closest to an object side to an image side: a front lens group GA that has a positive refractive power and remains stationary with respect to an image plane Sim during focusing; an aperture stop St that is disposed subsequent to the front lens group GA; a first focus lens group GF1 that has a positive refractive power; a second focus lens group GF2 that has a negative refractive power; and a final lens group GE that has a positive refractive power, is disposed closest to the image side, and remains stationary with respect to the image plane Sim during focusing. During focusing from an infinite distance object to a short range object, the first focus lens group GF1 and the second focus lens group GF2 move to increase a distance therebetween, a lens surface closest to the image side in the front lens group GA is a concave surface, and a lens surface closest to the object side in the first focus lens group GF1 is a concave surface.

Next, examples of the imaging lens of the present disclosure will be described, with reference to the drawings. The reference numerals attached to the lenses in the cross-sectional views of each example are used independently for each example in order to avoid complication of description due to an increase in the number of digits of the reference numerals. Therefore, even in a case where common reference numerals are given in the drawings of different examples, they do not necessarily have a common configuration.

Example 1

FIG. 1 is a cross-sectional view showing a configuration of an imaging lens of Example 1, and an illustration method and a configuration thereof are as described above. Therefore, description is partially not repeated herein. The imaging lens of Example 1 consists of, in order from the object side to the image side, a front lens group GA having a positive refractive power, an aperture stop St, a first focus lens group GF1 having a positive refractive power, a second focus lens group GF2 having a negative refractive power, and a final lens group GE having a positive refractive power. During focusing from the infinite distance object to the shortest range object, the first focus lens group GF1 moves toward the object side along the optical axis Z, the second focus lens group GF2 moves toward the image side along the optical axis Z, and the other lens group and the aperture stop St remain stationary with respect to the image plane Sim.

The front lens group GA consists of a positive lens L11, a positive lens L12, a positive lens L13, and a negative lens L14 in order from the object side to the image side. The lens L13 and the lens L14 are cemented to each other. The first focus lens group GF1 consists of a negative lens L21, a positive lens L22, and a positive lens L23 in order from the object side to the image side. The lens L21 and the lens L22 are cemented to each other. The second focus lens group GF2 consists of a negative lens L31, a negative lens L32, and a positive lens L33 in order from the object side to the image side. The lens L32 and the lens L33 are cemented to each other. The final lens group GE consists of a positive lens L41. FIG. 1 shows an example in which the vibration-proof lens group consists of the lens L12.

The vibration-proof lens group shown in FIG. 1 is an example. As described above, the vibration-proof lens group can be configured to consist of a part of any lens group remaining stationary during focusing or the entire lens group. Therefore, in the imaging lens of Example 1, the vibration-proof lens group can be configured to consist of one or more lenses different from the lens L12. This point is the same in all the examples to be described later. In all the examples, the vibration-proof lens group shown in each cross-sectional view is an example, and it is possible for the vibration-proof lens group to be composed of one or more lenses different from those shown in the drawings.

Regarding the imaging lens of Example 1, Table 1 shows basic lens data, Table 2 shows specification and variable surface distance, and Table 3 shows aspheric surface coefficients thereof. In the tables, the column of Sn shows surface numbers. The surface closest to the object side is the first surface, and the surface numbers increase one by one toward the image side. The column of R shows curvature radii of the respective surfaces. The column of D shows surface distances on the optical axis Z between the respective surfaces and the surfaces adjacent to the image side. The column of Nd shows refractive indices of the respective components at the d line. The column of νd shows Abbe numbers of the respective components based on the d line. The column of θgF shows partial dispersion ratios of the respective components between the g line and the F line. For lenses, the respective columns of material names show material names of the respective lenses and names of manufacturers thereof with periods interposed therebetween. The table outlines the names of the manufacturers as described below. "HOYA" is HOYA Corporation. "CDGM" is Chengdu Gwangmyeong Photoelectric Crotch Co., Ltd. "OHARA" is OHARA Corporation. "HIKARI" is Hikari Glass Co., Ltd. "SUMITA" is Sumita Optical Glass, Inc.

In Table 1, the sign of the curvature radius of the surface convex toward the object side is positive and the sign of the curvature radius of the surface convex toward the image side is negative. Table 1 also shows the aperture stop St and the optical member PP. In a place of a surface number of a surface corresponding to the aperture stop St, the surface number and a term of (St) are noted. A value at the bottom place of d in Table 1 indicates a distance between the image plane Sim and the surface closest to the image side in the table. In Table 1, the symbol DD[ ] is used for each variable surface distance during focusing, and the object side surface number of the distance is given in [ ] and is noted in the column D.

Table 2 shows values of the focal length f, the open F number FNo., the maximum total angle of view 2ω, the maximum image height Ymax, and the variable surface distance. (°) in the place of 2ω indicates that the unit thereof is a degree. In Table 2, the column labeled "Infinity" shows values in a state where the infinite distance object is in focus, and the column labeled "short range" shows values in a state where the object at the object distance of 110 mm (millimeters) is in focus. The values shown in Table 2 are based on the d line.

In Table 1, the reference sign * is attached to surface numbers of aspheric surfaces, and numerical values of the paraxial curvature radius are written into the column of the curvature radius of the aspheric surface. In Table 3, the row of Sn shows surface numbers of the aspheric surfaces, and the rows of KA and Am (m=3, 4, 5, ..., 20) show numerical values of the aspheric surface coefficients for each aspheric surface. The "E±n" (n: an integer) in numerical values of the aspheric surface coefficients of Table 3 indicates "×10$^{±n}$". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here, Zd is an aspheric surface depth (a length of a perpendicular from a point on an aspheric surface at height h to a plane that is perpendicular to the optical axis Z and contacts with the vertex of the aspheric surface), h is a height (a distance from the optical axis Z to the lens surface), C is an inverse of a paraxial curvature radius, and KA and Am are aspheric surface coefficients, and Σ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | νd | θgF | Material |
|---|---|---|---|---|---|---|
| 1 | 61.81147 | 2.283 | 2.00069 | 25.46 | 0.61364 | TAFD40-W.HOYA |
| 2 | 263.23074 | 2.403 | | | | |
| 3 | 20.68621 | 3.899 | 1.55032 | 75.50 | 0.54001 | FCD705.HOYA |
| 4 | 85.96905 | 2.042 | | | | |
| 5 | 109.46074 | 2.790 | 1.65113 | 55.90 | 0.54765 | H-LAK10.CDGM |
| 6 | −44.58728 | 0.910 | 1.57501 | 41.51 | 0.57711 | H-QF3.CDGM |
| 7 | 13.63993 | 3.895 | | | | |
| 8(St) | ∞ | DD[8] | | | | |
| 9 | −15.39340 | 0.710 | 1.64769 | 33.84 | 0.59227 | H-ZF1.CDGM |
| 10 | 21.10022 | 4.492 | 1.78800 | 47.49 | 0.55387 | TAF4.HOYA |
| 11 | −30.72528 | 0.100 | | | | |
| *12 | 32.60361 | 3.606 | 1.69680 | 55.46 | 0.54262 | M-LAC14.HOYA |
| *13 | −32.63135 | DD[13] | | | | |
| 14 | 386.48999 | 0.900 | 1.95375 | 32.32 | 0.59015 | TAFD45.HOYA |
| 15 | 22.22440 | 3.361 | | | | |
| 16 | −29.69154 | 1.056 | 1.76182 | 26.61 | 0.61184 | H-ZF12.CDGM |
| 17 | 65.10406 | 4.073 | 1.55032 | 75.50 | 0.54001 | FCD705.HOYA |
| 18 | −31.31171 | DD[18] | | | | |
| 19 | 120.30971 | 4.350 | 1.92286 | 18.90 | 0.64960 | S-NPH2.OHARA |
| 20 | −43.70988 | 25.808 | | | | |
| 21 | ∞ | 0.600 | 1.54763 | 54.98 | 0.55247 | |
| 22 | ∞ | 0.810 | | | | |
| 23 | ∞ | 0.350 | 1.54763 | 54.98 | 0.55247 | |
| 24 | ∞ | 0.600 | 1.54763 | 54.98 | 0.55247 | |
| 25 | ∞ | 0.600 | 1.54763 | 54.98 | 0.55247 | |
| 26 | ∞ | 0.500 | | | | |
| 27 | ∞ | 0.700 | 1.49784 | 54.98 | 0.55000 | |
| 28 | ∞ | 1.108 | | | | |

TABLE 2

| | Example 1 | |
|---|---|---|
| Object distance | Infinity | 110 mm |
| f | 58.210 | 48.242 |
| FNo. | 2.5 | 3.2 |
| 2ω(°) | 26.64 | 22.62 |
| Ymax | 14.2 | 14.2 |
| DD[8] | 10.231 | 3.464 |
| DD[13] | 0.999 | 11.035 |
| DD[18] | 4.263 | 0.994 |

TABLE 3

| Example 1Sn | 12 | 13 |
|---|---|---|
| KA | 1.0000000E+00 | 1.0000000E+00 |
| A3 | 0.0000000E+00 | 0.0000000E+00 |
| A4 | −1.1054839E−06 | 2.2508069E−05 |
| A5 | −8.0443840E−07 | −1.0945914E−06 |
| A6 | 1.9571228E−07 | 1.3669176E−07 |
| A7 | −3.5298860E−08 | −7.7151265E−09 |
| A8 | 2.8401432E−09 | 1.5244193E−10 |
| A9 | −6.5542372E−11 | −3.4339609E−11 |
| A10 | 1.9428458E−11 | 1.1893669E−11 |
| A11 | −2.6244872E−13 | 1.3662980E−12 |
| A12 | −1.4484915E−13 | −1.6728431E−13 |
| A13 | −2.9244454E−14 | −5.3177188E−14 |
| A14 | −4.4389100E−15 | −4.3329970E−15 |
| A15 | −3.3596121E−16 | 2.4313367E−15 |
| A16 | 3.0508541E−16 | −1.8627492E−16 |
| A17 | −1.0769691E−17 | 4.9945698E−18 |
| A18 | −1.6944849E−18 | −3.4766196E−19 |
| A19 | 1.6639079E−20 | 1.0072646E−20 |
| A20 | 5.8423587E−21 | 7.2829309E−22 |

Figure 3:
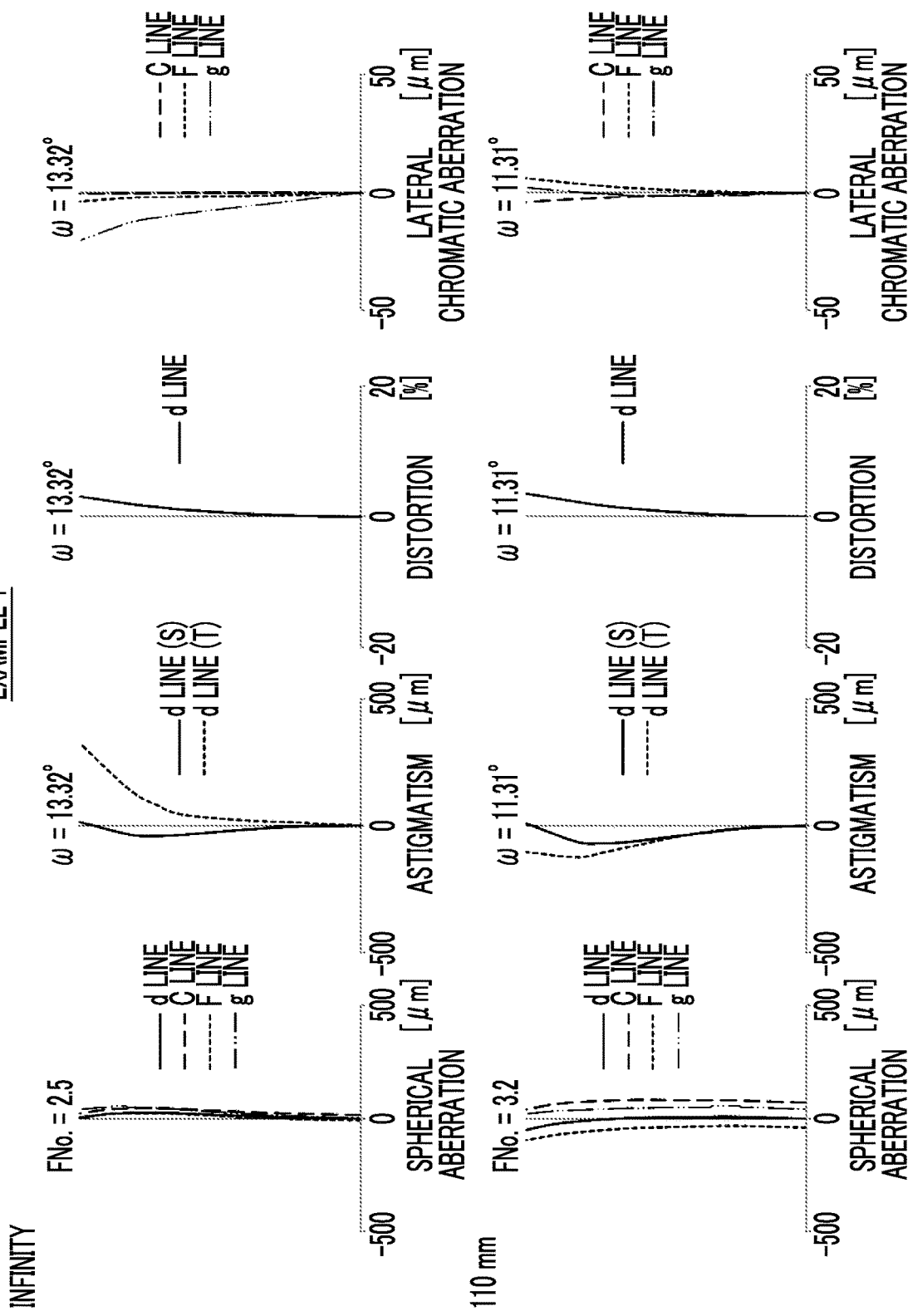
FIG. 3 is a diagram showing aberrations of the imaging lens of Example 1.

FIG. 3 shows a diagram showing aberrations of the imaging lens of Example 1. In FIG. 3, in order from the left side, spherical aberration, astigmatism, distortion, and lateral chromatic aberration are shown. FIG. 3 shows aberration diagrams in a state where the infinite distance object is in focus in the upper part labeled "infinity", and shows aberration diagrams in a state where the object at the object distance of 110 mm (millimeter) is in focus in the lower part labeled "110 mm". In spherical aberration diagram, aberrations at the d line, the C line, the F line, and the g line are indicated by the solid line, the long broken line, the short broken line, and the two-dot chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In lateral chromatic aberration, aberrations at the C line, the F line, and the g line are respectively indicated by the long broken line, the short broken line, and the two-dot chain line. In spherical aberration diagram, FNo. indicates an F number. In the other aberration diagrams, ω indicates a half angle of view. FIG. 3 also shows values of the FNo. and ω corresponding to the vertically upper part of each diagram.

Symbols, meanings, description methods, and illustration methods of the respective data pieces according to Example 1 are the same as those in the following examples unless otherwise specified. Therefore, in the following description, repeated description will not be given.

Example 2

Figure 4:
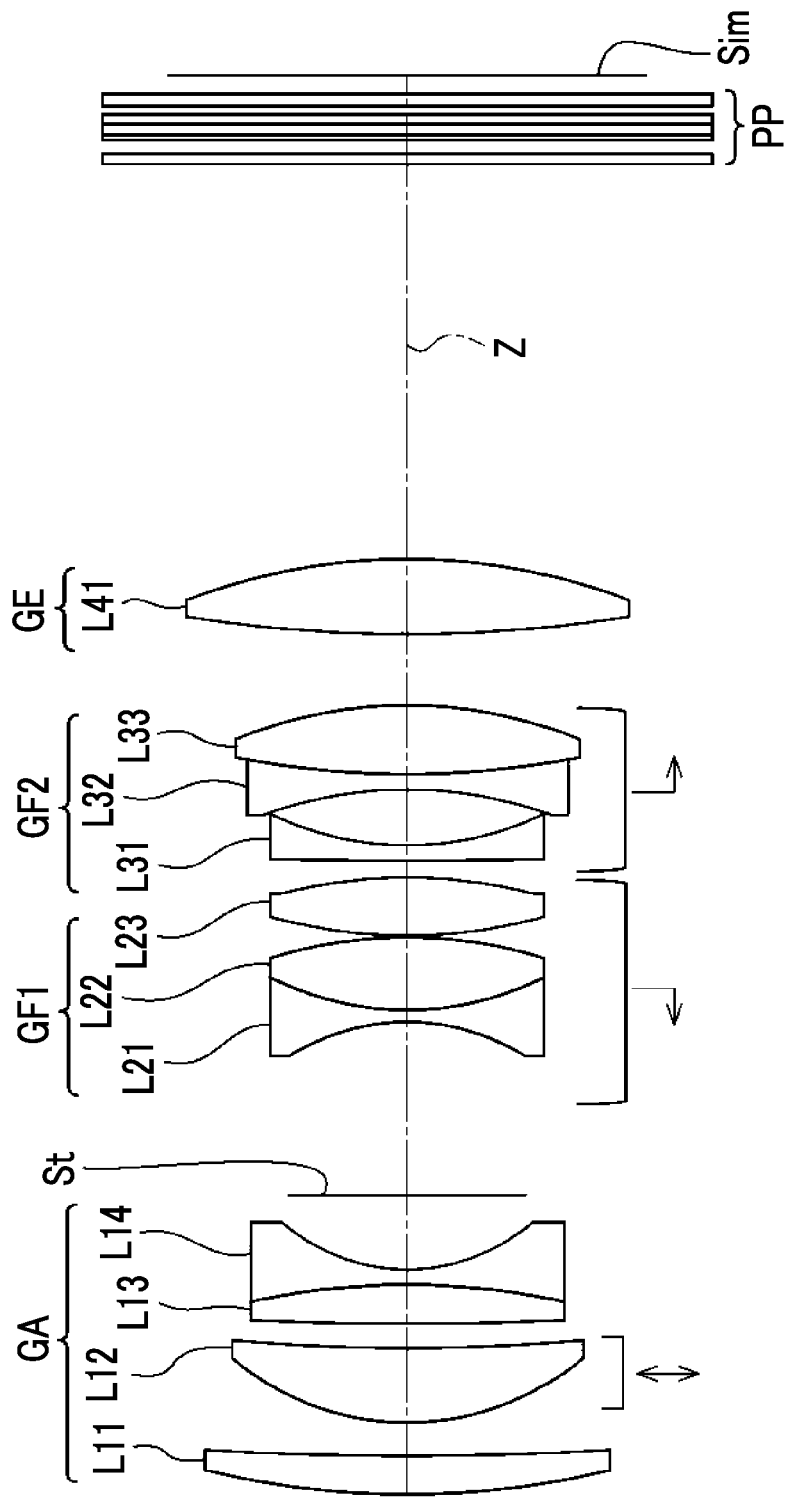
FIG. 4 is a cross-sectional view showing a configuration of an imaging lens of Example 2.

FIG. 4 is a cross-sectional view of a configuration of the imaging lens of Example 2. The imaging lens of Example 2 consists of, in order from the object side to the image side, a front lens group GA having a positive refractive power, an aperture stop St, a first focus lens group GF1 having a positive refractive power, a second focus lens group GF2 having a negative refractive power, and a final lens group GE having a positive refractive power. During focusing from the infinite distance object to the shortest range object, the first focus lens group GF1 moves toward the object side along the optical axis Z, the second focus lens group GF2 moves toward the image side along the optical axis Z, and the other lens group and the aperture stop St remain stationary with respect to the image plane Sim.

The front lens group GA consists of a positive lens L11, a positive lens L12, a positive lens L13, and a negative lens L14 in order from the object side to the image side. The lens L13 and the lens L14 are cemented to each other. The first focus lens group GF1 consists of a negative lens L21, a positive lens L22, and a positive lens L23 in order from the object side to the image side. The lens L21 and the lens L22 are cemented to each other. The second focus lens group GF2 consists of a negative lens L31, a negative lens L32, and a positive lens L33 in order from the object side to the image side. The lens L32 and the lens L33 are cemented to each other. The final lens group GE consists of a positive lens L41. In the example shown in FIG. 4, the vibration-proof lens group consists of the lens L12.

Figure 5:
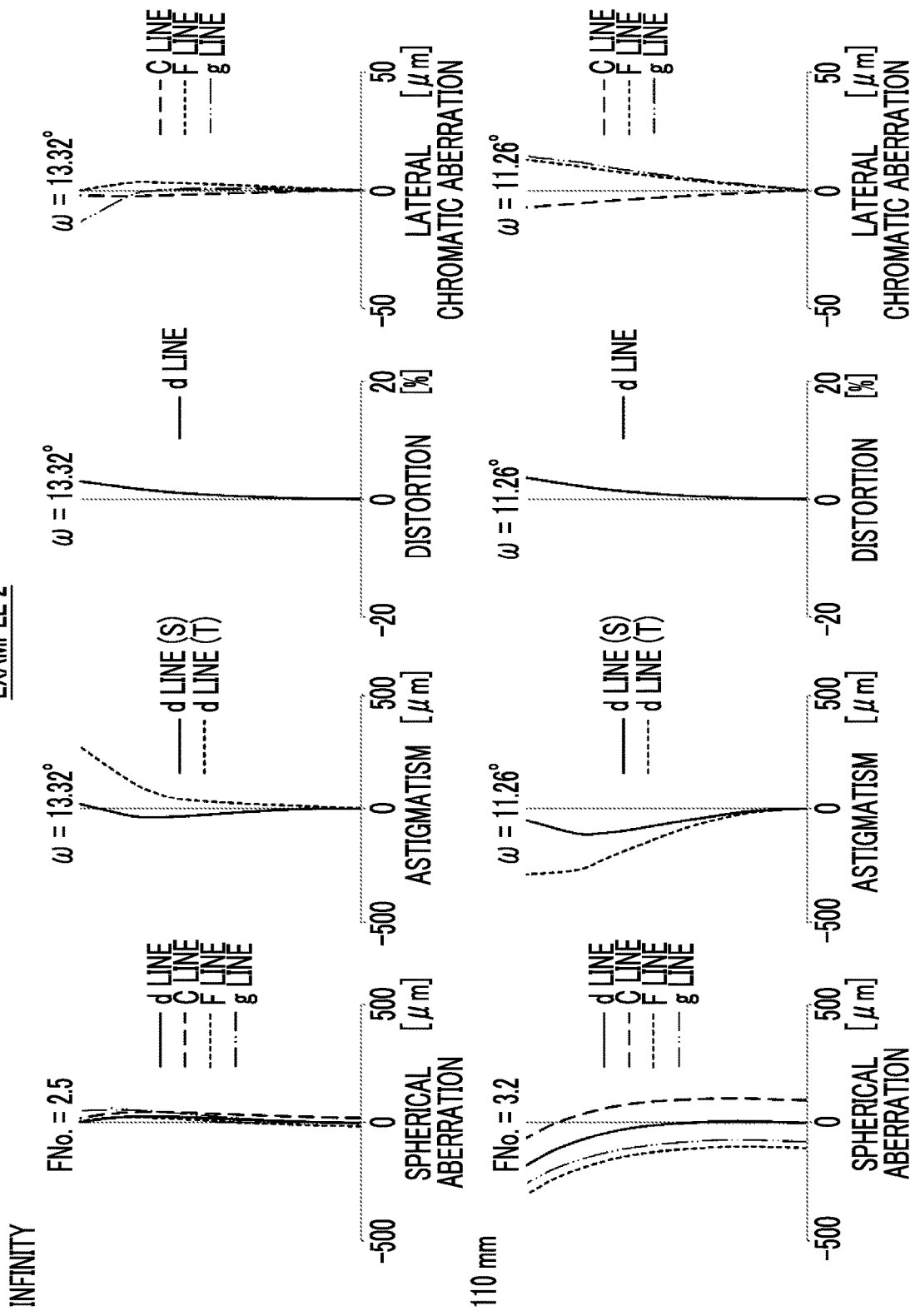
FIG. 5 is a diagram showing aberrations of the imaging lens of Example 2.

Regarding the imaging lens of Example 2, Table 4 shows basic lens data, Table 5 shows specification and variable surface distances, Table 6 shows aspheric surface coefficients thereof, and FIG. 5 shows aberration diagrams. FIG. 5 shows aberration diagrams in a state where the infinite distance object is in focus in the upper part, and shows aberration diagrams in a state where the object at the object distance of 110 mm (millimeter) is in focus in the lower part.

TABLE 4

| | Example 2 | | | | | |
|---|---|---|---|---|---|---|
| Sn | R | D | Nd | νd | θgF | Material |
| 1 | 61.73876 | 2.294 | 2.00069 | 25.46 | 0.61364 | TAFD40-W.HOYA |
| 2 | 271.78801 | 1.961 | | | | |
| 3 | 19.26041 | 4.435 | 1.55032 | 75.50 | 0.54001 | FCD705.HOYA |
| 4 | 144.90157 | 1.433 | | | | |
| 5 | 267.26489 | 2.312 | 1.67790 | 55.56 | 0.54672 | H-LAK5A.CDGM |
| 6 | −52.65021 | 0.912 | 1.57501 | 41.51 | 0.57711 | H-QF3.CDGM |
| 7 | 13.54823 | 4.408 | | | | |
| 8(St) | ∞ | DD[8] | | | | |
| 9 | −15.85418 | 0.710 | 1.63980 | 34.47 | 0.59294 | H-F51.CDGM |
| 10 | 21.74298 | 4.314 | 1.81600 | 46.57 | 0.55714 | H-ZLAF69A.CDGM |
| 11 | −33.33197 | 0.100 | | | | |
| *12 | 35.56126 | 3.450 | 1.69680 | 55.46 | 0.54262 | M-LAC14.HOYA |

TABLE 4-continued

Example 2

| Sn | R | D | Nd | vd | θgF | Material |
|---|---|---|---|---|---|---|
| *13 | −33.77101 | DD[13] | | | | |
| 14 | 573.38352 | 0.900 | 1.95000 | 29.37 | 0.60018 | J-LASFH15.HIKARI |
| 15 | 22.31235 | 3.318 | | | | |
| 16 | −30.30718 | 0.900 | 1.76182 | 26.61 | 0.61184 | H-ZF12.GDGM |
| 17 | 62.51924 | 4.096 | 1.55032 | 75.50 | 0.54001 | FCD705.HOYA |
| 18 | −32.50169 | DD[18] | | | | |
| 19 | 104.13226 | 4.448 | 1.92286 | 18.90 | 0.64960 | S-NPH2.OHARA |
| 20 | −44.14668 | 23.343 | | | | |
| 21 | ∞ | 0.600 | 1.54763 | 54.98 | 0.55247 | |
| 22 | ∞ | 0.810 | | | | |
| 23 | ∞ | 0.350 | 1.54763 | 54.98 | 0.55247 | |
| 24 | ∞ | 0.600 | 1.54763 | 54.98 | 0.55247 | |
| 25 | ∞ | 0.600 | 1.54763 | 54.98 | 0.55247 | |
| 26 | ∞ | 0.500 | | | | |
| 27 | ∞ | 0.700 | 1.49784 | 54.98 | 0.55000 | |
| 28 | ∞ | 1.111 | | | | |

TABLE 5

Example 2

| Object distance | Infinity | 110 mm |
|---|---|---|
| f | 58.197 | 47.525 |
| FNo. | 2.5 | 3.2 |
| 2ω(°) | 26.64 | 22.52 |
| Ymax | 14.2 | 14.2 |
| DD[8] | 10.193 | 2.897 |
| DD[13] | 0.998 | 11.472 |
| DD[18] | 4.230 | 1.051 |

TABLE 6

Example 2

| Sn | 12 | 13 |
|---|---|---|
| KA | 1.0000000E+00 | 1.0000000E+00 |
| A3 | 0.0000000E+00 | 0.0000000E+00 |
| A4 | −2.1611905E−06 | 2.1370400E−05 |
| A5 | 7.8590255E−07 | −1.1073624E−06 |
| A6 | 1.9660819E−07 | 1.3733177E−07 |
| A7 | −3.5687093E−08 | −7.9286229E−09 |
| A8 | 2.7800434E−09 | 1.0288176E−10 |
| A9 | −7.4727667E−11 | −4.7409958E−11 |
| A10 | 1.8812048E−11 | 1.1562054E−11 |
| A11 | −2.3940823E−13 | 1.3896155E−12 |
| A12 | −1.3179470E−13 | −1.5602455E−13 |
| A13 | −2.7371556E−14 | −5.2239302E−14 |
| A14 | −4.3609258E−15 | −4.3499445E−15 |
| A15 | −4.5741186E−16 | 2.3650757E−15 |
| A16 | 3.1295533E−16 | −1.7861133E−16 |
| A17 | −1.0704855E−17 | 4.7291153E−18 |
| A18 | −1.6845251E−18 | −3.6416863E−19 |
| A19 | 1.6360084E−20 | 1.0094714E−20 |
| A20 | 5.6152399E−21 | 7.5017664E−22 |

Example 3

Figure 6:
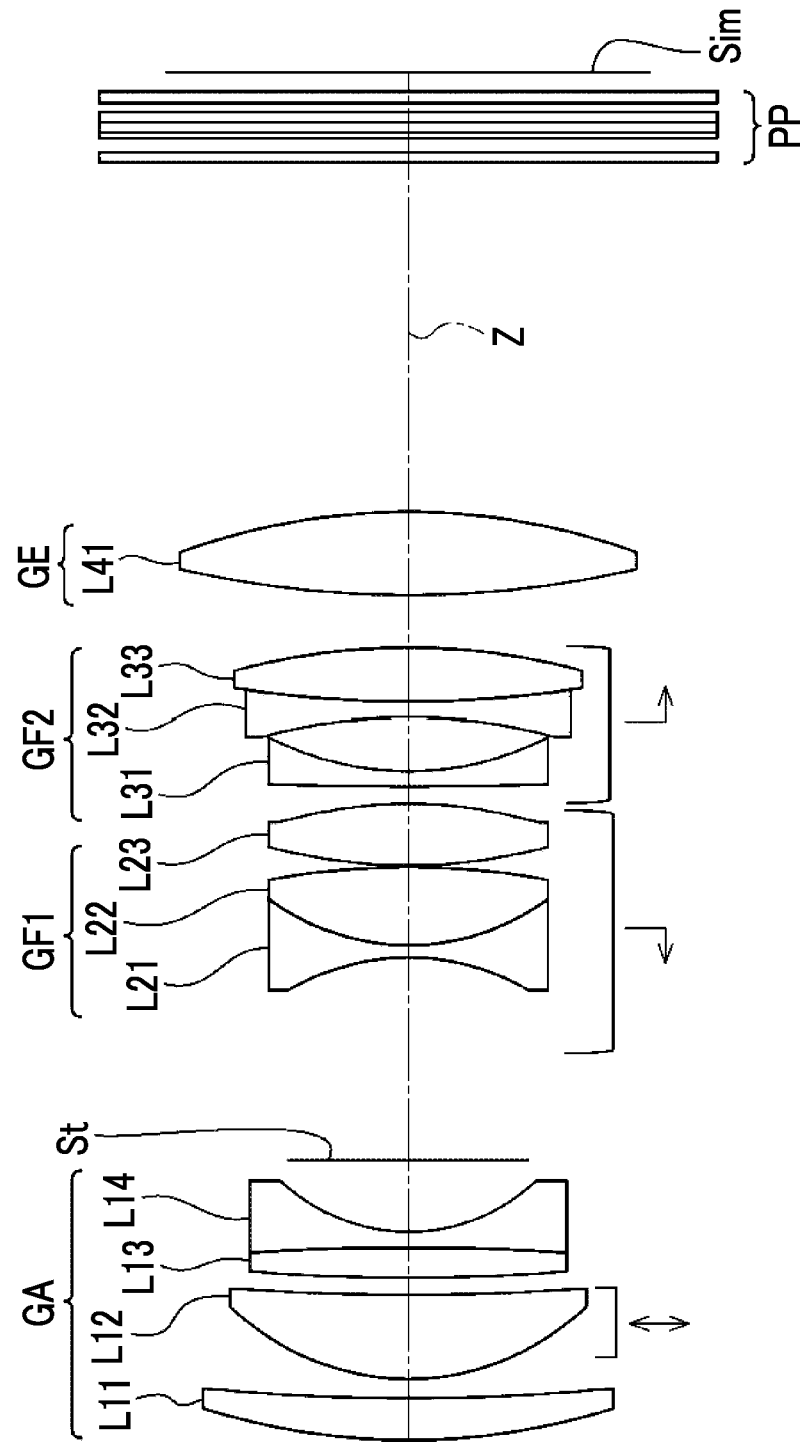
FIG. 6 is a cross-sectional view showing a configuration of an imaging lens of Example 3.

FIG. 6 is a cross-sectional view of a configuration of the imaging lens of Example 3. The imaging lens of Example 3 consists of, in order from the object side to the image side, a front lens group GA having a positive refractive power, an aperture stop St, a first focus lens group GF1 having a positive refractive power, a second focus lens group GF2 having a negative refractive power, and a final lens group GE having a positive refractive power. During focusing from the infinite distance object to the shortest range object, the first focus lens group GF1 moves toward the object side along the optical axis Z, the second focus lens group GF2 moves toward the image side along the optical axis Z, and the other lens group and the aperture stop St remain stationary with respect to the image plane Sim.

The front lens group GA consists of a positive lens L11, a positive lens L12, a positive lens L13, and a negative lens L14 in order from the object side to the image side. The lens L13 and the lens L14 are cemented to each other. The first focus lens group GF1 consists of a negative lens L21, a positive lens L22, and a positive lens L23 in order from the object side to the image side. The lens L21 and the lens L22 are cemented to each other. The second focus lens group GF2 consists of a negative lens L31, a negative lens L32, and a positive lens L33 in order from the object side to the image side. The lens L32 and the lens L33 are cemented to each other. The final lens group GE consists of a positive lens L41. In the example shown in FIG. 6, the vibration-proof lens group consists of the lens L12.

Figure 7:
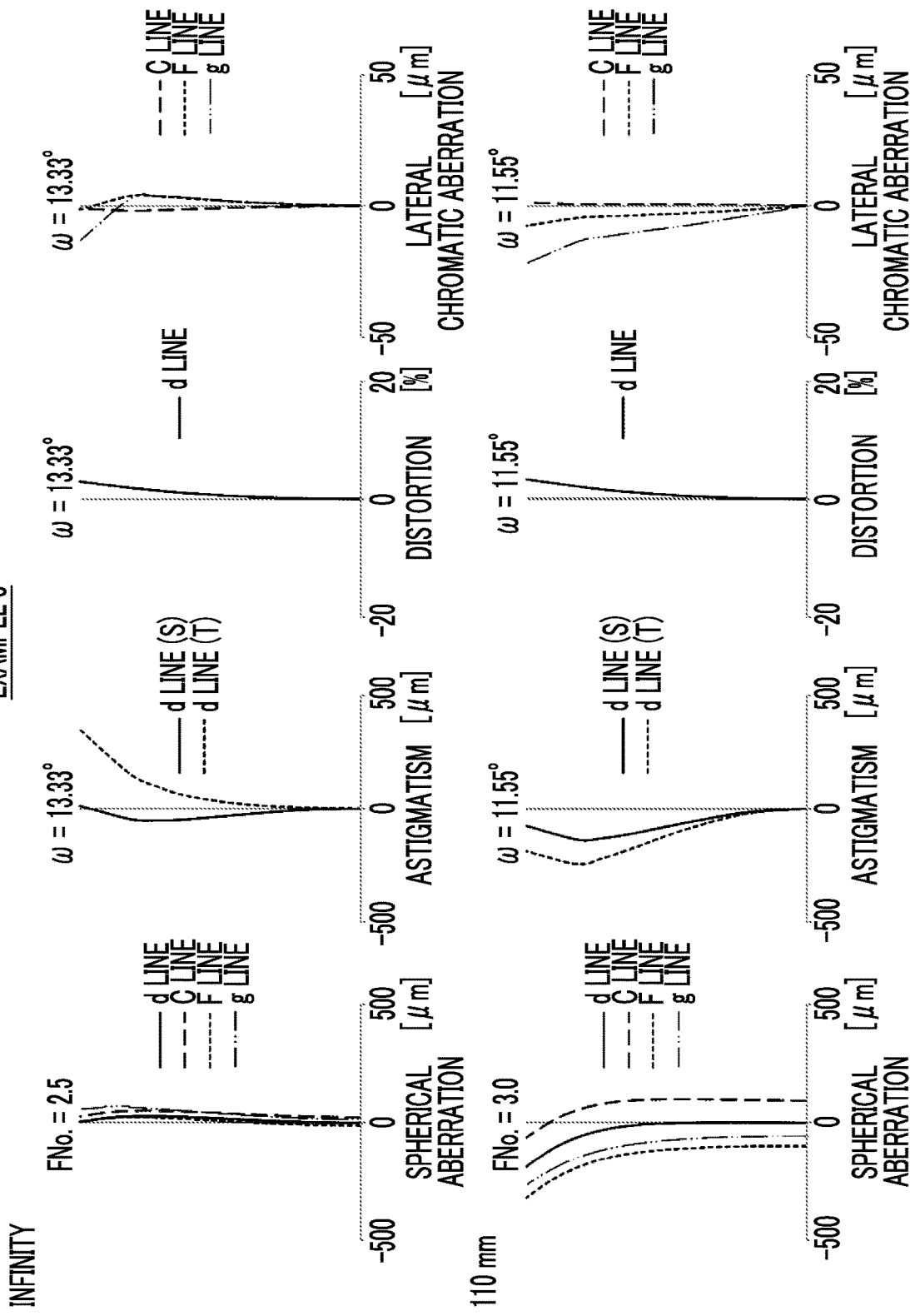
FIG. 7 is a diagram showing aberrations of the imaging lens of Example 3.

Regarding the imaging lens of Example 3, Table 7 shows basic lens data, Table 8 shows specification and variable surface distances, Table 9 shows aspheric surface coefficients thereof, and FIG. 7 shows aberration diagrams. FIG. 7 shows aberration diagrams in a state where the infinite distance object is in focus in the upper part, and shows aberration diagrams in a state where the object at the object distance of 110 mm (millimeter) is in focus in the lower part.

TABLE 7

Example 3

| Sn | R | D | Nd | vd | θgF | Material |
|---|---|---|---|---|---|---|
| 1 | 48.25531 | 2.450 | 1.96300 | 24.11 | 0.62126 | S-TIH57.OHARA |
| 2 | 151.87055 | 1.120 | | | | |
| 3 | 17.75353 | 4.922 | 1.55032 | 75.50 | 0.54001 | FCD705.HOYA |
| 4 | 168.54419 | 1.014 | | | | |

TABLE 7-continued

Example 3

| Sn | R | D | Nd | vd | θgF | Material |
|---|---|---|---|---|---|---|
| 5 | 143.06798 | 1.768 | 1.65950 | 57.38 | 0.54486 | H-LAK1.CDGM |
| 6 | -175.25328 | 0.910 | 1.62005 | 36.35 | 0.58602 | H-F4.CDGM |
| 7 | 12.89221 | 4.202 | | | | |
| 8(St) | ∞ | DD[8] | | | | |
| 9 | -16.61876 | 0.710 | 1.63980 | 34.47 | 0.59294 | H-F51.CDGM |
| 10 | 16.34551 | 4.579 | 1.83481 | 42.73 | 0.56459 | H-ZLAF55D.CDGM |
| 11 | -54.64906 | 0.100 | | | | |
| *12 | 35.73589 | 3.617 | 1.72903 | 54.04 | 0.54474 | M-TAC80.HOYA |
| *13 | -29.80698 | DD[13] | | | | |
| 14 | 310.83749 | 0.900 | 2.00272 | 19.32 | 0.64514 | E-FDS2.HOYA |
| 15 | 21.50087 | 3.119 | | | | |
| 16 | -40.79267 | 0.900 | 1.81600 | 46.57 | 0.55714 | H-ZLAF69A.CDGM |
| 17 | 80.04439 | 3.155 | 1.55032 | 75.50 | 0.54001 | FCD705.HOYA |
| 18 | -47.13412 | DD[18] | | | | |
| 19 | 72.84020 | 4.858 | 1.94595 | 17.98 | 0.65460 | FDS18-W.HOYA |
| 20 | -47.28129 | 20.461 | | | | |
| 21 | ∞ | 0.600 | 1.54763 | 54.98 | 0.55247 | |
| 22 | ∞ | 0.810 | | | | |
| 23 | ∞ | 0.350 | 1.54763 | 54.98 | 0.55247 | |
| 24 | ∞ | 0.600 | 1.54763 | 54.98 | 0.55247 | |
| 25 | ∞ | 0.600 | 1.54763 | 54.98 | 0.55247 | |
| 26 | ∞ | 0.500 | | | | |
| 27 | ∞ | 0.700 | 1.49784 | 54.98 | 0.55000 | |
| 28 | ∞ | 1.112 | | | | |

TABLE 8

Example 3

| Object distance | Infinity | 110 mm |
|---|---|---|
| f | 58.202 | 45.566 |
| FNo. | 2.5 | 3.0 |
| 2ω(°) | 26.66 | 23.10 |
| Ymax | 14.2 | 14.2 |
| DD[8] | 11.876 | 3.181 |
| DD[13] | 0.999 | 11.791 |
| DD[18] | 3.085 | 0.990 |

TABLE 9

Example 3

| Sn | 12 | 13 |
|---|---|---|
| KA | 1.0000000E+00 | 1.0000000E+00 |
| A3 | 0.0000000E+00 | 0.0000000E+00 |
| A4 | -1.0089791E-05 | 2.5759752E-05 |
| A5 | -9.0747771E-07 | -9.9217053E-07 |
| A6 | 2.3171147E-07 | 1.9001221E-07 |
| A7 | -3.2385585E-08 | -9.8611010E-09 |
| A8 | 2.1812546E-09 | -8.4985481E-10 |
| A9 | -1.6982407E-10 | -6.6361129E-11 |
| A10 | 1.9006309E-11 | 2.4322747E-11 |
| A11 | 8.4356217E-13 | 2.2789422E-12 |
| A12 | 2.7788603E-15 | -1.8066972E-13 |
| A13 | -2.0833635E-14 | -5.8037525E-14 |
| A14 | -5.0931390E-15 | -4.1298454E-15 |
| A15 | -5.7721530E-16 | 2.1229647E-15 |
| A16 | 2.7605570E-16 | -1.5736904E-16 |
| A17 | -8.9551322E-18 | 4.7364097E-18 |
| A18 | -1.4034750E-18 | -3.4445195E-19 |
| A19 | 3.3034592E-20 | 1.6475468E-20 |
| A20 | 3.5108902E-21 | 2.6687109E-22 |

Example 4

Figure 8:
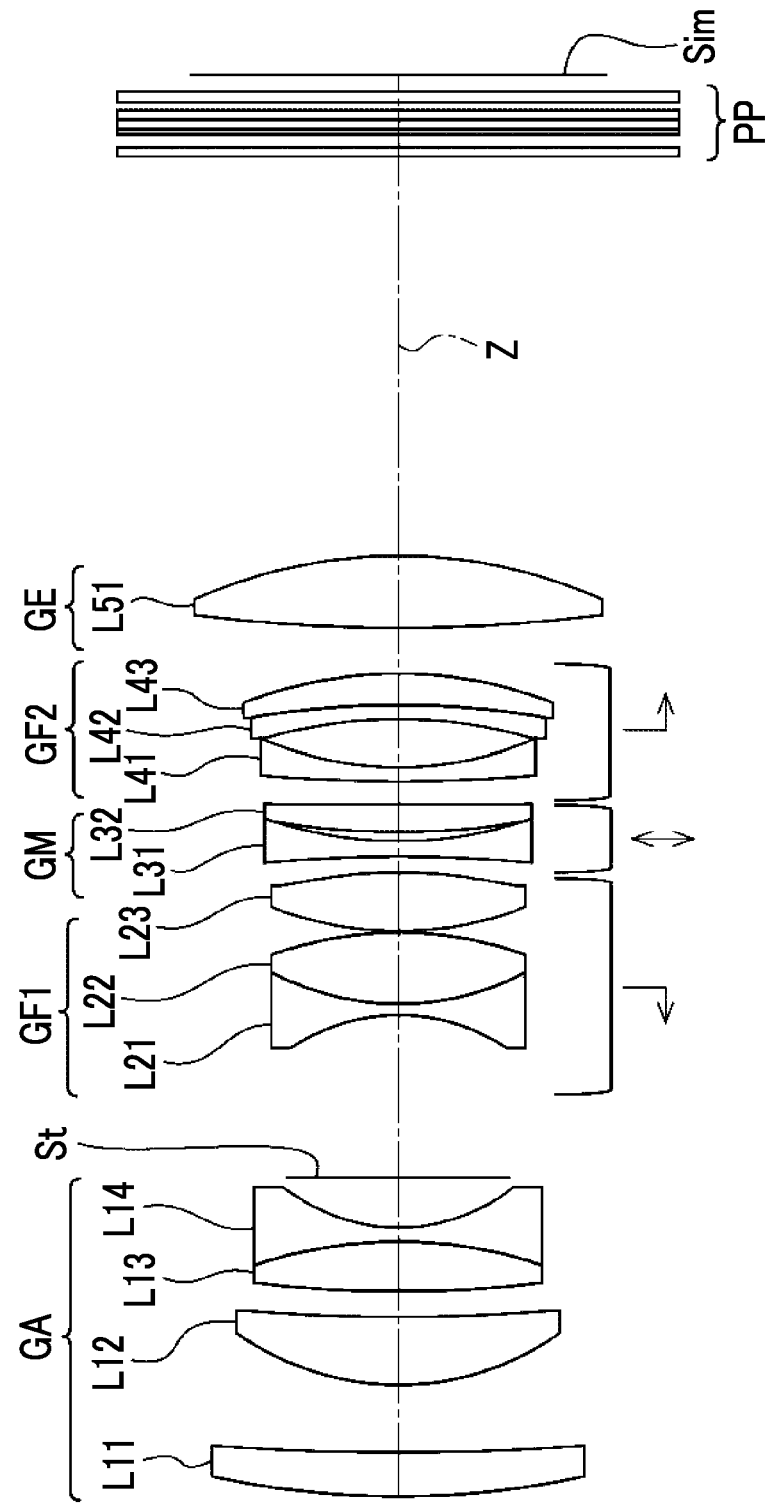
FIG. 8 is a cross-sectional view showing a configuration of an imaging lens of Example 4.

FIG. 8 shows a cross-sectional view of the configuration of the imaging lens of Example 4, and FIG. 9 shows a cross-sectional view of the configuration and the ray in each in-focus state. The imaging lens of Example 4 consists of, in order from the object side to the image side, a front lens group GA having a positive refractive power, an aperture stop St, a first focus lens group GF1 having a positive refractive power, a medium lens group GM, a second focus lens group GF2 having a negative refractive power, and a final lens group GE having a positive refractive power. During focusing from the infinite distance object to the shortest range object, the first focus lens group GF1 moves toward the object side along the optical axis Z, the second focus lens group GF2 moves toward the image side along the optical axis Z, and the other lens group and the aperture stop St remain stationary with respect to the image plane Sim.

The front lens group GA consists of a positive lens L11, a positive lens L12, a positive lens L13, and a negative lens L14 in order from the object side to the image side. The lens L13 and the lens L14 are cemented to each other. The first focus lens group GF1 consists of a negative lens L21, a positive lens L22, and a positive lens L23 in order from the object side to the image side. The lens L21 and the lens L22 are cemented to each other. The medium lens group GM consists of, in order from the object side to the image side, a negative lens L31 and a positive lens L32. The second focus lens group GF2 consists of a negative lens L41, a negative lens L42, and a positive lens L43 in order from the object side to the image side. The lens L42 and the lens L43 are cemented to each other. The final lens group GE consists of a positive lens L51. In the example shown in FIG. 8, the vibration-proof lens group consists of the entire medium lens group GM.

Figure 10:
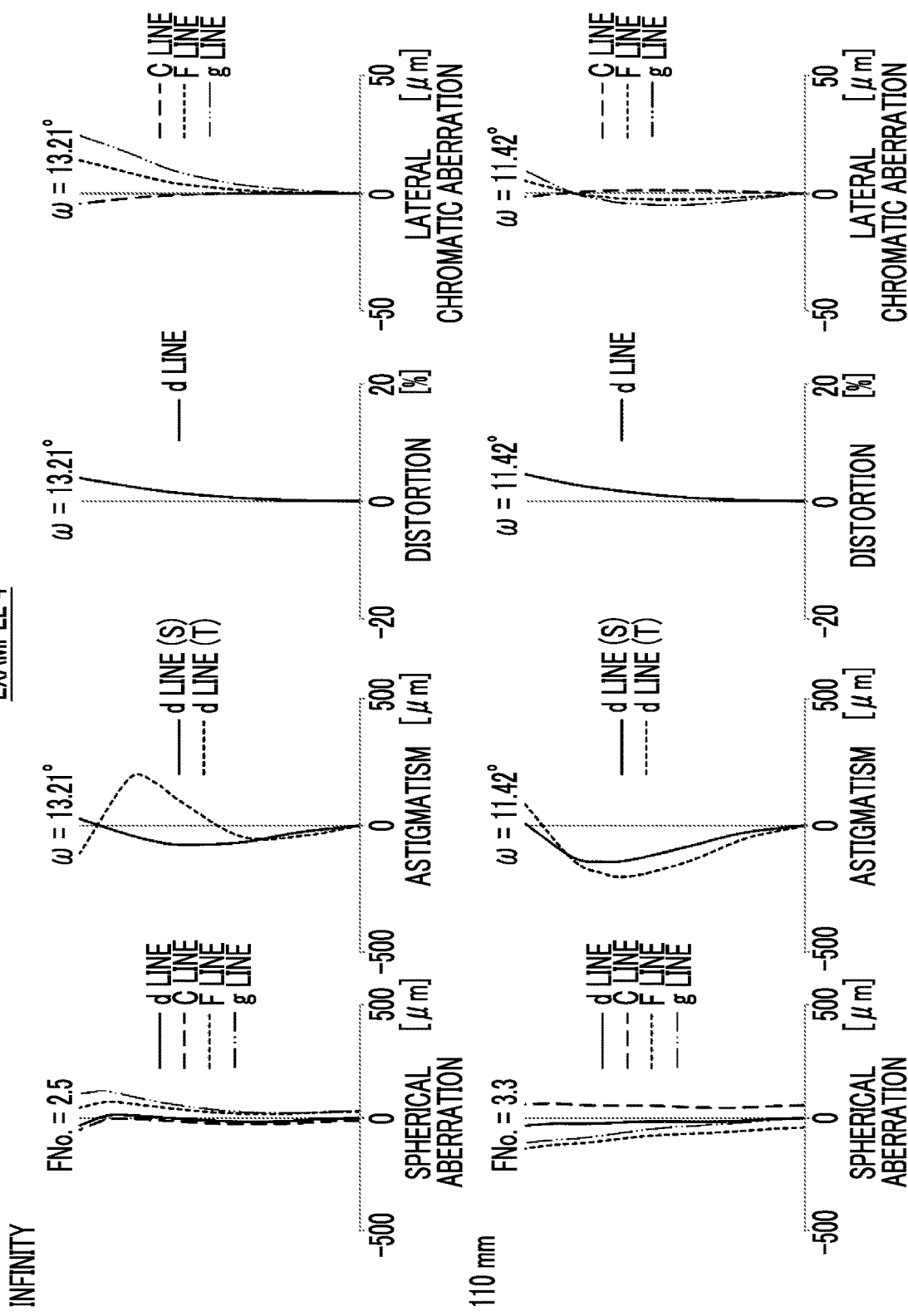
FIG. 10 is a diagram showing aberrations of the imaging lens of Example 4.

Regarding the imaging lens of Example 4, Table 10 shows basic lens data, Table 11 shows specification and variable surface distances, Table 12 shows aspheric surface coefficients thereof, and FIG. 10 shows aberration diagrams. FIG. 10 shows aberration diagrams in a state where the infinite distance object is in focus in the upper part, and shows aberration diagrams in a state where the object at the object distance of 110 mm (millimeter) is in focus in the lower part.

TABLE 10

Example 4

| Sn | R | D | Nd | νd | θgF | Material |
|---|---|---|---|---|---|---|
| 1 | 68.94951 | 2.842 | 1.95906 | 17.47 | 0.65993 | S-NPH3.OHARA |
| 2 | 203.79810 | 4.338 | | | | |
| 3 | 21.43861 | 4.372 | 1.55032 | 75.50 | 0.54001 | FCD705.HOYA |
| 4 | 142.67366 | 1.643 | | | | |
| 5 | 90.13383 | 3.222 | 1.61800 | 63.39 | 0.54015 | PCD4.HOYA |
| 6 | −35.38328 | 0.910 | 1.59551 | 39.23 | 0.58053 | H-QF14.CDGM |
| 7 | 14.26779 | 3.217 | | | | |
| 8(St) | ∞ | DD[8] | | | | |
| 9 | −15.00123 | 0.710 | 1.64769 | 33.84 | 0.59227 | H-ZF1.CDGM |
| 10 | 20.85374 | 4.609 | 1.78590 | 44.21 | 0.56289 | H-LAF52.CDGM |
| 11 | −28.89951 | 0.100 | | | | |
| *12 | 27.71431 | 3.781 | 1.77200 | 49.98 | 0.55475 | K-LAFK50.SUMITA |
| *13 | −34.29915 | DD[13] | | | | |
| 14 | −112.08850 | 1.000 | 2.00069 | 25.46 | 0.61364 | TAFD40-W.HOYA |
| 15 | 31.33978 | 0.594 | | | | |
| *16 | 67.71473 | 1.758 | 1.51633 | 64.06 | 0.53345 | L-BSL7.OHARA |
| *17 | 14239.48951 | DD[17] | | | | |
| 18 | 125.98040 | 0.900 | 2.00100 | 29.13 | 0.59952 | TAFD55-W.HOYA |
| 19 | 27.42264 | 3.052 | | | | |
| 20 | −36.42588 | 0.900 | 1.92286 | 20.88 | 0.63900 | E-FDS1.HOYA |
| 21 | −66.54967 | 2.022 | 1.55032 | 75.50 | 0.54001 | FCD705.HOYA |
| 22 | −32.86109 | DD[22] | | | | |
| 23 | 131.70694 | 4.633 | 2.00272 | 19.32 | 0.64514 | E-FDS2.HOYA |
| 24 | −38.86048 | 25.750 | | | | |
| 25 | ∞ | 0.600 | 1.54763 | 54.98 | 0.55247 | |
| 26 | ∞ | 0.810 | | | | |
| 27 | ∞ | 0.350 | 1.54763 | 54.98 | 0.55247 | |
| 28 | ∞ | 0.600 | 1.54763 | 54.98 | 0.55247 | |
| 29 | ∞ | 0.600 | 1.54763 | 54.98 | 0.55247 | |
| 30 | ∞ | 0.500 | | | | |
| 31 | ∞ | 0.700 | 1.49784 | 54.98 | 0.55000 | |
| 32 | ∞ | 1.102 | | | | |

TABLE 11

Example 4

| Object distance | Infinity | 110 mm |
|---|---|---|
| f | 58.204 | 49.550 |
| FNo. | 2.5 | 3.3 |
| 2ω(°) | 26.42 | 22.84 |
| Ymax | 14.2 | 14.2 |
| DD[8] | 10.478 | 4.059 |
| DD[13] | 1.007 | 7.426 |
| DD[17] | 1.500 | 3.452 |
| DD[22] | 2.951 | 0.999 |

TABLE 12

Example 4

| Sn | 12 | 13 | 16 | 17 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −4.6712915E−06 | 2.3679181E−05 | 1.2142534E−05 | −2.4575264E−06 |
| A5 | 3.6386050E−07 | 6.7047884E−07 | −2.2385474E−07 | 8.7237432E−07 |
| A6 | 3.5865424E−08 | 1.0738661E−08 | 1.9738945E−08 | 2.8831646E−08 |
| A7 | 1.8480962E−09 | −8.7266021E−11 | 4.9028126E−09 | −1.2851555E−09 |
| A8 | 4.8303137E−11 | −3.2637785E−11 | 4.5181359E−10 | −2.6471729E−10 |
| A9 | −2.3734136E−12 | 6.6492763E−13 | 2.4462233E−11 | −2.2204168E−11 |
| A10 | −5.7595435E−13 | 6.4929828E−13 | −6.5776035E−13 | −1.1045881E−12 |
| A11 | −5.0585205E−14 | 1.0755579E−13 | −3.7416965E−13 | 4.8832150E−15 |
| A12 | 1.2396239E−15 | 1.5403824E−14 | −6.3055478E−14 | 1.1261473E−14 |
| A13 | 5.4928582E−16 | 1.8534991E−15 | −8.6653300E−15 | 2.3372222E−15 |
| A14 | 1.2996564E−16 | 2.0616084E−16 | −8.1125121E−16 | 4.2151168E−16 |
| A15 | 1.8058926E−17 | 1.7490816E−17 | 8.9056791E−17 | −2.8592147E−16 |
| A16 | 4.2927763E−18 | −2.3857605E−18 | −6.6678236E−18 | 4.9357355E−18 |
| A17 | 3.3676491E−19 | 3.3784164E−19 | −2.2864627E−19 | 4.9701922E−19 |
| A18 | 3.5296098E−20 | 3.9327479E−20 | 7.2794529E−20 | 3.7756256E−20 |
| A19 | 3.3610915E−21 | 5.0143192E−21 | 8.4265292E−21 | 5.2649752E−21 |
| A20 | 2.2607476E−22 | 6.6602923E−22 | 1.5541766E−21 | 7.5679460E−22 |

Example 5

Figure 11:
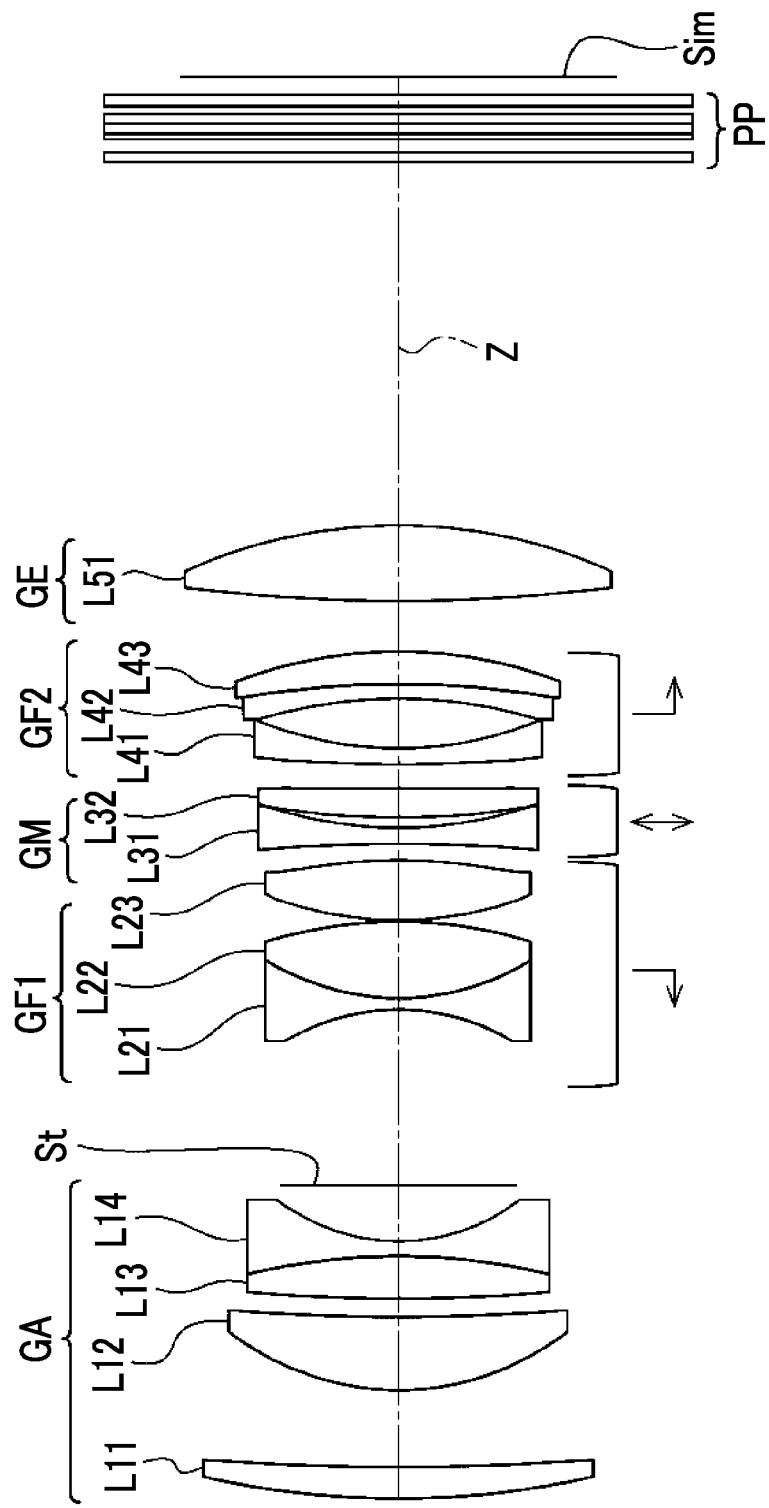
FIG. 11 is a cross-sectional view showing a configuration of an imaging lens of Example 5.

FIG. 11 is a cross-sectional view of a configuration of the imaging lens of Example 5. The imaging lens of Example 5 consists of, in order from the object side to the image side, a front lens group GA having a positive refractive power, an aperture stop St, a first focus lens group GF1 having a positive refractive power, a medium lens group GM, a second focus lens group GF2 having a negative refractive power, and a final lens group GE having a positive refractive power. During focusing from the infinite distance object to the shortest range object, the first focus lens group GF1 moves toward the object side along the optical axis Z, the second focus lens group GF2 moves toward the image side along the optical axis Z, and the other lens group and the aperture stop St remain stationary with respect to the image plane Sim.

The front lens group GA consists of a positive lens L11, a positive lens L12, a positive lens L13, and a negative lens L14 in order from the object side to the image side. The lens L13 and the lens L14 are cemented to each other. The first focus lens group GF1 consists of a negative lens L21, a positive lens L22, and a positive lens L23 in order from the object side to the image side. The lens L21 and the lens L22 are cemented to each other. The medium lens group GM consists of, in order from the object side to the image side, a negative lens L31 and a positive lens L32. The second focus lens group GF2 consists of a negative lens L41, a negative lens L42, and a positive lens L43 in order from the object side to the image side. The lens L42 and the lens L43 are cemented to each other. The final lens group GE consists of a positive lens L51. In the example shown in FIG. 11, the vibration-proof lens group consists of the entire medium lens group GM.

Figure 12:
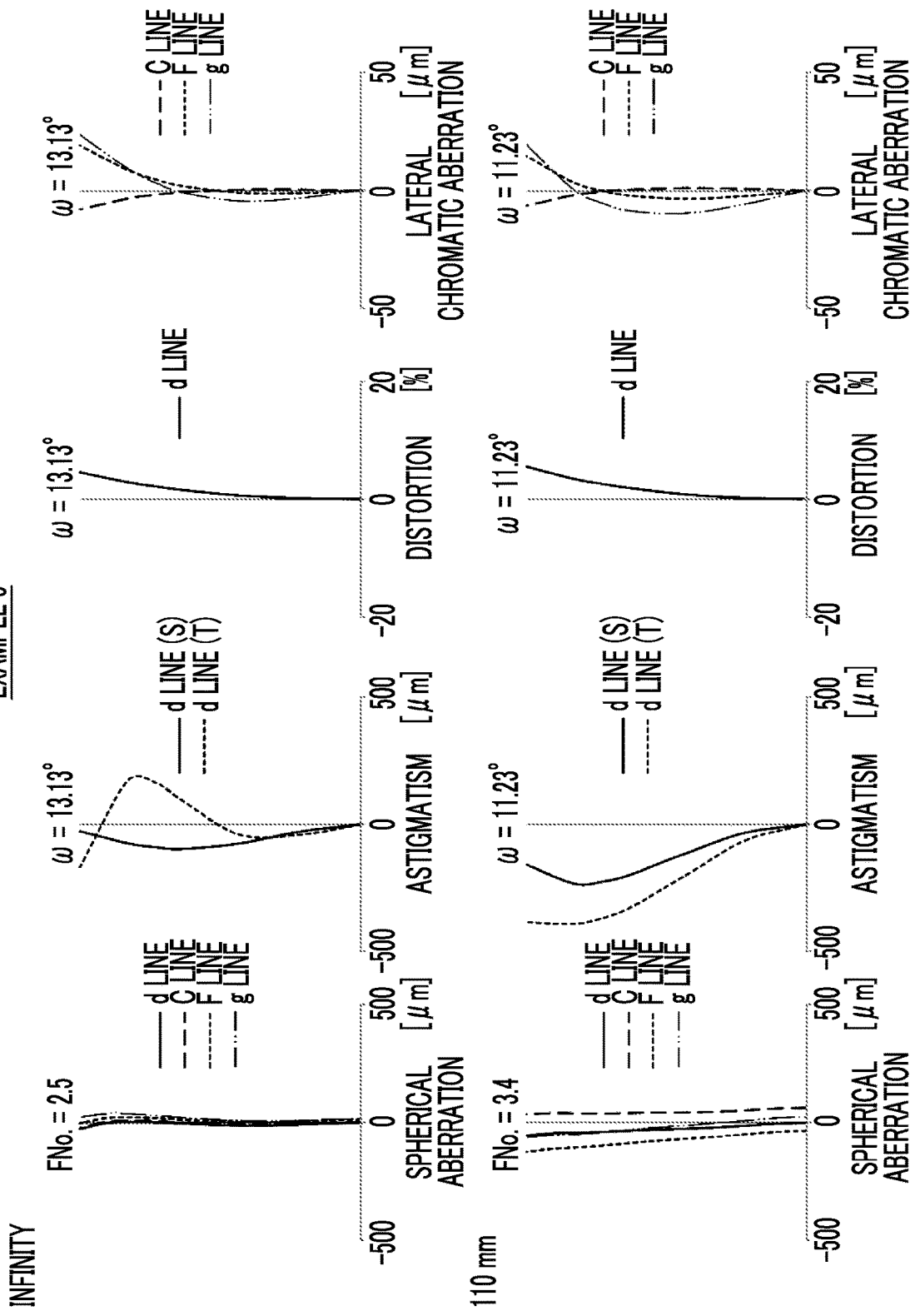
FIG. 12 is a diagram showing aberrations of the imaging lens of Example 5.

Regarding the imaging lens of Example 5, Table 13 shows basic lens data, Table 14 shows specification and variable surface distances, Table 15 shows aspheric surface coefficients thereof, and FIG. 12 shows aberration diagrams. FIG. 12 shows aberration diagrams in a state where the infinite distance object is in focus in the upper part, and shows aberration diagrams in a state where the object at the object distance of 110 mm (millimeter) is in focus in the lower part.

TABLE 13

Example 5

| Sn | R | D | Nd | vd | θgF | Material |
|---|---|---|---|---|---|---|
| 1 | 66.46145 | 1.956 | 2.00272 | 19.32 | 0.64514 | E-FDS2.HOYA |
| 2 | 215.12302 | 4.710 | | | | |
| 3 | 20.20404 | 4.515 | 1.55032 | 75.50 | 0.54001 | FCD705.HOYA |
| 4 | 160.68555 | 1.146 | | | | |
| 5 | 150.41823 | 2.591 | 1.67000 | 51.76 | 0.55451 | H-LAK67.CDGM |
| 6 | −47.07214 | 0.910 | 1.60342 | 38.01 | 0.58282 | H-F1.CDGM |
| 7 | 14.61148 | 3.436 | | | | |
| 8(St) | ∞ | DD[8] | | | | |
| 9 | −16.35015 | 0.710 | 1.64769 | 33.84 | 0.59227 | H-ZF1.CDGM |
| 10 | 18.49368 | 4.701 | 1.83481 | 42.73 | 0.56459 | H-ZLAF55D.CDGM |
| 11 | −33.52954 | 0.100 | | | | |
| *12 | 27.25049 | 3.684 | 1.69680 | 55.46 | 0.54262 | M-LAC14.HOYA |
| *13 | −38.02987 | DD[13] | | | | |
| 14 | −126.55006 | 1.000 | 2.00100 | 29.13 | 0.59952 | TAFD55-W.HOYA |
| 15 | 31.02932 | 0.635 | | | | |
| *16 | 65.70596 | 1.777 | 1.51633 | 64.06 | 0.53345 | L-BSL7.OHARA |
| *17 | 4666.90409 | DD[17] | | | | |
| 18 | 114.76878 | 0.900 | 1.95906 | 17.47 | 0.65993 | S-NPH3.OHARA |
| 19 | 27.51489 | 3.058 | | | | |
| 20 | −36.09613 | 0.900 | 1.85451 | 25.15 | 0.61031 | NBFD25.HOYA |
| 21 | −66.59723 | 2.011 | 1.55032 | 75.50 | 0.54001 | FCD705.HOYA |
| 22 | −33.49226 | DD[22] | | | | |
| 23 | 129.90523 | 4.640 | 1.98613 | 16.48 | 0.66558 | FDS16-W.HOYA |
| 24 | −38.83366 | 22.358 | | | | |
| 25 | ∞ | 0.600 | 1.54763 | 54.98 | 0.55247 | |
| 26 | ∞ | 0.810 | | | | |
| 27 | ∞ | 0.350 | 1.54763 | 54.98 | 0.55247 | |
| 28 | ∞ | 0.600 | 1.54763 | 54.98 | 0.55247 | |
| 29 | ∞ | 0.600 | 1.54763 | 54.98 | 0.55247 | |
| 30 | ∞ | 0.500 | | | | |
| 31 | ∞ | 0.700 | 1.49784 | 54.98 | 0.55000 | |
| 32 | ∞ | 1.105 | | | | |

TABLE 14

Example 5

| Object distance | Infinity | 110 mm |
|---|---|---|
| f | 58.211 | 49.261 |
| FNo. | 2.5 | 3.4 |
| 2ω(°) | 26.26 | 22.46 |
| Ymax | 14.2 | 14.2 |
| DD[8] | 10.824 | 3.559 |
| DD[13] | 0.998 | 8.263 |
| DD[17] | 1.499 | 3.609 |
| DD[22] | 3.110 | 1.000 |

TABLE 15

Example 5

| Sn | 12 | 13 | 16 | 17 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −6.2271579E−06 | 2.5370608E−05 | 1.7260214E−05 | 5.6290971E−06 |
| A5 | 4.0843896E−07 | 7.5024862E−07 | −1.7573671E−07 | 9.8959524E−07 |
| A6 | 3.5790663E−08 | 2.0953899E−08 | −1.1677375E−08 | 1.8437613E−08 |
| A7 | 1.8643788E−09 | 9.4351904E−10 | 2.8718116E−09 | −6.3977515E−09 |
| A8 | 1.0355936E−10 | 9.2220583E−12 | 9.2460785E−11 | −7.3329764E−10 |
| A9 | 3.2624941E−12 | 4.7849302E−12 | −1.4851893E−11 | −6.7525465E−11 |
| A10 | 4.5191499E−14 | 1.0688283E−12 | −4.7329313E−12 | −4.9088817E−12 |
| A11 | 5.5150039E−17 | 1.6667481E−13 | −7.7248342E−13 | −2.7430330E−13 |
| A12 | 4.3208915E−15 | 2.2866046E−14 | −9.9825745E−14 | −5.7498295E−15 |
| A13 | 6.9024141E−16 | 2.8515597E−15 | −1.1899114E−14 | 1.8523387E−15 |
| A14 | 1.3443723E−16 | 3.4547685E−16 | −1.1752352E−15 | 9.7855836E−16 |
| A15 | 2.9764013E−17 | 4.9450671E−18 | 2.9425161E−16 | −3.1727125E−16 |
| A16 | 8.7976215E−18 | −1.5113308E−18 | −7.1629842E−18 | 7.2538827E−18 |
| A17 | 1.8974185E−20 | 6.3734882E−19 | −1.6706517E−19 | 3.5170289E−19 |
| A18 | 6.3298920E−20 | 1.1445702E−19 | 8.5063331E−20 | 9.4425062E−20 |
| A19 | 7.2857330E−22 | −5.9733630E−21 | 8.5197557E−22 | −7.5325753E−21 |
| A20 | −3.7036346E−22 | 1.4163213E−22 | 6.4084420E−22 | 1.4804002E−21 |

Example 6

Figure 13:
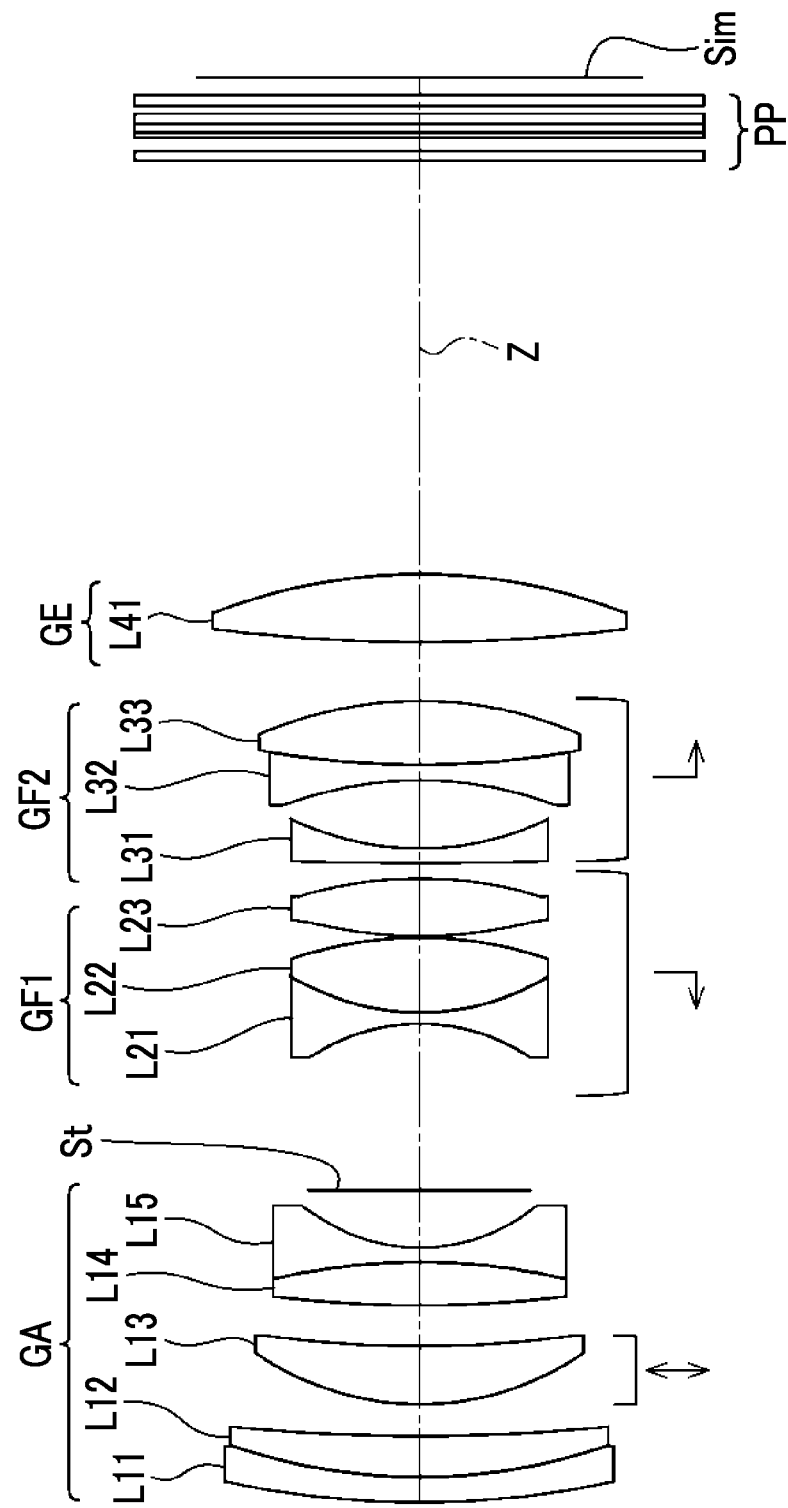
FIG. 13 is a cross-sectional view showing a configuration of an imaging lens of Example 6.

FIG. 13 is a cross-sectional view of a configuration of the imaging lens of Example 6. The imaging lens of Example 6 consists of, in order from the object side to the image side, a front lens group GA having a positive refractive power, an aperture stop St, a first focus lens group GF1 having a positive refractive power, a second focus lens group GF2 having a negative refractive power, and a final lens group GE having a positive refractive power. During focusing from the infinite distance object to the shortest range object, the first focus lens group GF1 moves toward the object side along the optical axis Z, the second focus lens group GF2 moves toward the image side along the optical axis Z, and the other lens group and the aperture stop St remain stationary with respect to the image plane Sim.

The front lens group GA consists of a negative lens L11, a positive lens L12, a positive lens L13, a positive lens L14, and a negative lens L15 in order from the object side to the image side. The lens L11 and the lens L12 are cemented to each other. The lens L14 and the lens L15 are cemented to each other. The first focus lens group GF1 consists of a negative lens L21, a positive lens L22, and a positive lens L23 in order from the object side to the image side. The lens L21 and the lens L22 are cemented to each other. The second focus lens group GF2 consists of a negative lens L31, a negative lens L32, and a positive lens L33 in order from the object side to the image side. The lens L32 and the lens L33 are cemented to each other. The final lens group GE consists of a positive lens L41. In the example shown in FIG. 13, the vibration-proof lens group consists of the lens L13.

Figure 14:
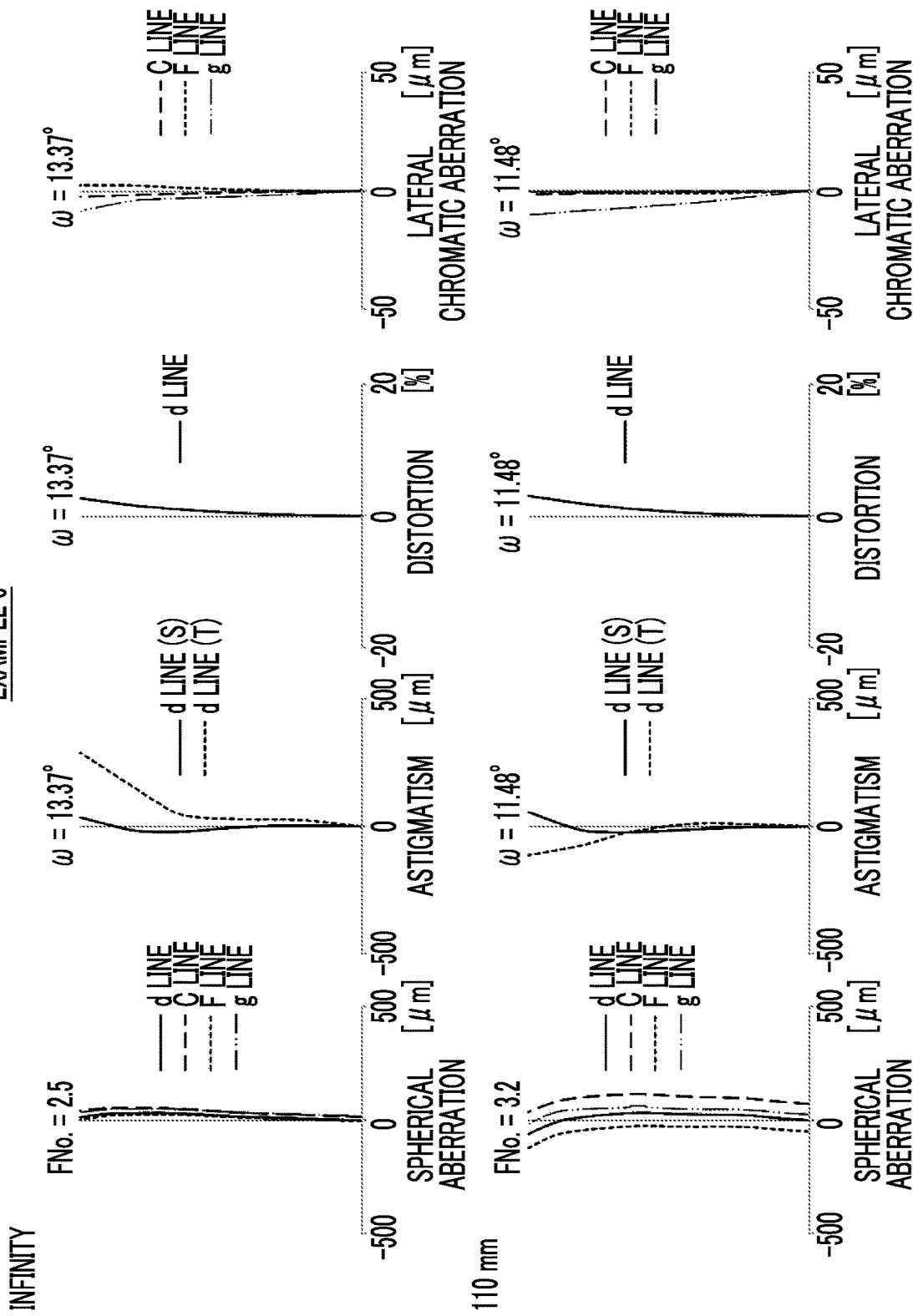
FIG. 14 is a diagram showing aberrations of the imaging lens of Example 6.

Regarding the imaging lens of Example 6, Table 16 shows basic lens data, Table 17 shows specification and variable surface distances, Table 18 shows aspheric surface coefficients thereof, and FIG. 14 shows aberration diagrams. FIG. 14 shows aberration diagrams in a state where the infinite distance object is in focus in the upper part, and shows aberration diagrams in a state where the object at the object distance of 110 mm (millimeter) is in focus in the lower part.

TABLE 16

Example 6

| Sn | R | D | Nd | vd | θgF | Material |
|---|---|---|---|---|---|---|
| 1 | 71.52188 | 1.600 | 1.51633 | 64.14 | 0.53531 | S-BSL7.OHARA |
| 2 | 44.40088 | 2.624 | 2.00100 | 29.13 | 0.59952 | TAFD55-W.HOYA |
| 3 | 152.91351 | 2.000 | | | | |
| 4 | 21.87180 | 3.717 | 1.55032 | 75.50 | 0.54001 | FCD705.HOYA |
| 5 | 89.03839 | 2.579 | | | | |
| 6 | 94.01401 | 2.758 | 1.66461 | 54.66 | 0.55214 | H-LAK11.CDGM |
| 7 | −49.03823 | 0.910 | 1.58144 | 40.91 | 0.57604 | H-QF50.CDGM |
| 8 | 13.94535 | 3.643 | | | | |
| 9(St) | ∞ | DD[9] | | | | |
| 10 | −15.11809 | 0.710 | 1.64769 | 33.84 | 0.59227 | H-ZF1.CDGM |
| 11 | 18.89386 | 4.766 | 1.78800 | 47.52 | 0.55545 | H-LAF10LA.CDGM |
| 12 | −30.66137 | 0.100 | | | | |
| *13 | 32.80684 | 3.668 | 1.69350 | 53.20 | 0.54661 | M-LAC130.HOYA |
| *14 | −31.00853 | DD[14] | | | | |
| 15 | 455.49084 | 0.900 | 1.95375 | 32.32 | 0.59015 | TAFD45.HOYA |
| 16 | 22.61702 | 4.350 | | | | |
| 17 | −29.14832 | 0.974 | 1.76182 | 26.61 | 0.61184 | H-ZF12.CDGM |
| 18 | 67.96250 | 4.071 | 1.55032 | 75.50 | 0.54001 | FCD705.HOYA |
| 19 | −30.79501 | DD[19] | | | | |
| 20 | 127.96350 | 4.319 | 1.92286 | 18.90 | 0.64960 | S-NPH2.OHARA |
| 21 | −43.36486 | 26.239 | | | | |
| 22 | ∞ | 0.600 | 1.54763 | 54.98 | 0.55247 | |

TABLE 16-continued

Example 6

| Sn | R | D | Nd | vd | θgF | Material |
|---|---|---|---|---|---|---|
| 23 | ∞ | 0.810 | | | | |
| 24 | ∞ | 0.350 | 1.54763 | 54.98 | 0.55247 | |
| 25 | ∞ | 0.600 | 1.54763 | 54.98 | 0.55247 | |
| 26 | ∞ | 0.600 | 1.54763 | 54.98 | 0.55247 | |
| 27 | ∞ | 0.500 | | | | |
| 28 | ∞ | 0.700 | 1.49784 | 54.98 | 0.55000 | |
| 29 | ∞ | 1.107 | | | | |

TABLE 17

Example 6

| Object distance | Infinity | 110 mm |
|---|---|---|
| f | 58.202 | 49.158 |
| FNo. | 2.5 | 3.2 |
| 2ω(°) | 26.74 | 22.96 |
| Ymax | 14.2 | 14.2 |
| DD[9] | 10.527 | 3.683 |
| DD[14] | 1.000 | 10.597 |
| DD[19] | 3.750 | 0.997 |

TABLE 18

Example 6

| Sn | 13 | 14 |
|---|---|---|
| KA | 1.0000000E+00 | 1.0000000E+00 |
| A3 | 0.0000000E+00 | 0.0000000E+00 |
| A4 | −6.5901188E−06 | 2.2523141E−05 |
| A5 | −9.7760509E−07 | −1.8572328E−06 |
| A6 | 1.4253792E−07 | 9.0801914E−08 |
| A7 | −5.1367562E−08 | −7.7303600E−09 |
| A8 | 3.3752709E−09 | 4.2300113E−10 |
| A9 | 7.9029279E−11 | −1.3289748E−12 |
| A10 | 2.6703267E−11 | −3.7330151E−12 |
| A11 | 8.3261234E−13 | 8.5005011E−13 |
| A12 | −5.7941097E−13 | −3.4434986E−13 |
| A13 | −8.9335119E−14 | −5.5398880E−14 |
| A14 | −1.5339203E−14 | −4.3694153E−15 |
| A15 | 4.7764467E−16 | 3.1375333E−15 |
| A16 | 7.1063287E−16 | −2.6339522E−16 |
| A17 | −3.5589692E−17 | 5.7693672E−18 |
| A18 | −2.7698496E−18 | 6.9219420E−20 |
| A19 | −4.8061558E−20 | −1.9602437E−20 |
| A20 | 1.3247361E−20 | −1.0545699E−21 |

Example 7

Figure 15:
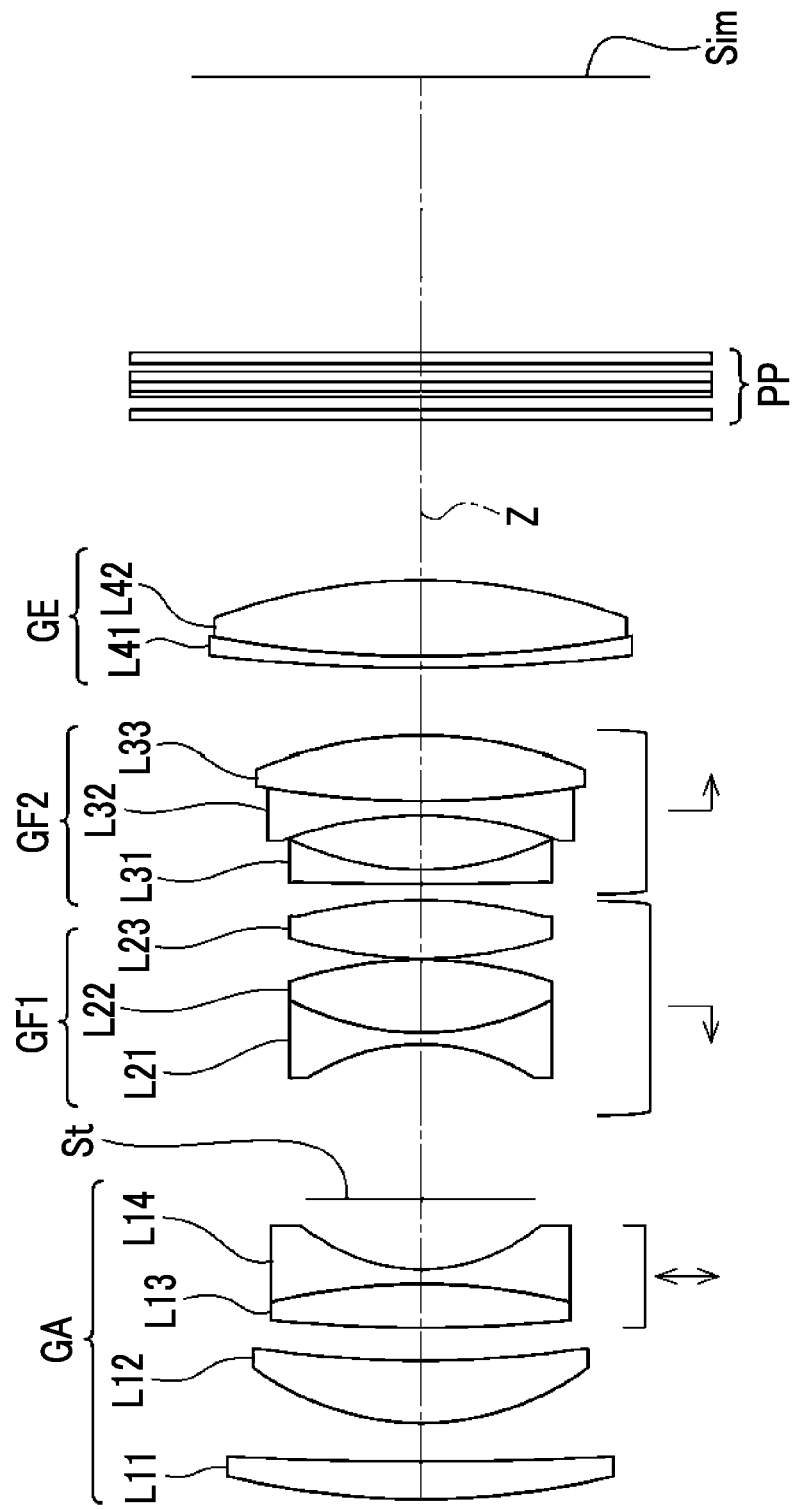
FIG. 15 is a cross-sectional view showing a configuration of an imaging lens of Example 7.

FIG. 15 is a cross-sectional view of a configuration of the imaging lens of Example 7. The imaging lens of Example 7 consists of, in order from the object side to the image side, a front lens group GA having a positive refractive power, an aperture stop St, a first focus lens group GF1 having a positive refractive power, a second focus lens group GF2 having a negative refractive power, and a final lens group GE having a positive refractive power. During focusing from the infinite distance object to the shortest range object, the first focus lens group GF1 moves toward the object side along the optical axis Z, the second focus lens group GF2 moves toward the image side along the optical axis Z, and the other lens group and the aperture stop St remain stationary with respect to the image plane Sim.

The front lens group GA consists of a positive lens L11, a positive lens L12, a positive lens L13, and a negative lens L14 in order from the object side to the image side. The lens L13 and the lens L14 are cemented to each other. The first focus lens group GF1 consists of a negative lens L21, a positive lens L22, and a positive lens L23 in order from the object side to the image side. The lens L21 and the lens L22 are cemented to each other. The second focus lens group GF2 consists of a negative lens L31, a negative lens L32, and a positive lens L33 in order from the object side to the image side. The lens L32 and the lens L33 are cemented to each other. The final lens group GE consists of, in order from the object side to the image side, a negative lens L41 and a positive lens L42. The lens L41 and the lens L42 are cemented to each other. In the example shown in FIG. 15, the vibration-proof lens group consists of a lens L13 and a lens L14.

Figure 16:
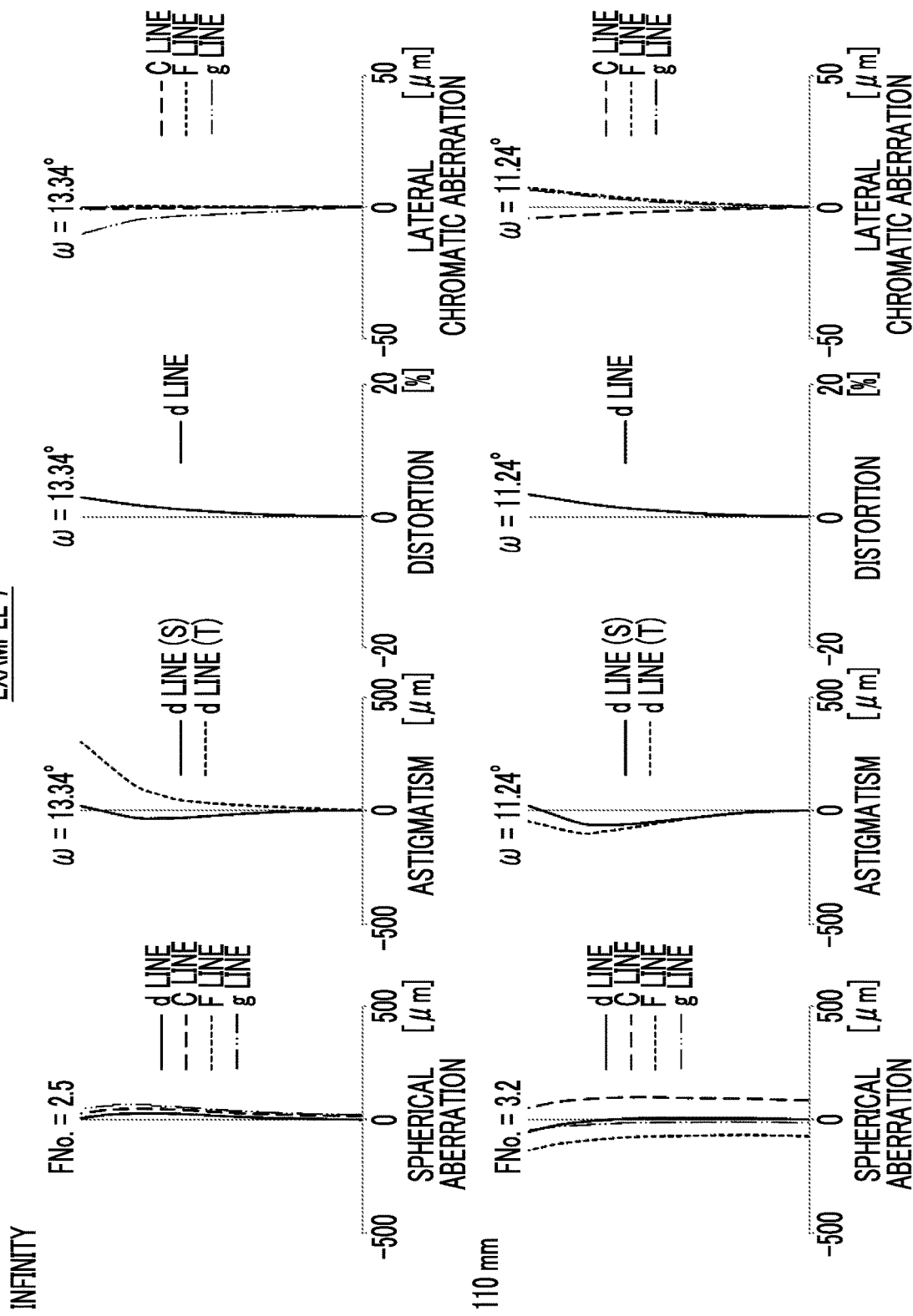
FIG. 16 is a diagram showing aberrations of the imaging lens of Example 7.

Regarding the imaging lens of Example 7, Table 19 shows basic lens data, Table 20 shows specification and variable surface distances, Table 21 shows aspheric surface coefficients thereof, and FIG. 16 shows aberration diagrams. FIG. 16 shows aberration diagrams in a state where the infinite distance object is in focus in the upper part, and shows aberration diagrams in a state where the object at the object distance of 110 mm (millimeter) is in focus in the lower part.

TABLE 19

Example 7

| Sn | R | D | Nd | vd | θgF | Material |
|---|---|---|---|---|---|---|
| 1 | 61.73037 | 2.337 | 2.00069 | 25.46 | 0.61364 | TAFD40-W.HOYA |
| 2 | 263.18091 | 2.399 | | | | |
| 3 | 20.94189 | 3.888 | 1.55032 | 75.50 | 0.54001 | FCD705.HOYA |
| 4 | 85.41369 | 2.053 | | | | |
| 5 | 114.49106 | 2.714 | 1.66461 | 54.66 | 0.55214 | H-LAK11.CDGM |
| 6 | −46.62548 | 0.910 | 1.57501 | 41.51 | 0.57711 | H-QF3.CDGM |
| 7 | 13.78788 | 4.383 | | | | |
| 8(St) | ∞ | DD[8] | | | | |
| 9 | −15.38924 | 0.710 | 1.64769 | 33.84 | 0.59227 | H-ZF1.CDGM |
| 10 | 20.80119 | 4.529 | 1.78800 | 47.52 | 0.55545 | H-LAF10LA.CDGM |

TABLE 19-continued

Example 7

| Sn | R | D | Nd | νd | θgF | Material |
|---|---|---|---|---|---|---|
| 11 | −30.63054 | 0.100 | | | | |
| *12 | 32.54622 | 3.621 | 1.69350 | 53.20 | 0.54661 | M-LAC130.HOYA |
| *13 | −32.53652 | DD[13] | | | | |
| 14 | 376.44660 | 0.900 | 1.95375 | 32.32 | 0.59015 | TAPD45.HOYA |
| 15 | 22.25008 | 3.359 | | | | |
| 16 | −29.87127 | 0.900 | 1.76182 | 26.61 | 0.61184 | H-ZF12.CDGM |
| 17 | 67.69318 | 4.020 | 1.55032 | 75.50 | 0.54001 | FCD705.HOYA |
| 18 | −31.56489 | DD[18] | | | | |
| 19 | 140.33965 | 0.710 | 1.71300 | 53.87 | 0.54407 | H-LAK7A.CDGM |
| 20 | 83.78315 | 4.726 | 1.92286 | 20.88 | 0.63900 | E-FDS1.HOYA |
| 21 | −43.89576 | 10.000 | | | | |
| 22 | ∞ | 0.600 | 1.54763 | 54.98 | 0.55247 | |
| 23 | ∞ | 0.810 | | | | |
| 24 | ∞ | 0.350 | 1.54763 | 54.98 | 0.55247 | |
| 25 | ∞ | 0.600 | 1.54763 | 54.98 | 0.55247 | |
| 26 | ∞ | 0.600 | 1.54763 | 54.98 | 0.55247 | |
| 27 | ∞ | 0.500 | | | | |
| 28 | ∞ | 0.700 | 1.49784 | 54.98 | 0.55000 | |
| 29 | ∞ | 17.152 | | | | |

TABLE 20

Example 7

| Object distance | Infinity | 110 mm |
|---|---|---|
| f | 58.204 | 48.463 |
| FNo. | 2.5 | 3.2 |
| 2ω(°) | 26.68 | 22.48 |
| Ymax | 14.2 | 14.2 |
| DD[8] | 9.628 | 2.935 |
| DD[13] | 0.999 | 10.904 |
| DD[18] | 4.207 | 0.995 |

TABLE 21

Example 7

| Sn | 12 | 13 |
|---|---|---|
| KA | 1.0000000E+00 | 1.0000000E+00 |
| A3 | 0.0000000E+00 | 0.0000000E+00 |
| A4 | −7.5795354E−07 | 2.3083371E−05 |
| A5 | −8.2432039E−07 | −1.0395865E−06 |
| A6 | 1.9557378E−07 | 1.3388821E−07 |
| A7 | −3.5308894E−08 | −8.2539136E−09 |
| A8 | 2.8303353E−09 | 1.0852823E−10 |

TABLE 21-continued

Example 7

| Sn | 12 | 13 |
|---|---|---|
| A9 | −6.7097440E−11 | −3.5649441E−11 |
| A10 | 1.9391619E−11 | 1.2131281E−11 |
| A11 | −2.3572783E−13 | 1.4521113E−12 |
| A12 | −1.3739528E−13 | −1.4477216E−13 |
| A13 | −2.7970461E−14 | −4.9341809E−14 |
| A14 | −4.1792245E−15 | −3.6641829E−15 |
| A15 | −4.0768338E−16 | 2.1346039E−15 |
| A16 | 3.0231657E−16 | −1.8461443E−16 |
| A17 | −1.0345204E−17 | 6.3714253E−18 |
| A18 | −1.6625269E−18 | −2.4320188E−19 |
| A19 | 1.7742075E−20 | 1.1028647E−20 |
| A20 | 5.5807383E−21 | −2.4595284E−22 |

Table 22 shows the corresponding values of Conditional Expressions (1) to (25) of the imaging lenses of Examples 1 to 7, and Table 23 shows the corresponding values of Conditional Expressions (26) to (51) of the imaging lenses of Examples 1 to 7. The corresponding value of Conditional Expression (51) is a value in a case where the vibration-proof lens group is composed of the lenses shown in the drawings of each embodiment.

TABLE 22

| Expression number | Conditional expression | Example 1 | Example 2 | Example 3 | Example 4 | Example 5 | Example 6 | Example 7 |
|---|---|---|---|---|---|---|---|---|
| (1) | RF1f/Ymax | −1.084 | −1.116 | −1.170 | −1.056 | −1.151 | −1.065 | −1.084 |
| (2) | RAr/Ymax | 0.961 | 0.954 | 0.908 | 1.005 | 1.029 | 0.982 | 0.971 |
| (3) | (RAr − RF1f)/(RAr + RF1f) | −0.060 | −0.078 | −0.126 | −0.025 | −0.056 | −0.040 | −0.055 |
| (4) | NAmax | 2.001 | 2.001 | 1.963 | 1.959 | 2.003 | 2.001 | 2.001 |
| (5) | νApmin | 25.46 | 25.46 | 24.11 | 17.47 | 19.32 | 29.13 | 25.46 |
| (6) | θApmax | 0.61364 | 0.61364 | 0.62126 | 0.65993 | 0.64514 | 0.59952 | 0.61364 |
| (7) | NArp − NArn | 0.07612 | 0.10289 | 0.03945 | 0.02249 | 0.06658 | 0.08317 | 0.09 |
| (8) | νArp − νArn | 14.40 | 14.05 | 21.03 | 24.16 | 13.75 | 13.75 | 13.15 |
| (9) | θArn − θArp | 0.02946 | 0.03039 | 0.04116 | 0.04038 | 0.02831 | 0.02390 | 0.02500 |
| (10) | f/fA | 0.493 | 0.576 | 0.615 | 0.389 | 0.477 | 0.446 | 0.486 |
| (11) | f/fF1 | 2.307 | 2.212 | 2.220 | 2.835 | 2.607 | 2.382 | 2.312 |
| (12) | f/fF2 | −2.868 | −2.926 | −3.179 | −1.746 | −1.614 | −2.870 | −2.862 |
| (13) | fF1/fF2 | −1.243 | −1.323 | −1.432 | −0.616 | −0.619 | −1.205 | −1.238 |
| (14) | $(1 - \beta F1^2) \times \beta F1r^2$ | 2.731 | 2.573 | 2.402 | 3.916 | 3.452 | 2.837 | 2.780 |
| (15) | $(1 - \beta F2^2) \times \beta F2r^2$ | −2.958 | −2.877 | −2.752 | −0.823 | −0.803 | −3.020 | −3.000 |

TABLE 22-continued

| Expression number | Conditional expression | Example 1 | Example 2 | Example 3 | Example 4 | Example 5 | Example 6 | Example 7 |
|---|---|---|---|---|---|---|---|---|
| (16) | $\{(1 - \beta F1^2) \times \beta F1r^2\}/\{(1 - \beta F2^2) \times \beta F2r^2\}$ | −0.923 | −0.894 | −0.873 | −4.759 | −4.296 | −0.939 | −0.927 |
| (17) | f/fE | 1.654 | 1.707 | 1.883 | 1.919 | 1.894 | 1.638 | 1.639 |
| (18) | $\theta Afsp - 0.64833 + 0.0018 \times \nu Afsp$ | 0.011 | 0.011 | 0.016 | 0.043 | 0.032 | 0.004 | 0.011 |
| (19) | $\theta Arsp - \theta Arsn + 0.00163 \times (\nu Arsp - \nu Arsn)$ | −0.006 | −0.007 | −0.007 | −0.001 | −0.006 | −0.001 | −0.004 |
| (20) | NEp | 1.923 | 1.923 | 1.946 | 2.003 | 1.986 | 1.923 | 1.923 |
| (21) | νEp | 18.90 | 18.90 | 17.98 | 19.32 | 16.48 | 18.90 | 20.88 |
| (22) | θEp | 0.64960 | 0.64960 | 0.65460 | 0.64514 | 0.66558 | 0.64960 | 0.63900 |
| (23) | $\theta Ep - 0.64833 + 0.0018 \times \nu Ep$ | 0.035 | 0.035 | 0.039 | 0.032 | 0.047 | 0.035 | 0.028 |
| (24) | νGAmax | 75.50 | 75.50 | 75.50 | 75.50 | 75.50 | 75.50 | 75.50 |
| (25) | fA/fF1 | 4.679 | 3.838 | 3.611 | 7.293 | 5.466 | 5.336 | 4.762 |

TABLE 23

| Expression number | Conditional expression | Example 1 | Example 2 | Example 3 | Example 4 | Example 5 | Example 6 | Example 7 |
|---|---|---|---|---|---|---|---|---|
| (26) | NF1p − NF1n | 0.14030 | 0.17620 | 0.19501 | 0.13821 | 0.18712 | 0.14031 | 0.14000 |
| (27) | νF1p − νF1n | 13.65 | 12.10 | 8.26 | 10.37 | 8.89 | 13.68 | 13.68 |
| (28) | θF1n − θF1p | 0.03840 | 0.03580 | 0.02835 | 0.02938 | 0.02768 | 0.03682 | 0.03700 |
| (29) | $\theta F1p - \theta F1n + 0.00163 \times (\nu F1p - \nu F1n)$ | −0.016 | −0.016 | −0.015 | −0.012 | −0.013 | −0.015 | −0.015 |
| (30) | fA/fF2 | −5.816 | −5.076 | −5.170 | −4.492 | −3.382 | −6.430 | −5.895 |
| (31) | NF2p − NF2n | −0.21150 | −0.21150 | −0.26568 | −0.37254 | −0.30419 | −0.21150 | −0.21200 |
| (32) | νF2p − νF2n | 48.88 | 48.89 | 28.93 | 54.62 | 50.35 | 48.89 | 48.89 |
| (33) | θF2n − θF2p | 0.07184 | 0.07183 | 0.01713 | 0.09899 | 0.07030 | 0.07183 | 0.07183 |
| (34) | $\theta F2p - \theta F2n + 0.00163 \times (\nu F2p - \nu F2n)$ | 0.008 | 0.008 | 0.030 | −0.010 | 0.012 | 0.008 | 0.008 |
| (35) | νF2p | 75.50 | 75.50 | 75.50 | 75.50 | 75.50 | 75.50 | 75.50 |
| (36) | νGF2max | 75.50 | 75.50 | 75.50 | 75.50 | 75.50 | 75.50 | 75.50 |
| (37) | (NF1p − NF1n)/(NF2p − NF2n) | −0.663 | −0.833 | −0.734 | −0.371 | −0.615 | −0.663 | −0.663 |
| (38) | DF1/DF2 | −2.067 | −2.289 | −4.141 | −3.283 | −3.438 | −2.482 | −2.084 |
| (39) | DF1/fF1 | −0.268 | −0.277 | −0.331 | −0.312 | −0.325 | −0.280 | −0.266 |
| (40) | DF2/fF2 | −0.161 | −0.160 | −0.114 | −0.059 | −0.058 | −0.136 | −0.158 |
| (41) | DF1/f | −0.116 | −0.125 | −0.149 | −0.110 | −0.125 | −0.117 | −0.115 |
| (42) | DF2/f | 0.056 | 0.055 | 0.036 | 0.034 | 0.036 | 0.047 | 0.055 |
| (43) | fA/fE | 3.354 | 2.962 | 3.062 | 4.936 | 3.970 | 3.670 | 3.377 |
| (44) | f/fexE | 0.128 | 0.169 | 0.167 | −0.007 | 0.116 | 0.125 | 0.125 |
| (45) | (Rr + Rf)/(Rr − Rf) | 1.614 | 1.588 | 1.931 | 2.023 | 1.894 | 2.757 | 1.613 |
| (46) | νAfp − νAfn | — | — | — | — | — | −35.00 | — |
| (47) | θAfn − θAfp | — | — | — | — | — | 0.06421 | — |
| (48) | $\theta Afp - \theta Afn + 0.00163 \times (\nu Afp - \nu Afn)$ | — | — | — | — | — | −0.121 | — |
| (49) | νErp − νErn | — | — | — | — | — | — | −32.99 |
| (50) | θErn − θErp | — | — | — | — | — | — | −0.09493 |
| (51) | $|(1 - \beta IS) \times \beta ISr|$ | 1.154 | 1.405 | 1.575 | 0.914 | 0.788 | 1.075 | 1.374 |

The imaging lenses of Examples 1 to 7 achieve high optical performance by satisfactorily correcting various aberrations not only in the state where the infinite distance object is in focus but also in the state where the short range object is in focus.

Figure 17:
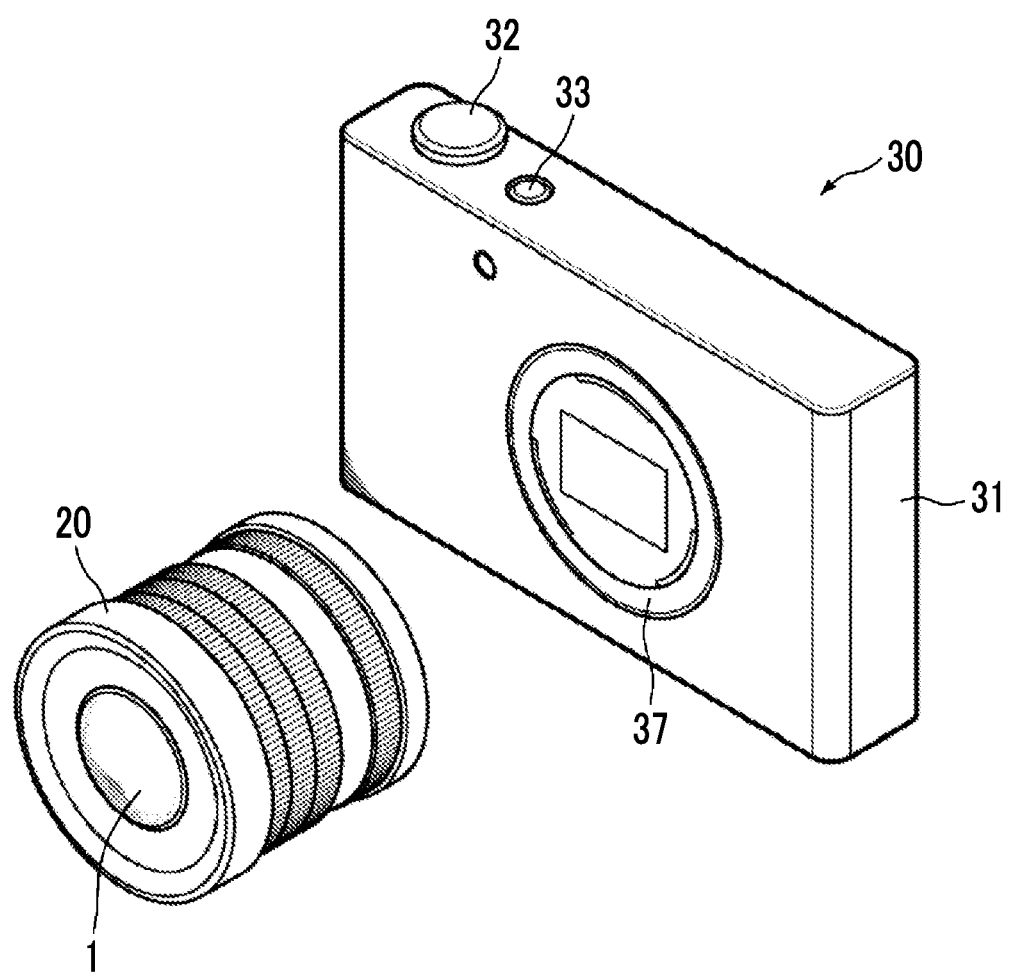
FIG. 17 is a perspective view of the front side of an imaging apparatus according to an embodiment.
Figure 18:
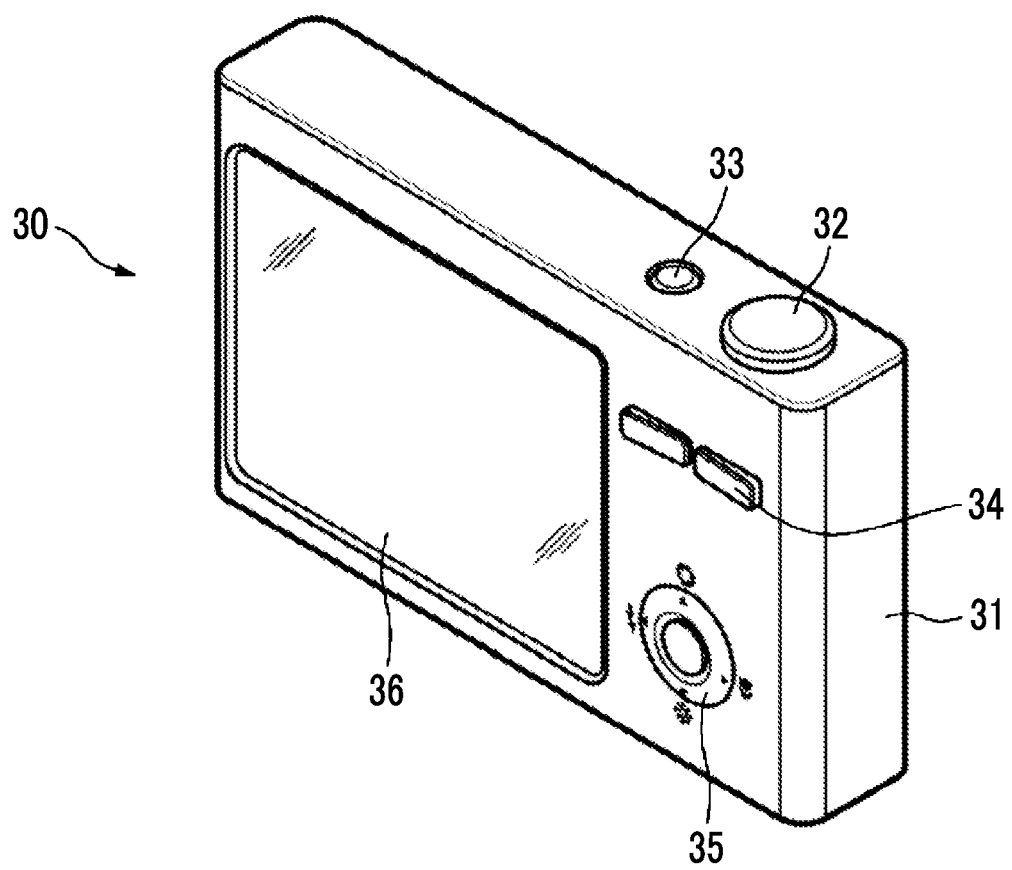
FIG. 18 is a perspective view of the rear side of the imaging apparatus according to the embodiment.

Next, an imaging apparatus according to an embodiment of the present disclosure will be described. FIGS. 17 and 18 are external views of a camera 30 which is the imaging apparatus according to the embodiment of the present disclosure. FIG. 17 is a perspective view of the camera 30 viewed from the front side, and FIG. 18 is a perspective view of the camera 30 viewed from the rear side. The camera 30 is a so-called mirrorless type digital camera, and the interchangeable lens 20 can be detachably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture stop, through which light from an imaging target is incident, is provided at the center on the front surface of the camera body 31. A mount 37 is provided at a position corresponding to the imaging aperture stop. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the curvature radius, the surface distance, the refractive index, the Abbe number, and the aspheric surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens comprising, in order from a position closest to an object side to an image side:
    a front lens group that has a positive refractive power and remains stationary with respect to an image plane during focusing;
    a stop that is disposed subsequent to the front lens group;
    a first focus lens group that has a positive refractive power;
    a second focus lens group that has a negative refractive power; and
    a final lens group that has a positive refractive power, is disposed closest to the image side, and remains stationary with respect to the image plane during focusing,
    wherein during focusing from an infinite distance object to a short range object, the first focus lens group and the second focus lens group move to increase a mutual distance therebetween,
    a lens surface closest to the image side in the front lens group is a concave surface,
    a lens surface closest to the object side in the first focus lens group is a concave surface, and
    assuming that
        a curvature radius of the lens surface closest to the image side in the front lens group is RAr, and
        a curvature radius of the lens surface closest to the object side in the first focus lens group is RF1f,
        Conditional Expression (3) is satisfied, which is represented by $$-0.2 < (RAr - RF1f)/(RAr + RF1f) < 0 \quad (3).$$

2. The imaging lens according to claim 1, wherein assuming that
    a maximum image height is Ymax,
    Conditional Expression (1) is satisfied, which is represented by $$-2 < RF1f/Ymax < -0.5 \quad (1).$$

3. The imaging lens according to claim 1, wherein assuming that
    a maximum image height is Ymax,
    Conditional Expression (2) is satisfied, which is represented by $$0.7 < RAr/Ymax < 1.3 \quad (2).$$

4. The imaging lens according to claim 1,
    wherein in a case where one lens component is one single lens or one group of cemented lenses,
    a lens component closest to the object side in the front lens group has a positive refractive power.

5. The imaging lens according to claim 4, wherein assuming that
    a maximum value of refractive indexes of all lenses included in the lens component closest to the object side in the front lens group at a d line is NAmax,
    a minimum value of Abbe numbers of all positive lenses included in the lens component closest to the object side in the front lens group based on the d line is vApmin, and
    a maximum value of partial dispersion ratios of all the positive lenses included in the lens component closest to the object side in the front lens group between a g line and an F line is θApmax,
    Conditional Expressions (4), (5), and (6) are satisfied, which are represented by $$1.7 < NAmax < 2.1 \quad (4),$$

$$10 < vApmin < 40 \quad (5), \text{ and}$$

$$0.5 < \theta Apmax < 0.8 \quad (6).$$

6. The imaging lens according to claim 1,
    wherein the front lens group includes a cemented lens closest to the image side, and
    the cemented lens closest to the image side in the front lens group includes a negative lens and a positive lens successively in order from the position closest to the image side.

7. The imaging lens according to claim 6, wherein assuming that
    a refractive index of the positive lens included in the cemented lens closest to the image side in the front lens group at a d line is NArp,
    a refractive index of the negative lens included in the cemented lens closest to the image side in the front lens group at the d line is NArn,
    an Abbe number of the positive lens included in the cemented lens closest to the image side in the front lens group based on the d line is vArp,
    an Abbe number of the negative lens included in the cemented lens closest to the image side in the front lens group based on the d line is vArn,
    a partial dispersion ratio of the positive lens included in the cemented lens closest to the image side in the front lens group between a g line and an F line is θArp, and
    a partial dispersion ratio of the negative lens included in the cemented lens closest to the image side in the front lens group between the g line and the F line is θArn,
    Conditional Expressions (7), (8), and (9) are satisfied, which are represented by $$0 < NArp - NArn < 0.15 \quad (7),$$

$$5 < vArp - vArn < 40 \quad (8), \text{ and}$$

$$0.01 < \theta Arn - \theta Arp < 0.06 \quad (9).$$

8. The imaging lens according to claim 1, wherein assuming that
    a focal length of the imaging lens in a state where the infinite distance object is in focus is f, and
    a focal length of the front lens group is fA,
    Conditional Expression (10) is satisfied, which is represented by $$0.25 < f/fA < 0.8 \quad (10).$$

9. An imaging lens comprising, in order from a position closest to an object side to an image side:
- a front lens group that has a positive refractive power and remains stationary with respect to an image plane during focusing;
- a stop that is disposed subsequent to the front lens group;
- a first focus lens group that has a positive refractive power;
- a second focus lens group that has a negative refractive power; and
- a final lens group that has a positive refractive power, is disposed closest to the image side, and remains stationary with respect to the image plane during focusing,
- wherein during focusing from an infinite distance object to a short range object, the first focus lens group and the second focus lens group move to increase a mutual distance therebetween,
- a lens surface closest to the image side in the front lens group is a concave surface,
- a lens surface closest to the object side in the first focus lens group is a concave surface, and
- assuming that
  - a focal length of the imaging lens in a state where the infinite distance object is in focus is f, and
  - a focal length of the first focus lens group is fF1,
  - Conditional Expression (11) is satisfied, which is represented by $$1.8 < f/fF1 < 4 \quad (11).$$

10. An imaging lens comprising, in order from a position closest to an object side to an image side:
- a front lens group that has a positive refractive power and remains stationary with respect to an image plane during focusing;
- a stop that is disposed subsequent to the front lens group;
- a first focus lens group that has a positive refractive power;
- a second focus lens group that has a negative refractive power; and
- a final lens group that has a positive refractive power, is disposed closest to the image side, and remains stationary with respect to the image plane during focusing,
- wherein during focusing from an infinite distance object to a short range object, the first focus lens group and the second focus lens group move to increase a mutual distance therebetween,
- a lens surface closest to the image side in the front lens group is a concave surface,
- a lens surface closest to the object side in the first focus lens group is a concave surface, and
- assuming that
  - a focal length of the imaging lens in a state where the infinite distance object is in focus is f, and
  - a focal length of the second focus lens group is fF2,
  - Conditional Expression (12) is satisfied, which is represented by $$-5 < f/fF2 < -1.4 \quad (12).$$

11. The imaging lens according to claim 1, wherein assuming that
- a focal length of the first focus lens group is fF1, and
- a focal length of the second focus lens group is fF2,
- Conditional Expression (13) is satisfied, which is represented by $$-1.55 < fF1/fF2 < -0.4 \quad (13).$$

12. The imaging lens according to claim 1, wherein assuming that
- a lateral magnification of the first focus lens group in a state where the infinite distance object is in focus is $\beta F1$, and
- a combined lateral magnification of all lenses closer to the image side than the first focus lens group in the state where the infinite distance object is in focus is $\beta F1r$,
- Conditional Expression (14) is satisfied, which is represented by $$1.6 < (1-\beta F1^2) \times \beta F1r^2 < 5.8 \quad (14).$$

13. The imaging lens according to claim 1, wherein assuming that
- a lateral magnification of the second focus lens group in a state where the infinite distance object is in focus is $\beta F2$, and
- a combined lateral magnification of all lenses closer to the image side than the second focus lens group in the state where the infinite distance object is in focus is $\beta F2r$,
- Conditional Expression (15) is satisfied, which is represented by $$-4.2 < (1-\beta F2^2) \times \beta F2r^2 < 0 \quad (15).$$

14. The imaging lens according to claim 1, wherein the first focus lens group is disposed adjacent to the stop.

15. The imaging lens according to claim 1, further comprising a medium lens group that remains stationary during focusing between the first focus lens group and the second focus lens group.

16. The imaging lens according to claim 2, wherein Conditional Expression (1-1) is satisfied, which is represented by $-1.4 < RF1f/Ymax < -0.8$ (1-1).

17. The imaging lens according to claim 3, wherein Conditional Expression (2-1) is satisfied, which is represented by $0.8 < RAr/Ymax < 1.2$ (2-1).

18. The imaging lens according to claim 1, wherein Conditional Expression (3-1) is satisfied, which is represented by $-0.15 < (RAr+RF1f)/(RAr-RF1f) < -0.01$ (3-1).

19. An imaging apparatus comprising:
- the imaging lens according to claim 1; and
- an imaging element for outputting a captured image signal based on a subject image which is formed through the imaging lens.

* * * * *